(12) United States Patent
Shimada et al.

(10) Patent No.: US 8,298,632 B2
(45) Date of Patent: *Oct. 30, 2012

(54) LIQUID CRYSTAL COMPOUND HAVING NEGATIVE DIELECTRIC ANISOTROPY, LIQUID CRYSTAL COMPOSITION USING THIS AND LIQUID CRYSTAL DISPLAY DEVICE

(75) Inventors: Teru Shimada, Chiba (JP); Junichi Yamashita, Chiba (JP)

(73) Assignees: JNC Corporation, Tokyo (JP); JNC Petrochemical Corporation, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 13/145,344

(22) PCT Filed: Jan. 27, 2010

(86) PCT No.: PCT/JP2010/051005
§ 371 (c)(1),
(2), (4) Date: Jul. 20, 2011

(87) PCT Pub. No.: WO2010/095493
PCT Pub. Date: Aug. 26, 2010

(65) Prior Publication Data
US 2011/0272630 A1    Nov. 10, 2011

(30) Foreign Application Priority Data

Feb. 17, 2009 (JP) .................. 2009-033738
Dec. 24, 2009 (JP) .................. 2009-292443

(51) Int. Cl.
| | | |
|---|---|---|
| C09K 19/30 | (2006.01) | |
| C09K 19/20 | (2006.01) | |
| C09K 19/12 | (2006.01) | |
| C07C 69/76 | (2006.01) | |
| C07C 43/225 | (2006.01) | |
| C07C 25/13 | (2006.01) | |
| C07C 25/24 | (2006.01) | |

(52) U.S. Cl. ............... 428/1.1; 252/299.63; 252/299.66; 252/299.67; 560/65; 560/128; 568/643; 568/645; 568/649; 570/127; 570/128; 570/129; 570/130

(58) Field of Classification Search .................. 560/128, 560/65; 568/643, 645, 649; 570/128, 129, 570/127, 130; 252/299.63, 299.66, 299.67; 428/1.1

See application file for complete search history.

(56) References Cited

U.S. PATENT DOCUMENTS

| | | | | |
|---|---|---|---|---|
| 6,329,027 | B1* | 12/2001 | Kondo et al. | ................ 428/1.1 |
| 7,851,032 | B2* | 12/2010 | Saito et al. | ................ 428/1.1 |
| 8,124,197 | B2* | 2/2012 | Saito et al. | ................ 428/1.1 |
| 2010/0328600 | A1* | 12/2010 | Shimada et al. | ............ 349/182 |
| 2011/0037912 | A1* | 2/2011 | Saito et al. | ................... 349/33 |

FOREIGN PATENT DOCUMENTS

| | | |
|---|---|---|
| JP | H02-004725 | 1/1990 |
| JP | H09-052852 | 2/1997 |
| JP | 2000-053602 | 2/2000 |
| JP | 2007-002132 | 1/2007 |
| WO | 2009-034867 | 3/2009 |
| WO | WO 2009034867 A1 * | 3/2009 |

* cited by examiner

*Primary Examiner* — Shean C Wu
(74) *Attorney, Agent, or Firm* — Jianq Chyun IP Office

(57) ABSTRACT

The invention provides a liquid crystal compound having a suitable value of refractive index anisotropy, a suitable value of dielectric anisotropy, steep characteristics electro-optic characteristics, a wide temperature range of a nematic phase and an excellent compatibility with other liquid crystal compounds, and a liquid crystal compounds especially having a wide temperature range of a nematic phase.

A compound represented by formula (1).

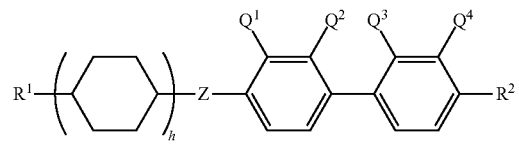

(1)

For example, $R^1$ and $R^2$ are each independently alkyl having 1 to 9 carbons or alkenyl having 2 to 9 carbons, alkoxy having 1 to 8 carbons or alkenyloxy having 2 to 8 carbons; $Q^1$ and $Q^4$ are each independently fluorine or chlorine; $Q^2$ and $Q^3$ are each independently hydrogen, fluorine or chlorine, and one of $Q^2$ and $Q^3$ is hydrogen; Z is —$CH_2O$— or —COO—; and h is 1 or 2.

16 Claims, No Drawings

LIQUID CRYSTAL COMPOUND HAVING NEGATIVE DIELECTRIC ANISOTROPY, LIQUID CRYSTAL COMPOSITION USING THIS AND LIQUID CRYSTAL DISPLAY DEVICE

CROSS-REFERENCE TO RELATED APPLICATION

This application is a 371 of international application of PCT application serial no. PCT/JP2010/051005, filed on Jan. 27, 2010, which claims the priority benefit of Japan application no. 2009-033738, filed on Feb. 17, 2009 and Japan application no. 2009-292443, filed on Dec. 24, 2009. The entirety of each of the above-mentioned patent applications is hereby incorporated by reference herein and made a part of this specification.

FIELD OF THE INVENTION

The invention relates to a new liquid crystal compound that is useful as a material for use in a liquid crystal display device, and a liquid crystal composition including this compound. More specifically, the invention relates to a new liquid crystal compound that has a small viscosity and an excellent compatibility with other liquid crystal compounds, and further has a suitable refractive index anisotropy and dielectric anisotropy, and that gives a steep electro-optic characteristics when the compound is used for a liquid crystal display device, and relates to a liquid crystal composition including this compound and to a liquid crystal display device that contains this liquid crystal composition.

BACKGROUND OF THE INVENTION

A display device utilizing a liquid crystal compound (in this patent application, the term, the liquid crystal compound, is used as a generic term for a compound that exhibits a liquid crystal phase such as a nematic phase or a smectic phase, and a compound that exhibits no liquid crystal phases but useful as a component of a liquid crystal composition) has been widely used for the display of a watch, a calculator, a word processor or the like. The display device utilizes the refractive index anisotropy, the dielectric anisotropy and so forth of the liquid crystal compound.

A liquid crystal phase includes a nematic liquid crystal phase, a smectic liquid crystal phase, a cholestric liquid crystal phase, and the nematic phase is most widely applied. A display mode includes a DS (dynamic scattering) mode, a DAP (deformation of aligned phases) mode, a GH (guest-host) mode, a TN (twisted nematic) mode, a STN (super twisted nematic) mode, a TFT (thin film transistor) mode, a VA (vertical alignment) mode, an IPS (in-plane switching) mode and a PSA (polymer sustained alignment) mode.

A liquid crystal compound used for these display modes is required to exhibit a liquid crystal phase in a wide temperature range, centering at room temperature, to be sufficiently stable under conditions that the display device is used, and also to have sufficient characteristics for driving the display device. However, no single liquid crystal compounds that satisfy these conditions have been found until now.

The actual situation is that a liquid crystal composition is prepared by mixing from several to several tens of liquid crystal compounds in order to satisfy the required characteristics. It is required that the liquid crystal composition is stable to moisture, light, heat and air, which are normally present under conditions that the display is used, and is stable to an electric field or electromagnetic radiation, and is also stable chemically to a compound that will be mixed. It is required that the liquid crystal composition has suitable values of a variety of physical properties such as refractive index anisotropy ($\Delta n$) and dielectric anisotropy ($\Delta\varepsilon$), depending on the display mode or the shape of the display device. Furthermore, it is important that each component in the liquid crystal composition has an excellent solubility in each other.

It is desirable for an excellent liquid crystal display that the cell thickness of the liquid crystal display device used and the value of $\Delta n$ of the liquid crystal material used are constant. See E. Jakeman, et al., Phys. Lett., 39A. 69 (1972). The response speed of the liquid crystal display device is inversely proportional to the square of the cell thickness. Accordingly, a liquid crystal composition having the value of a large $\Delta n$ should be used in order to produce a liquid crystal display device that is able to respond at high speed and thus can be applied to the display of moving images and so forth. A variety of compounds as a component having the value of a large $\Delta n$ for liquid crystals have been synthesized until now. Since such a compound having a large $\Delta n$ generally has a highly conjugated molecular structure, the compound has a tendency to have a poor compatibility with the other liquid crystal materials, and thus it is not easy to use the compound as a component of a liquid crystal composition having excellent electrical characteristics. Further, a high stability is required in a liquid crystal compound used as a component of a liquid crystal composition, which is required to have a high insulation (specific resistance), for use in a liquid crystal display device having a thin film transistor mode.

In the operating mode described above, the IPS mode, the VA mode, the PSA mode or the like utilizes homeotropic orientation of liquid crystal molecules, and it is known that a limited viewing angle, which is a disadvantage of a conventional display mode such as the TN mode and the STN mode, can be improved by means of these modes.

A variety of liquid crystal compounds, where hydrogen on the benzene ring had been replaced by fluorine, has conventionally been studied as a component of a liquid crystal composition having negative dielectric anisotropy, which is usable for liquid crystal display devices having these operating modes. See the patent documents No. 1 to No. 4.

For example, the compound shown by formula (s-1), where hydrogen on the benzene ring had been replaced by fluorine, has been studied in the patent document No. 1. A compound having alkenyl shown by formula (s-2), where hydrogen on the benzene ring had been replaced by fluorine, has been studied in the patent document No. 2.

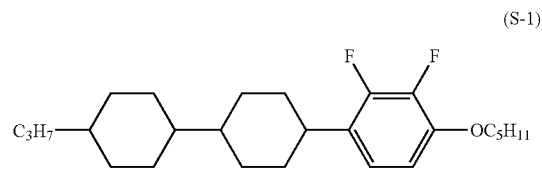

(S-1)

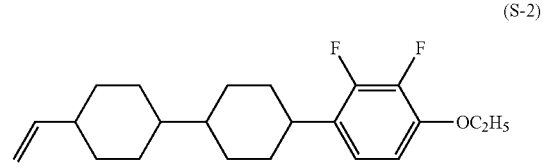

(S-2)

However, the compound shown by formula (s-1), where hydrogen on the benzene ring has been replaced by fluorine, has a small optical anisotropy, and the optical anisotropy is not sufficiently large even in the compound shown by formula (s-2). The patent document No. 3 discloses the compounds shown by formulas (s-3), (s-4) and (s-5) as a compound where the lateral group is a polar group such as halogen.

In addition to these, the patent document No. 4 discloses the compound shown by formulas (s-6), (s-7), (s-8) and (s-9), where the lateral group is a polar group such as halogen, however a compound having a biphenyl ring with a fluorine atom or a chlorine atom in the 2-, 3- and 3'-positions and a —CH$_2$O— and —COO— bonding group, as this patent application shows, is not disclosed.

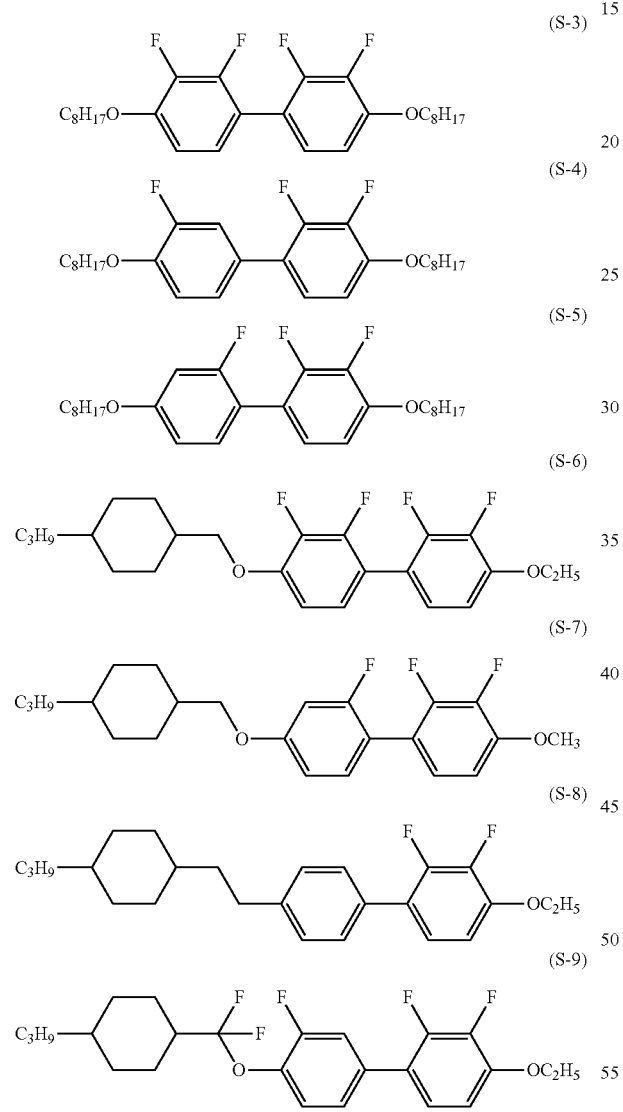

Further, all of the compounds shown by formulas (s-3), (s-4) and (s-5) have a small optical anisotropy, a low maximum temperature of a nematic phase and no liquid crystal phases. Furthermore, since all of the compounds shown by formulas (s-5), (s-7), (s-8) and (s-9) have a small optical anisotropy, a low maximum temperature of a nematic phase and a small dielectric anisotropy, they cannot decrease the driving voltage in a liquid crystal composition including them. The compounds shown by formulas (s-3) and (s-6) do not have a sufficient compatibility at low temperature, for instance, and a further improvement remains to be done.

PRIOR ART

Patent Document

Patent document No. 1: JP H02-004725 A (1990).
Patent document No. 2: JP 2000-053602 A.
Patent document No. 3: JP H09-052852 A (1997).
Patent document No. 4: JP 2007-2132 A.
Patent document No. 5: WO 2009-034867 A.

OUTLINE OF THE INVENTION

Subject to be Solved by the Invention

Accordingly, there are still subjects to be solved even in a liquid crystal display device having an operating mode such as an IPS mode, a VA mode and a PSA mode, and, for example, an improvement of the response speed, an improvement of the contrast and a decrease in the driving voltage are expected.

A display device operated in the IPS mode, the VA mode or the PSA mode described above mainly contains a liquid crystal composition having negative dielectric anisotropy, and a liquid crystal compound included in this liquid crystal composition is required to have the following characteristics shown in items (1) to (8), in order to improve the characteristics described above. That is to say:

(1) having chemical stability and physical stability,
(2) having a high clearing point, and the clearing point means the transition temperature between a liquid crystal phase and an isotropic phase,
(3) having a low minimum temperature of a liquid crystal phase, and the liquid crystal phase means a nematic phase, a smectic phase and so forth,
(4) having a small viscosity,
(5) having a suitable optical anisotropy,
(6) having a suitable negative dielectric anisotropy, and many compounds having a large dielectric anisotropy have a large viscosity,
(7) having a suitable elastic constant $K_{33}$ and $K_{11}$ ($K_{33}$: a bend elastic constant; $K_{11}$: a splay elastic constant), and
(8) having an excellent compatibility with other liquid crystal compounds.

A voltage holding ratio can be increased if a composition including a chemically and physically stable liquid crystal compound which is described in item (1) is used for a display device.

The temperature range of a nematic phase can be increased in a composition that includes a liquid crystal compound having a high clearing point or a low minimum temperature of a liquid crystal phase which is described in item (2) or (3), and thus the display device can be used in a wide temperature range.

The response speed can be improved if a composition that includes a compound having a small viscosity which is described in item (4) or a compound having a suitable elastic constant $K_{33}$ which is described in item (7) is used for a display device. The contrast of a display device can be improved if a composition that includes a compound having a suitable optical anisotropy which is described in item (5) is used for a display device.

The threshold voltage of the liquid crystal composition including this compound can be decreased, if a liquid crystal compound has a large negative dielectric anisotropy. Thus, the driving voltage of the display device can be decreased and the electric power consumption can also be decreased if the display device contains a composition that includes a compound having a suitable negative dielectric anisotropy which is described in item (6). The driving voltage of a display device can be adjusted and the electric power consumption can also be adjusted if the display device contains a composition that includes a compound having a suitable elastic constant $K_{33}$ which is described in item (7).

A liquid crystal compound is generally used in the form of a composition prepared by mixing it with many other liquid crystal compounds in order to exhibit characteristics that are difficult to be attained by a single compound. Accordingly, it is desirable that a liquid crystal compound used for a display device has an excellent compatibility with other liquid crystal compounds and so forth, which is described in item (8). Since the display device may also be used in a wide temperature range including a lower temperature than the freezing point, the compound that exhibits an excellent compatibility even at a low temperature may be desirable.

The first aim of the invention is to solve the subject of the conventional technique described above and to provide a liquid crystal compound that has general physical properties necessary for a liquid crystal compound, that is to say, stability to heat, light or the like, a small viscosity, a suitable refractive index anisotropy, a suitable negative dielectric anisotropy, a suitable elastic constant $K_{33}$ and $K_{11}$, steep electro-optic characteristics, a wide temperature range of a nematic phase and an excellent compatibility with other liquid crystal compounds, and especially to provide a liquid crystal compound having a wide temperature range of a nematic phase.

The second aim is to provide a liquid crystal composition that includes this liquid crystal compound and has a high maximum temperature of a nematic phase, a low minimum temperature of a nematic phase, a small viscosity, a suitable optical anisotropy and a low threshold voltage, and especially to provide a liquid crystal composition that has a high maximum temperature of a nematic phase and a low minimum temperature of a nematic phase.

The third aim is to provide a liquid crystal display device that contains this composition and has a wide temperature range in which the device can be used, a short response time, small electric power consumption, a large contrast and a low driving voltage, and especially to provide a liquid crystal display device that has a wide temperature range in which the device can be used.

Means for Solving the Subject

The inventors had studied the above subjects earnestly, and found that a biphenyl compound having a polar group such as halogen as a lateral group had an extremely large elastic constant $K_{33}$ ($K_{33}$: a bend elastic constant), an extremely small viscosity, a high chemical stability, a wide temperature range of a nematic phase, a large refractive index anisotropy and negative dielectric anisotropy. The inventors also found that a liquid crystal display device having steep electro-optic characteristics, a short response time, a wide operating temperature range and a small driving electric power can be made by use of the liquid crystal composition including the compound described above. Accordingly, the compound described above is suitable for a liquid crystal display device, especially for a liquid crystal display device having a mode such as ECB, IPS, VA or PSA, which is widely used at present, and the inventors completed the invention.

The point of the invention includes the following items.
Item 1. A compound represented by formula (1).

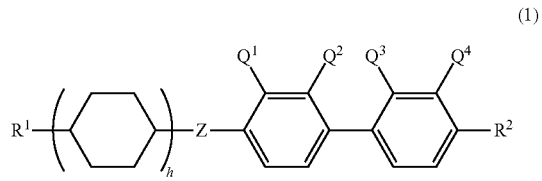

In the formula,
$R^1$ and $R^2$ are each independently alkyl having 1 to 9 carbons or alkenyl having 2 to 9 carbons, alkoxy having 1 to 8 carbons or alkenyloxy having 2 to 8 carbons;
$Q^1$ and $Q^4$ are each independently fluorine or chlorine;
$Q^2$ and $Q^3$ are each independently hydrogen, fluorine or chlorine, and one of $Q^2$ and $Q^3$ is hydrogen and the other is fluorine or chlorine;
Z is —CH$_2$O— or —COO—; and
h is 1 or 2, and h is 1 when both $Q^1$ and $Q^2$ are fluorine.
Item 2. The compound according to item 1, wherein $Q^1$, $Q^2$ and $Q^4$ are fluorine and $Q^3$ is hydrogen.
Item 3. The compound according to item 1, wherein $Q^1$, $Q^3$ and $Q^4$ are fluorine and $Q^2$ is hydrogen.
Item 4. The compound according to item 1, wherein Z is —CH$_2$O—.
Item 5. A liquid crystal composition including at least two compounds, where it is characterized by including at least one of the compounds according to item 1.
Item 6. The liquid crystal composition according to item 5, including at least one compound selected from the group of compounds represented by formulas (2), (3) and (4).

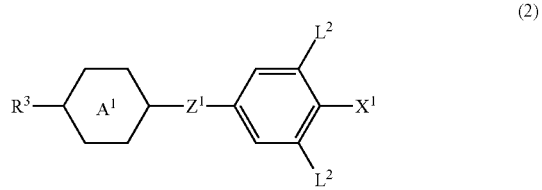

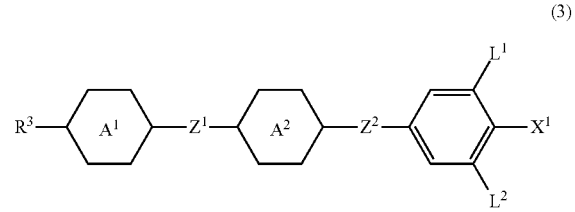

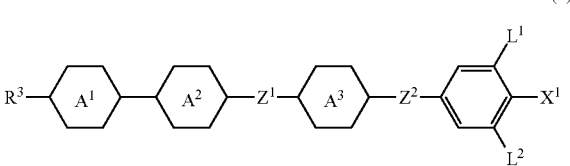

In the formulas,
$R^3$ is independently alkyl having 1 to 10 carbons or alkenyl having 2 to 10 carbons, and in the alkyl and the alkenyl, arbitrary hydrogen may be replaced by fluorine and arbitrary —CH$_2$— may be replaced by —O—;
$X^1$ is independently fluorine, chlorine, —OCF$_3$, —OCHF$_2$, —CF$_3$, —CHF$_2$, —CH$_2$F, —OCF$_2$CHF$_2$ or —OCF$_2$CHFCF$_3$;

the ring $A^1$, the ring $A^2$ and the ring $A^3$ are independently 1,4-cyclohexylene, 1,3-dioxane-2,5-diyl, pyrimidine-2,5-diyl, 1-pyran-2,5-diyl, or 1,4-phenylene in which arbitrary hydrogen may be replaced fluorine;

$Z^1$ and $Z^2$ are independently —(CH$_2$)$_2$—, —(CH$_2$)$_4$—, —COO—, —CF$_2$O—, —OCF$_2$—, —CH=CH—, —C≡C—, —CH$_2$O— or a single bond; and $L^1$ and $L^2$ are independently hydrogen or fluorine.

$Z^3$ is —(CH$_2$)$_2$—, —COO—, —CF$_2$O—, —OCF$_2$—, —C≡C—, —CH$_2$O— or a single bond;

$L^3$ and $L^4$ are independently hydrogen or fluorine; and q is 0, 1 or 2, r is 0 or 1, and q+r is 0, 1 or 2.

Item 8. The liquid crystal composition according to item 5, including at least one compound selected from the group of compounds represented by formulas (6), (7), (8), (9), (10) and (11).

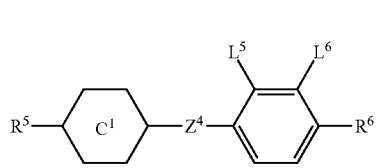

(6)

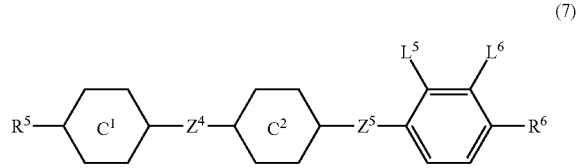

(7)

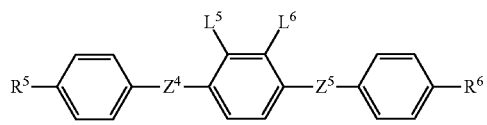

(8)

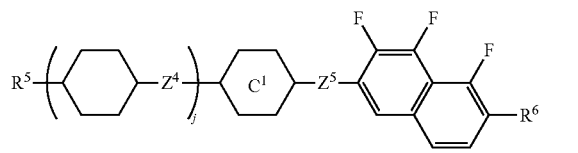

(9)

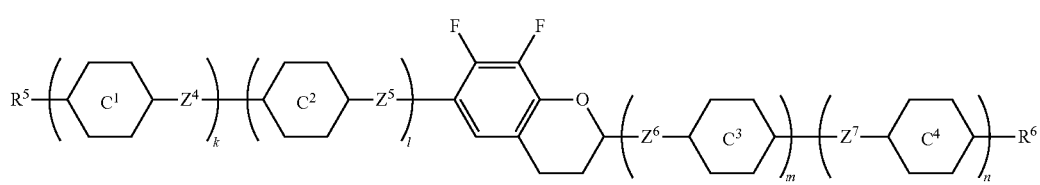

(10)

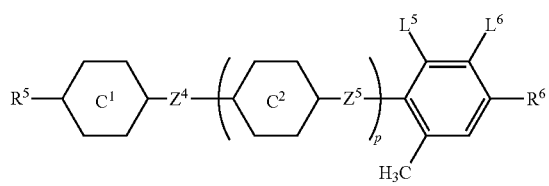

(11)

Item 7. The liquid crystal composition according to item 5, including at least one compound selected from the group of compounds represented by formula (5).

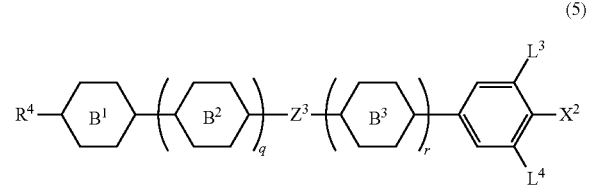

(5)

In the formula, $R^4$ is alkyl having 1 to 10 carbons or alkenyl having 2 to 10 carbons, and in the alkyl and the alkenyl, arbitrary hydrogen maybe replaced by fluorine and arbitrary —CH$_2$— may be replaced by —O—;

$X^2$ is —C≡N or —C≡C—C≡N;

the ring $B^1$, the ring $B^2$ and the ring $B^3$ are independently 1,4-cyclohexylene, 1,3-dioxane-2,5-diyl, 1-pyran-2,5-diyl, pyrimidine-2,5-diyl, or 1,4-phenylene in which arbitrary hydrogen may be replaced fluorine;

In the formulas, $R^5$ and $R^6$ are independently alkyl having 1 to 10 carbons or alkenyl having 2 to 10 carbons, and in the alkyl and the alkenyl, arbitrary hydrogen may be replaced by fluorine and arbitrary —CH$_2$— may be replaced by —O—;

the ring $C^1$, the ring $C^2$, the ring $C^3$ and the ring $C^4$ are independently 1,4-cyclohexylene, 1,4-cyclohexylene, 1,4-phenylene, 6-pyran-2,5-diyl or decahydro-2,6-naphthalene;

$Z^4$, $Z^5$, $Z^6$ and $Z^7$ are independently —(CH$_2$)$_2$—, —COO—, —CH$_2$O—, —OCF$_2$—, —OCF$_2$(CH$_2$)$_2$— or a single bond;

$L^5$ and $L^6$ are independently fluorine or chlorine; and j, k, l, m, n and p are independently 0 or 1, and k+l+m+n is 1 or 2.

Item 9. The liquid crystal composition according to item 5, including at least one compound selected from the group of compounds represented by formulas (12), (13) and (14).

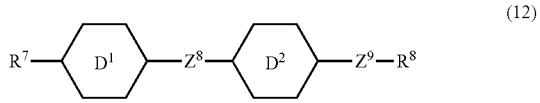

(12)

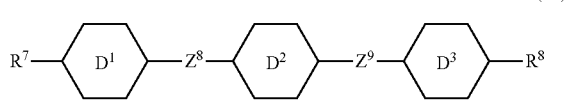

(13)

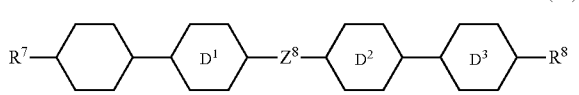

(14)

In the formulas,

R⁷ and R⁸ are independently alkyl having 1 to 10 carbons or alkenyl having 2 to 10 carbons, and in the alkyl and the alkenyl, arbitrary —CH$_2$— may be replaced by —O—;

the ring D¹, the ring D² and the ring D³ are independently 1,4-cyclohexylene, pyrimidine-2,5-diyl, 1,4-phenylene, 2-fluoro-1,4-phenylene, 3-fluoro-1,4-phenylene or 2,5-difluoro-1,4-phenylene; and Z⁸ and Z⁹ are independently —C≡C—, —COO—, —(CH$_2$)$_2$—, —CH═CH— or a single bond.

Item 10. The liquid crystal composition according to item 6, further including at least one compound selected from the group of compounds represented by formula (5).

Item 11. The liquid crystal composition according to item 6, further including at least one compound selected from the group of compounds represented by formulas (12), (13) and (14).

Item 12. The liquid crystal composition according to item 7, further including at least one compound selected from the group of compounds represented by formulas (12), (13) and (14).

Item 13. The liquid crystal composition according to item 8, further including at least one compound selected from the group of compounds represented by formulas (12), (13) and (14).

Item 14. The liquid crystal composition according to item 5, further including at least one optically active compound and/or polymerizable compound.

Item 15. The liquid crystal composition according to item 5, further including at least one antioxidant and/or ultraviolet light absorber.

Item 16. A liquid crystal display device containing the liquid crystal composition according to item 5.

Effect of the Invention

The compounds of the invention have general physical properties necessary for a liquid crystal compound, stability to heat, light or the like, a small viscosity, a suitable optical anisotropy, a suitable negative dielectric anisotropy and an excellent compatibility with other liquid crystal compounds. The liquid crystal composition of the invention includes at least one of these compounds and has a high maximum temperature of a nematic phase, a low minimum temperature of a nematic phase, a small viscosity, a suitable optical anisotropy, a suitable elastic constant K$_{33}$ (K$_{33}$: a bend elastic constant) and a low threshold voltage. The liquid crystal display device of the invention contains this composition and has a wide temperature range in which the device can be used, a short response time, small electric power consumption, a large contrast ratio and a low driving voltage.

That is to say, the compound of the invention has an excellent compatibility with other liquid crystal materials, a small viscosity and a wide temperature range of liquid crystals in comparison with known compounds having a similar structure. The compound has a low threshold voltage and a relatively small viscosity in comparison with a similar compound. Further, the compound of the invention is sufficiently stable physically and chemically under conditions that the liquid crystal display device is usually used, and is quite excellent as a component of a nematic liquid crystal composition, and can suitably be used as a component of the liquid crystal composition for use in a TN mode, a STN mode, a TFT mode, a VA mode, an IPS mode and a PSA mode.

EMBODIMENTS TO CARRY OUT THE INVENTION

Usage of the terms in this specification is as follows. A liquid crystal compound is a generic term for a compound having a liquid crystal phase such as a nematic phase or a smectic phase, and also for a compound having no liquid crystal phases but useful as a component for a liquid crystal composition. The terms, a liquid crystal compound, a liquid crystal composition and a liquid crystal display device may be abbreviated to a compound, a composition and a device, respectively. A liquid crystal display device is a generic term for a liquid crystal display panel and a liquid crystal display module. A maximum temperature of a nematic phase is the phase transition temperature between a nematic phase and an isotropic phase, and may simply be abbreviated to the maximum temperature. A minimum temperature of the nematic phase may simply be abbreviated to the minimum temperature. The compound represented by formula (1) may be abbreviated to the compound (1). This abbreviation may apply to the compound represented by formula (2) or the like. In formulas (1) to (14), the symbols A¹, B¹, C¹, D¹ or the like surrounded by a hexagonal shape correspond to the ring A¹, the ring B¹, the ring C¹, the ring D¹ or the like, respectively. A plurality of the same symbols were used in the same or different formulas, where these symbols may mean the same or different.

"Arbitrary" is used not only in cases where the position is arbitrary but also in cases where the number is arbitrary. However, it is not used in cases where the number is 0 (zero). The expression "arbitrary A may be replaced by B, C or D" includes cases where arbitrary A is replaced by B, and arbitrary A is replaced by C, and arbitrary A is replaced by D, and also cases where a plurality of A are replaced by at least two of B, C and/or D. For example, "alkyl in which arbitrary —CH$_2$— may be replaced by —O— or —CH═CH—" includes alkyl, alkenyl, alkoxy, alkoxyalkyl, alkoxyalkenyl and alkenyloxyalkyl. Incidentally, it is undesirable in the invention that two successive —CH$_2$— are replaced by —O— to give —O—O—. It is also undesirable that the terminal —CH$_2$— in the alkyl is replaced by —O—. The amount of a compound that is expressed as a percentage means a weight percentage (% by weight) based on the total weight of the composition. The invention will be further explained below.

The Liquid Crystal Compound

First, the compound (1) of the invention will further be explained.

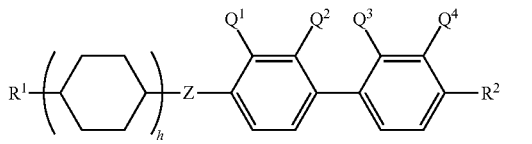
(1)

The structure of the compound (1) is divided into the structural units of the left-terminal group, the bonding group, the ring structure and the right-terminal group, all of which are described in Table 9 of Examples shown below, and each of the structural unit will be explained. The compound (1) is a three-ring or four-ring compound having a biphenyl ring with a fluorine atom or a chlorine atom in the 2-, 3- and 3'-positions. This compound is quite stable physically and chemically under conditions that the device is usually used, and has an excellent compatibility with other liquid crystal compounds. A composition including this compound is stable under conditions that the device is usually used. This compound does not deposit its crystals (or its smectic phase) even when the composition is kept in storage at a low temperature. The compound has general physical properties necessary for a compound, a suitable optical anisotropy and a suitable negative dielectric anisotropy.

Physical properties such as optical anisotropy and dielectric anisotropy can be adjusted arbitrarily by a suitable selection of the terminal group, the ring structure and the bonding group in the compound (1). The effect of a desirable terminal group and bonding group, and their kinds in the compound (1) on the physical properties of the compound (1) will be explained below.

In $R^1$ and $R^2$ of the compound (1), it is desirable that they are straight-chain. When they are straight-chain, the compound has a wide temperature range of a liquid crystal phase and a small viscosity. When one of $R^1$ and $R^2$ is branched chain, the compound has an excellent compatibility with other liquid crystal compounds. When one of $R^1$ and $R^2$ is an optically active group, the compound is useful as a chiral dopant. A reverse twisted domain which will occur in a device can be prevented by the addition of this compound to the composition. A compound that $R^1$ and $R^2$ are not an optically active group is useful as a component of the composition.

$R^1$ and $R^2$ in the compound (1) are each independently alkyl having 1 to 9 carbons or alkenyl having 2 to 9 carbons, alkoxy having 1 to 8 carbons or alkenyloxy having 2 to 8 carbons. With regard to $R^1$ and $R^2$, groups can be selected depending on intended use of the compound, by reference to the following specific examples. Here, the alkenyl or the alkenyloxy is a group in which arbitrary —(CH$_2$)$_2$— in the alkyl is replaced by —CH=CH—. An example is as follows. Examples of CH$_3$(CH$_2$)$_3$— in which arbitrary —(CH$_2$)$_2$— is replaced by —CH=CH— are H$_2$C=CH—(CH$_2$)$_2$—, CH$_3$—CH=CH—CH$_2$— and so forth. As is shown above, "arbitrary" means "at least one selected without distinction." CH$_2$=CH—CH$_2$—CH$_2$—CH=CH— in which the double bond is not adjacent is preferable to CH$_2$=CH—CH=CH—CH$_2$—CH$_2$— in which the double bond is adjacent in consideration of the stability of the compound.

A desirable configuration of —CH=CH— in the alkenyl depends on the position of the double bond. Trans configuration is preferable in the alkenyl having the double bond in the odd position such as —CH=CHCH$_3$, —CH=CHC$_2$H$_5$, —CH=CHC$_3$H$_7$ and —CH=CHC$_4$H$_9$. An alkenyl compound having such a desirable configuration has a wide temperature range of a liquid crystal phase, a large elastic constant $K_{33}$ and a small viscosity, and it can increase the maximum temperature ($T_{NI}$) of a nematic phase if this liquid crystal compound is added to a liquid crystal composition. Cis configuration is preferable in the alkenyl having the double bond in the even position such as —CH$_2$CH=CHCH$_3$, —CH$_2$CH=CHC$_2$H$_5$ and —CH$_2$CH=CHC$_3$H$_7$.

Specific examples of desirable $R^1$ and $R^2$ are —CH$_3$, —C$_2$H$_5$, —C$_3$H$_7$, —C$_4$H$_9$, —C$_5$H$_{11}$, —C$_6$H$_{13}$, —C$_7$H$_{15}$, —C$_8$H$_{17}$, —C$_9$H$_{19}$, —OCH$_3$, —OC$_2$H$_5$, —OC$_3$H$_7$, —OC$_4$H$_9$, —OC$_5$H$_{11}$, —OC$_6$H$_{13}$, —OC$_7$H$_{15}$, —OC$_8$H$_{17}$, —CH=CH$_2$, —CH=CHCH$_3$, —CH=CHC$_2$H$_5$, —(CH$_2$)$_2$CH=CH$_2$, —CH=CHC$_3$H$_7$, —(CH$_2$)$_2$CH=CHCH$_3$, —CH=CHC$_4$H$_9$, —(CH$_2$)$_2$CH=CHC$_2$H$_5$, —CH=CH(CH$_2$)$_2$CH=CH$_2$, —CH=CHC$_5$H$_9$, —(CH$_2$)$_2$CH=CHC$_3$H$_7$, —CH=CH(CH$_2$)$_2$CH=CHCH$_3$, —CH=CHC$_6$H$_9$, —(CH$_2$)$_2$CH=CHC$_4$H$_9$, —CH=CH(CH$_2$)$_2$CH=CHC$_2$H$_5$, —OCH=CH$_2$, —OCH=CHCH$_3$, —OCH$_2$CH=CH$_2$, —OCH=CHC$_2$H$_5$, —OCH$_2$CH=CHCH$_3$, —O(CH$_2$)$_2$CH=CH$_2$, —OCH=CHC$_3$H$_7$, —OCH$_2$CH=CHC$_2$H$_5$, —O(CH$_2$)$_2$CH=CHCH$_3$, —O(CH$_2$)$_3$CH=CH$_2$, —(CH$_2$)$_2$CH=CH(CH$_2$)$_2$CH=CH$_2$, —(CH$_2$)$_2$CH=CH(CH$_2$)$_2$CH=CHCH$_3$, —OCH$_2$CH=CH(CH$_2$)$_2$CH=CH$_2$ and —OCH$_2$CH=CH(CH$_2$)$_2$CH=CHCH$_3$.

Specific examples of more desirable $R^1$ and $R^2$ are —CH$_3$, —C$_2$H$_5$, —C$_3$H$_7$, —C$_4$H$_9$, —C$_5$H$_{11}$, —C$_6$H$_{13}$, —C$_7$H$_{15}$, —C$_8$H$_{17}$, —C$_9$H$_{19}$, —OCH$_3$, —OC$_2$H$_5$, —OC$_3$H$_7$, —OC$_4$H$_9$, —OC$_5$H$_{11}$, —OC$_6$H$_{13}$, —CH=CH$_2$, —CH=CHCH$_3$, —(CH$_2$)$_2$CH=CH$_2$, —(CH$_2$)$_2$CH=CHCH$_3$, —OCH=CH$_2$, —OCH=CHCH$_3$, —OCH$_2$CH=CH$_2$, —OCH=CHC$_2$H$_5$, —OCH$_2$CH=CHCH$_3$, —O(CH$_2$)$_2$CH=CH$_2$, —OCH=CHC$_3$H$_7$, —OCH$_2$CH=CHC$_2$H$_5$, —(CH$_2$)$_2$CH=CHCH$_3$ and —O(CH$_2$)$_3$CH=CH$_2$.

Specific examples of the most desirable $R^1$ and $R^2$ are —CH$_3$, —C$_3$H$_7$, —C$_5$H$_{11}$, —C$_7$H$_{15}$, —C$_9$H$_{19}$, —OCH$_3$, —OC$_2$H$_5$, —OC$_4$H$_9$, —OC$_6$H$_{13}$, —OC$_8$H$_{17}$, —CH=CH$_2$, —CH=CHCH$_3$, —(CH$_2$)$_2$CH=CH$_2$, —(CH$_2$)$_2$CH=CHCH$_3$, —OCH=CH$_2$ and —OCH$_2$CH=CH$_2$.

With regard to the lateral group in the compound (1), $Q^1$ and $Q^4$ are each independently fluorine or chlorine; $Q^2$ and $Q^3$ are each independently hydrogen, fluorine or chlorine; and one of $Q^2$ and $Q^3$ is hydrogen and the other is fluorine or chlorine.

In the compound (1), the dielectric anisotropy is large negatively. A compound having a large dielectric anisotropy is useful as a component for decreasing the threshold voltage of the composition.

The bonding group Z in the compound (1) is —COO— or —CH$_2$O—. The optical anisotropy is large negative by the effect of this bonding group. The viscosity is small when the bonding group Z is —CH$_2$O—.

When a liquid crystal compound has a structure shown by the liquid crystal compound (1), it has a suitable negative dielectric anisotropy and a quite excellent compatibility with other liquid crystal compounds. The compound also has stability to heat, light or the like, a wide temperature range of a nematic phase, a small viscosity, a large optical anisotropy and a suitable elastic constant $K_{33}$ or $K_{11}$. The viscosity is small when the liquid crystal compound (1) has three rings. The maximum temperature is high when the liquid crystal compound (1) has four rings. As described above, a compound having desired physical properties can be obtained by a suitable selection of the kinds of the terminal group, the ring structure and the bonding group, and the number of the rings.

The liquid crystal composition including the liquid crystal compound (1) is stable under conditions that a liquid crystal display device is usually used, and this compound does not deposit its crystals (or its smectic phase) even when the composition is kept in storage at a low temperature.

Accordingly, the liquid crystal compound (1) can suitably be utilized for a liquid crystal composition used for a liquid crystal display device having a display mode such as PC, TN, STN, ECB, OCB, IPS, VA or PSA, and especially for a liquid crystal composition used for a liquid crystal display device having a display mode such as IPS, VA or PSA.

The compound shown by formula (1) of the invention is obtained by an introduction of predetermined groups into $R^1$, $R^2$, $Q^1$, $Q^2$, $Q^3$, $Q^4$ and Z in formula (1), and the introduction of such groups can be carried out by known and general synthetic organic methods. Representative examples of the synthesis include the methods described in "Vol. 14: Synthesis and Reaction of Organic Compounds" (1978) in New Experimental Chemistry Course (Shin Jikken Kagaku Kouza, in Japanese; Maruzen Co., Ltd.), or "Vol. 19 to Vol. 26: Organic Synthesis I to VIII" (1991) in Experimental Chemistry Course (Jikken Kagaku Kouza, in Japanese; the fourth edition, Maruzen Co., Ltd.).

With regard to an example of the method for the formation of the bonding group Z, first the scheme will be shown, and next the scheme will be explained in item (I) and (II). In this scheme, $MSG^1$ or $MSG^2$ is a monovalent organic group having at least one ring. A plurality of $MSG^1$ (or $MSG^2$) used in the scheme may be the same or different. The compounds (1A) and (1B) correspond to the compound (1).

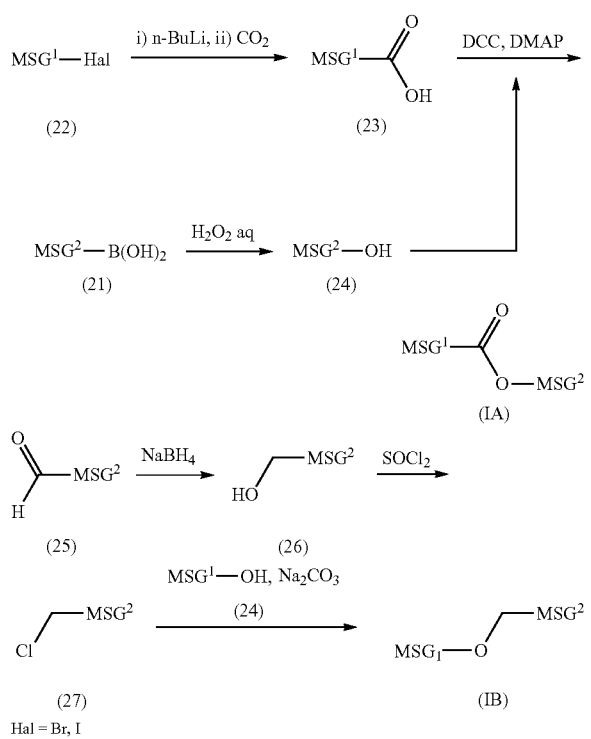

(I) Formation of —COO—

The compound (22) is allowed to react with n-butyllithium, and then with carbon dioxide to give the carboxylic acid (23). The compound (1A) having —COO— is prepared by dehydration of the compound (23) and the phenol (24) prepared according to known methods in the presence of DCC (1,3-dicyclohexylcarbodiimide) and DMAP (4-dimethylaminopyridine).

(II) Formation of —CH₂O—

The compound (25) is reduced with a reducing agent such as sodium borohydride to give the compound (26). Halogenation of the compound (26) with thionyl chloride or the like gives the compound (27). The compound (1B) is prepared by the reaction of the compound (27) with the compound (24) in the presence of a base such as sodium carbonate.

Next, an example of the production of the liquid crystal compounds (1), namely the liquid crystal compound represented by formula (1) described above will be shown. Incidentally, $R^1$, $R^2$, Z, $Q^1$, $Q^2$, $Q^3$, $Q^4$ and h in the synthetic routes below has the same meanings as described previously.

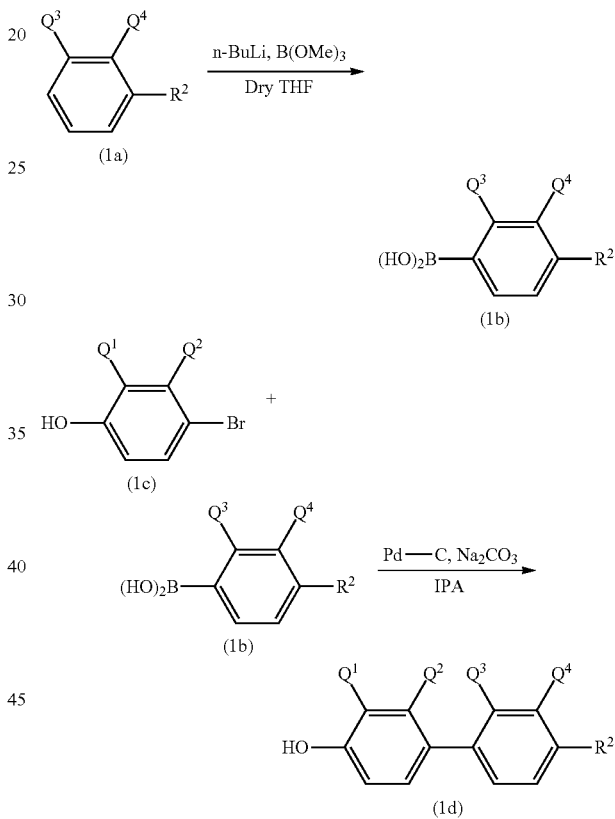

A lithium salt is prepared by the reaction of the compound (1a) with n-butyllithium, and the reaction of the salt with a boric acid ester, followed by hydrolysis under acidic conditions give the dihydroxyborane derivative (1b). The compound (1b) is allowed to react with the phenol derivative (1c) in the presence of a base such as sodium carbonate and a catalyst such as palladium on carbon to give the biphenyl derivative (1d).

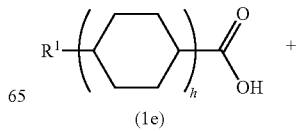

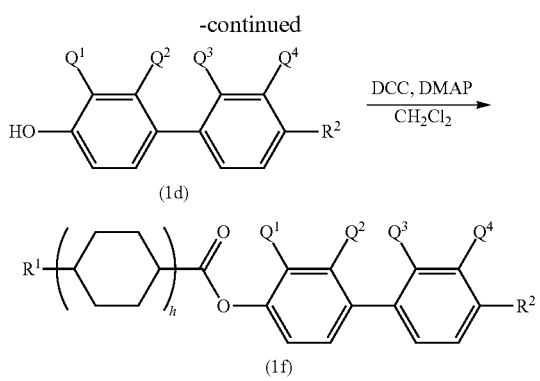

The liquid crystal compound (1f), which is one example in the liquid crystal compound (1) of the invention, can be produced by dehydration of the compound (1e) and the biphenyl derivative (1d) in the presence of DCC (1,3-dicyclohexylcarbodiimide) and DMAP (4-dimethylaminopyridine).

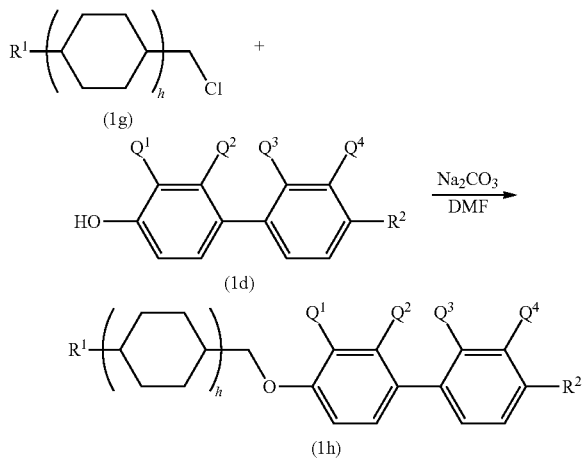

In the compounds shown by formula (1) of the invention, more desirable compounds are the compounds shown by formulas (1-1) to (1-4).

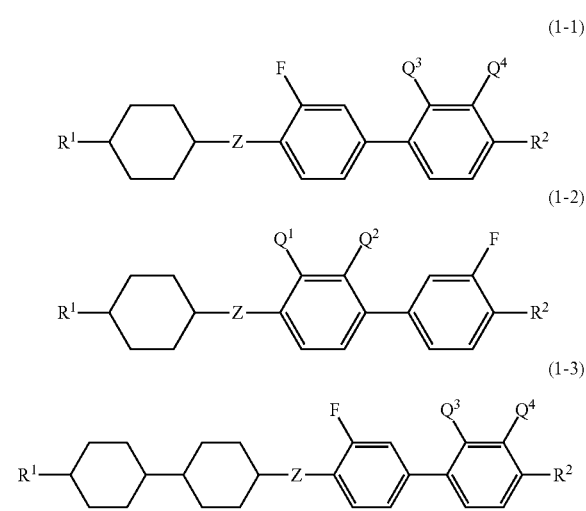

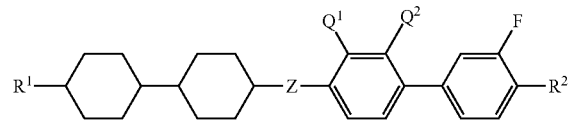

When the compounds shown by formula (1) are the compounds shown by formulas (1-1) and (1-2), the compatibility with other liquid crystal compounds is excellent and the viscosity is small. When the compounds shown by formula (1) are the compounds shown by formulas (1-3) and (1-4), the maximum temperature of a nematic phase ($T_{NI}$) is high.

(II) Formation of —CH$_2$O—

The liquid crystal compound (1h), which is one example in the liquid crystal compound (1) of the invention, can be produced by the reaction of the compound (1g) with the biphenyl derivative (1d) in the presence of a base such as sodium carbonate.

The Liquid Crystal Composition

Second, the liquid crystal composition of the invention will be further explained in detail. The liquid crystal composition of the invention is required to include the compound shown by formula (1) of the invention described above as the component A. A composition of the component A only or a composition of the component A and another component in which the name of the component is not shown in this specification is reasonable. Furthermore, the liquid crystal composition of the invention, which has a variety of characteristics, can be provided by the addition of a component selected from the components B, C, D and the component E, these of which will be shown below, in addition to the component A.

Desirable components that will be added to the component A are the component B that is at least one kind of compound selected from the group of formulas (2), (3) and (4) described above, the component C that is at least one kind of compound selected from the group of formulas (5) described above, the component D that is at least one kind of compound selected from the group of formulas (6), (7), (8), (9), (10) and (11) described above, or the component E that is at least one kind of compound selected from the group of formulas (12), (13) and (14) described above. Each component can be suitably combined and used depending on the purpose of the composition.

In each component, which is used in the invention, of the liquid crystal composition, there are no major differences in characteristics even if the component is an analogue composed of isotopes of each element.

Suitable examples of the compounds shown by formula (2) in the component B described above include formulas (2-1) to (2-16), and suitable examples of the compound shown by formula (3) include the compounds shown by formulas (3-1) to (3-112), and suitable examples of formula (4) include formulas (4-1) to (4-54).

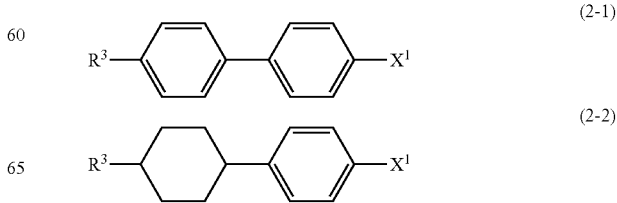

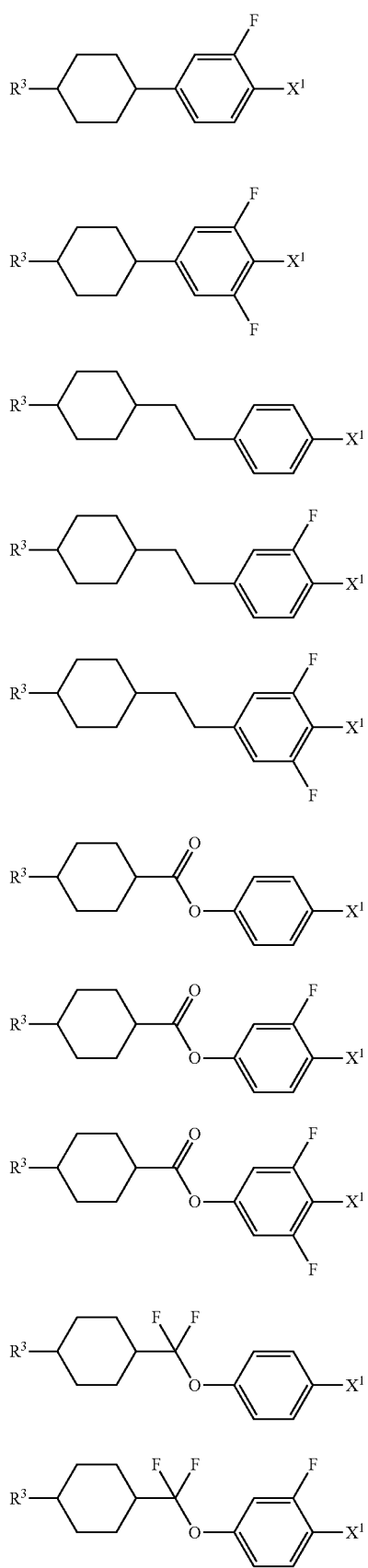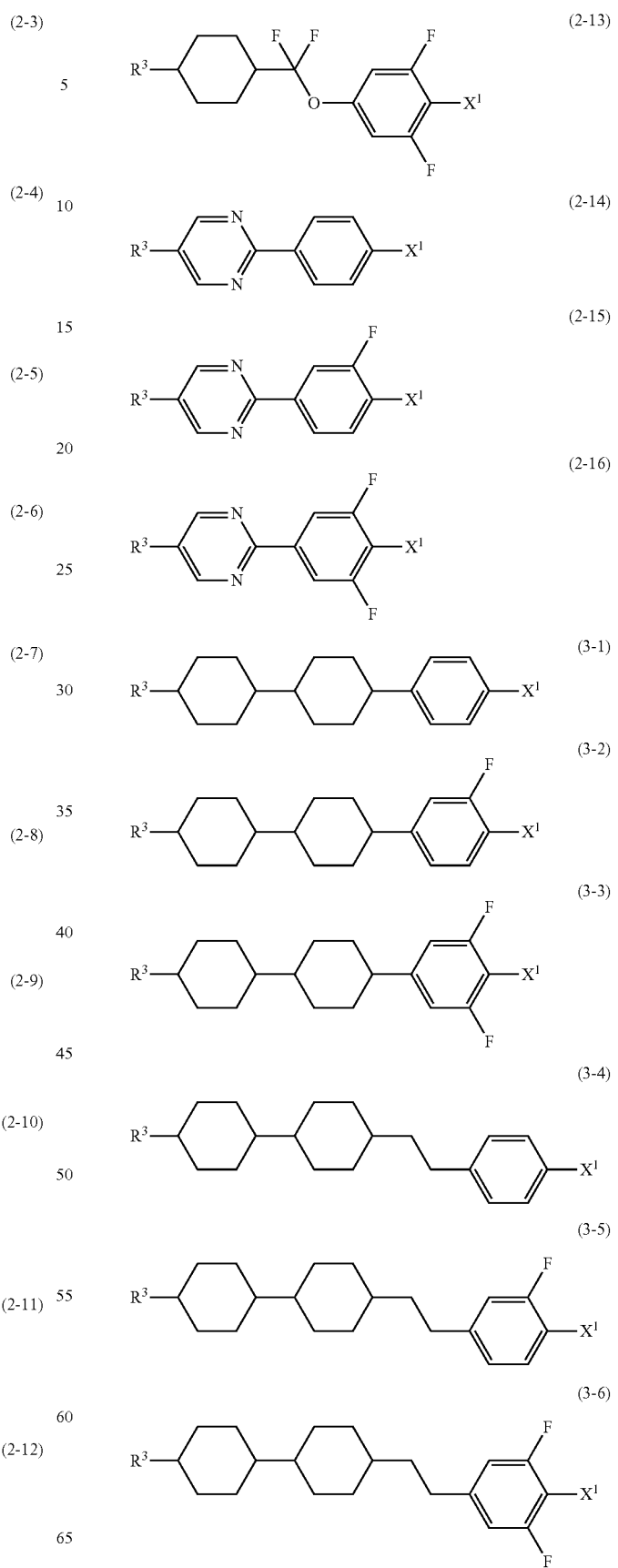

(3-7) 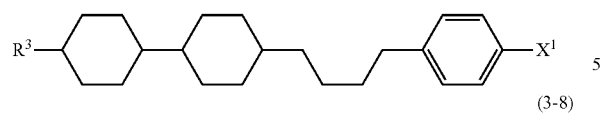
(3-8) 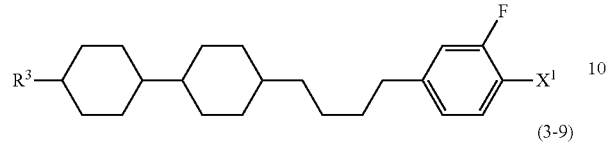
(3-9) 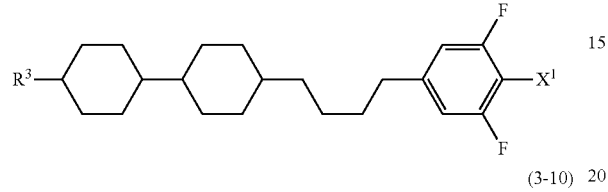
(3-10) 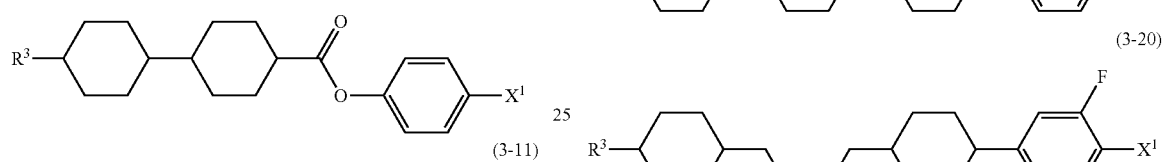
(3-11) 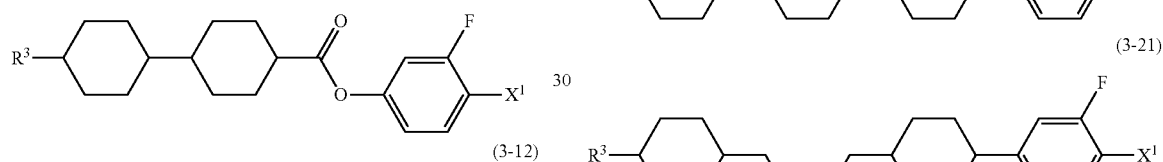
(3-12) 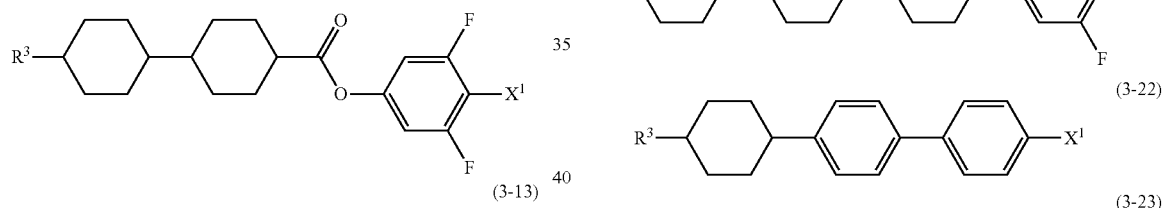
(3-13) 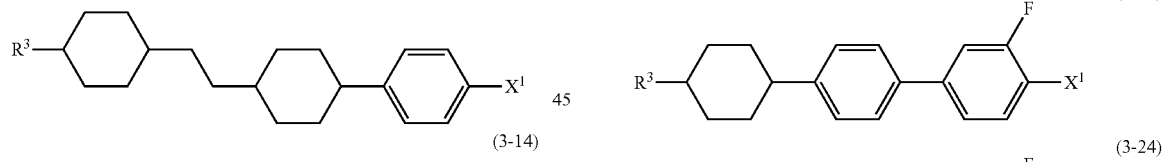
(3-14) 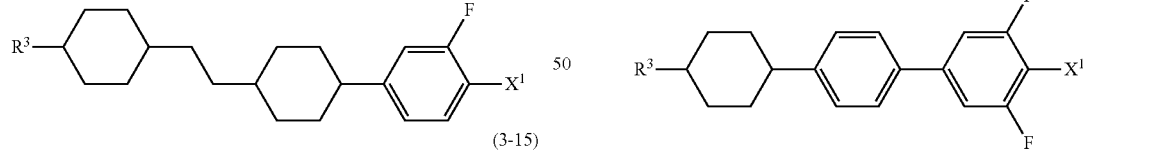
(3-15) 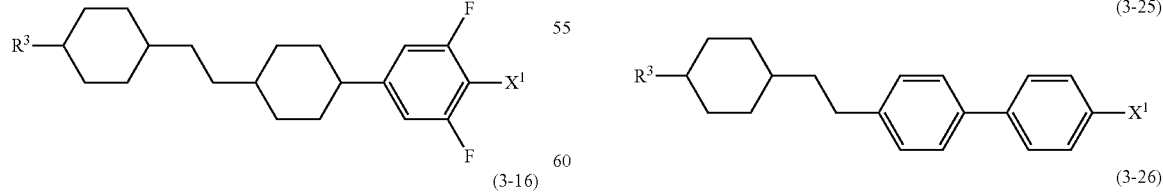
(3-17) 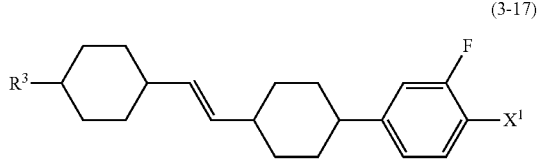
(3-18) 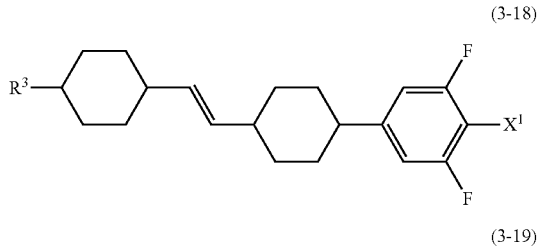
(3-19) 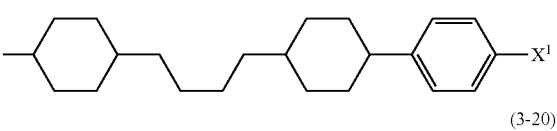
(3-20) 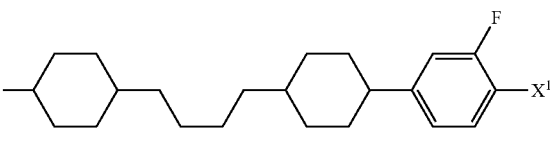
(3-21) 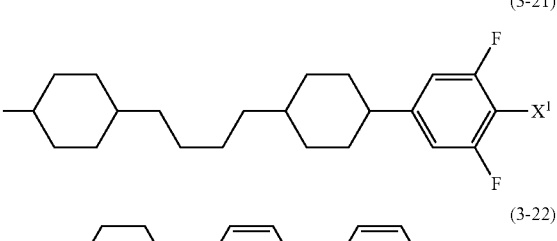
(3-22) 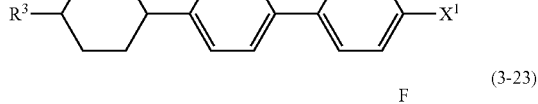
(3-23) 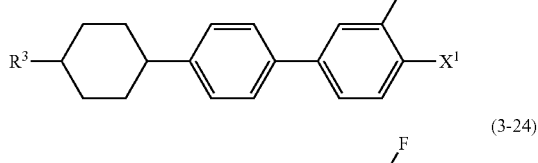
(3-24) 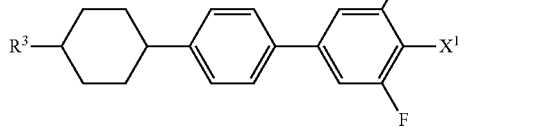
(3-25) 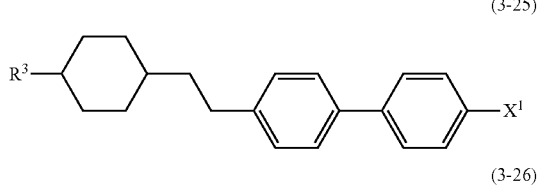
(3-26) 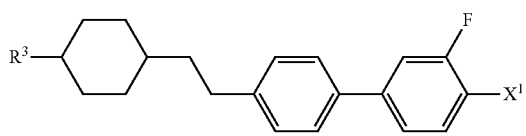

(3-27) 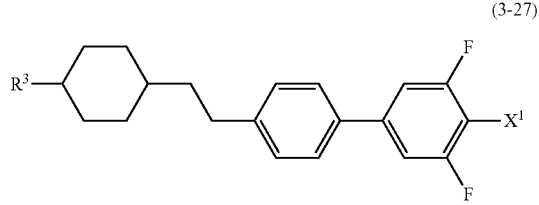
(3-28) 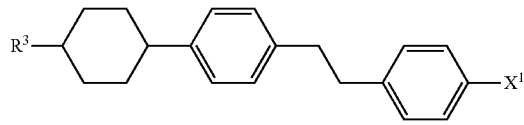
(3-29) 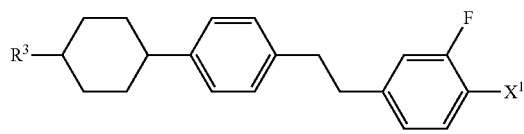
(3-30) 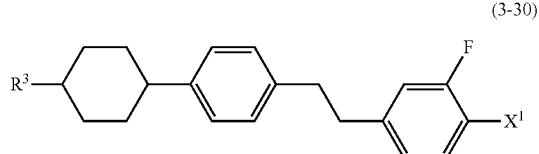
(3-31) 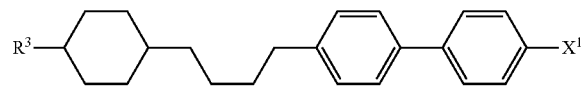
(3-32) 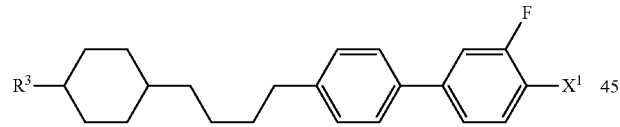
(3-33) 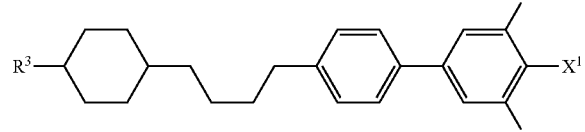
(3-34) 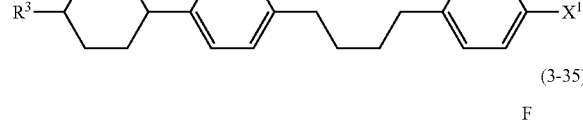
(3-35) 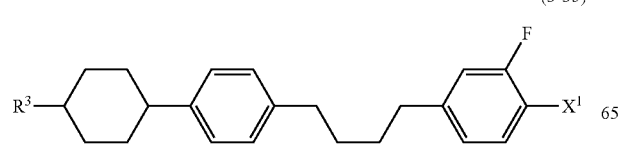
(3-36) 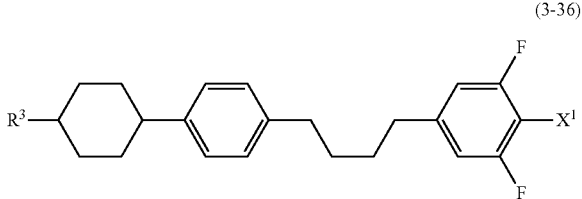
(3-37) 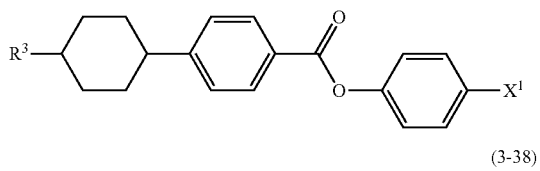
(3-38) 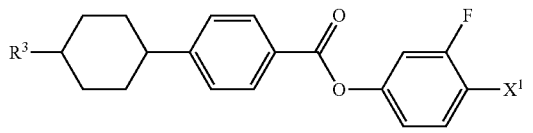
(3-39) 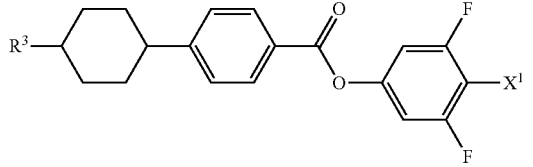
(3-40) 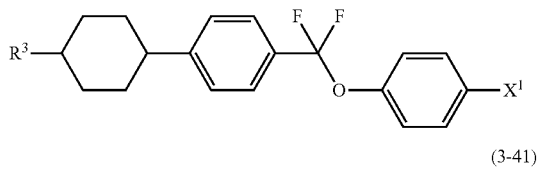
(3-41) 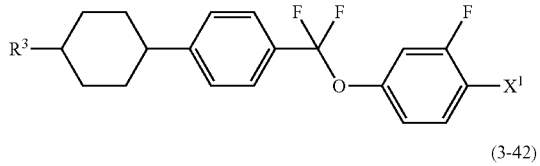
(3-42) 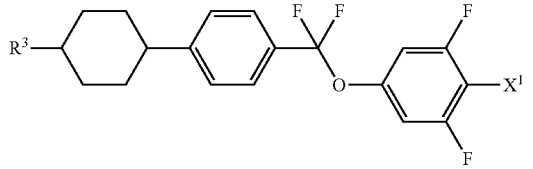
(3-43) 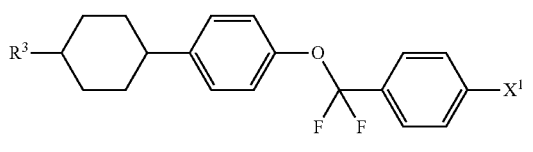
(3-44) 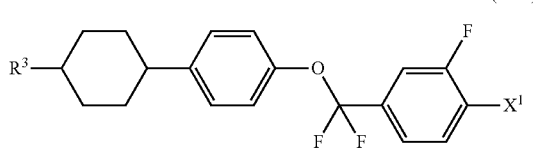

(3-45)
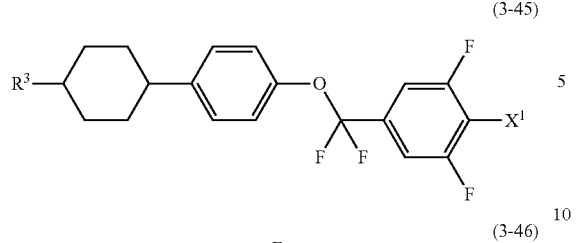
(3-46)
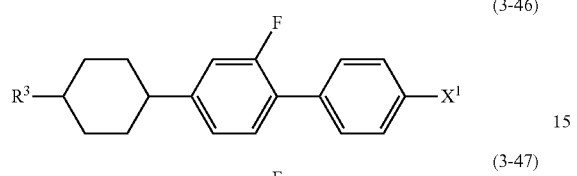
(3-47)
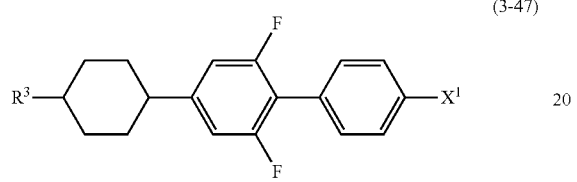
(3-48)
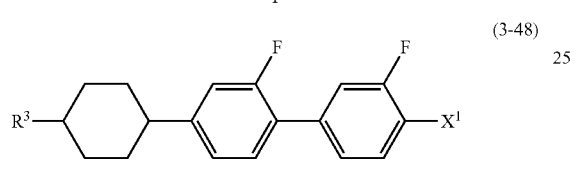
(3-49)
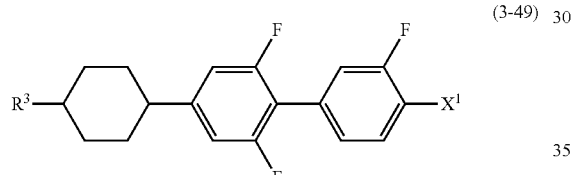
(3-50)
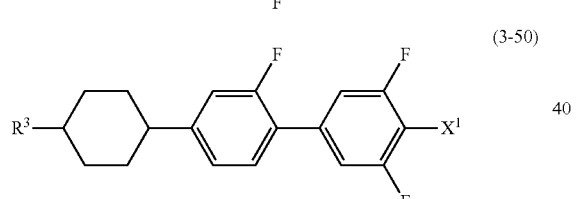
(3-51)
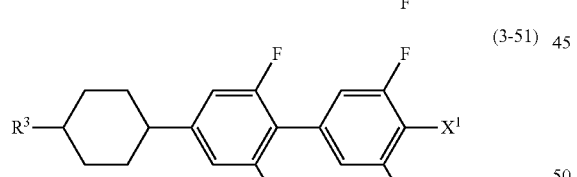
(3-52)
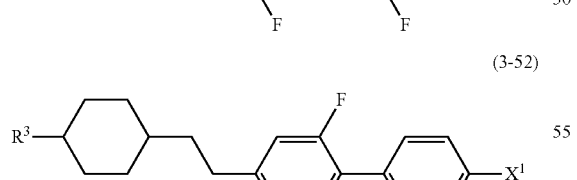
(3-53)
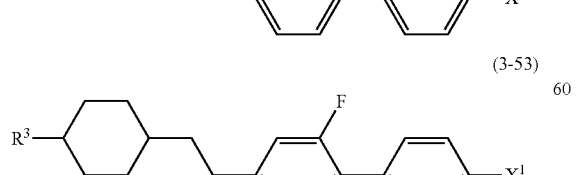
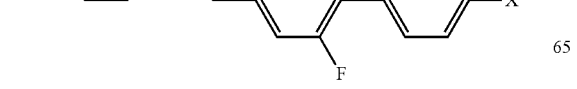
(3-54)
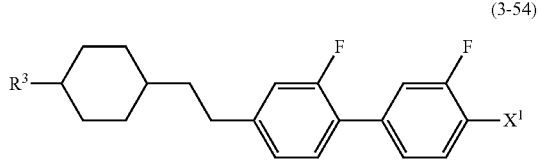
(3-55)
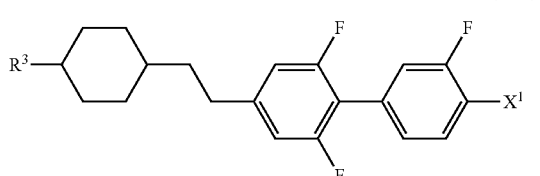
(3-56)
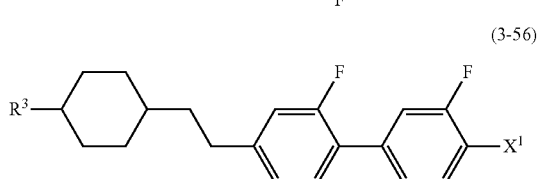
(3-57)
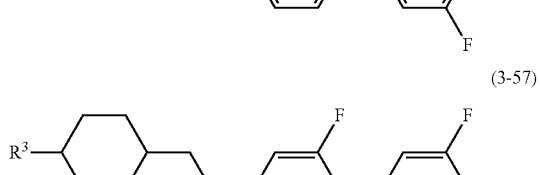
(3-58)
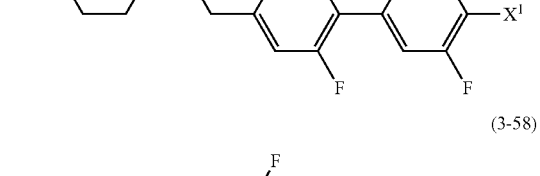
(3-59)
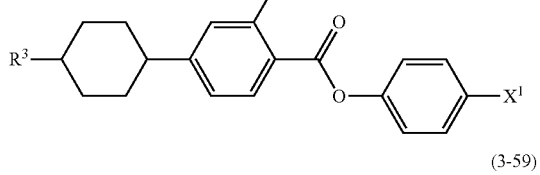
(3-60)
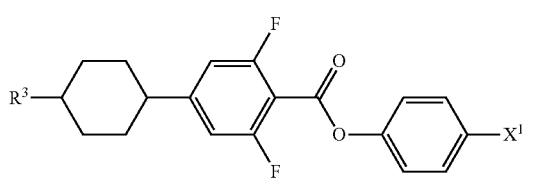
(3-61)
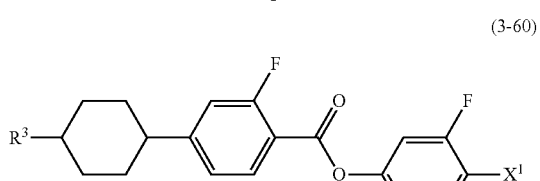
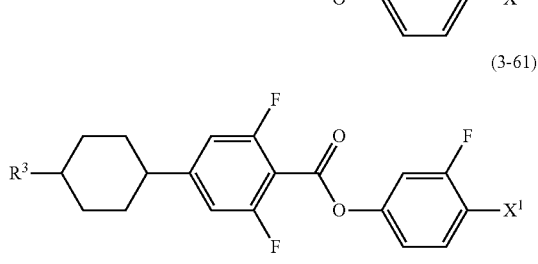

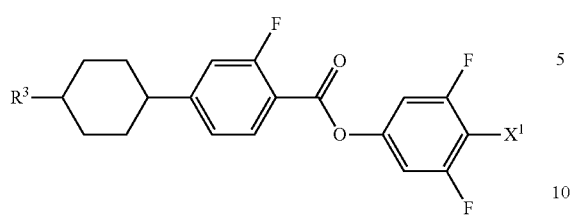
(3-62)
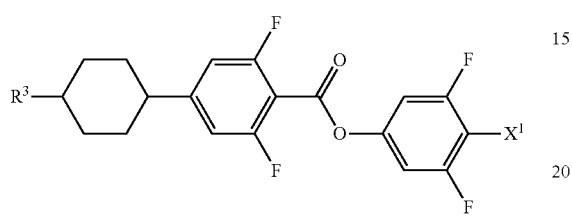
(3-63)
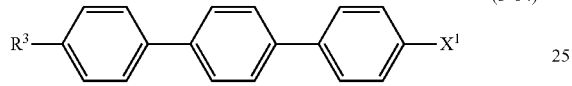
(3-64)
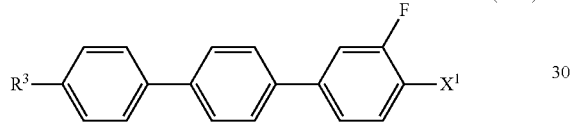
(3-65)
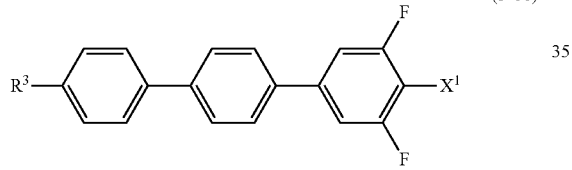
(3-66)
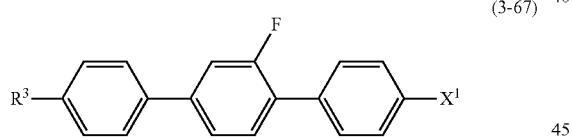
(3-67)
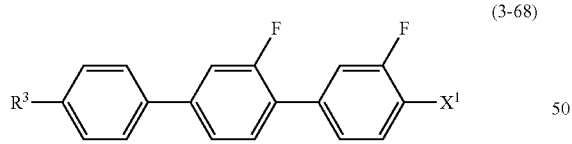
(3-68)
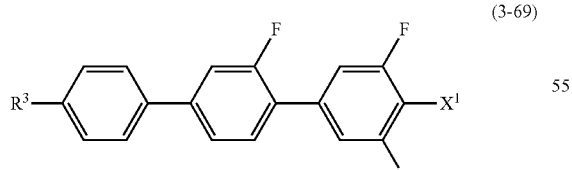
(3-69)
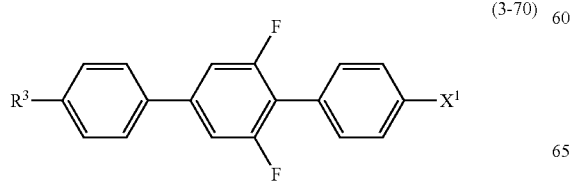
(3-70)
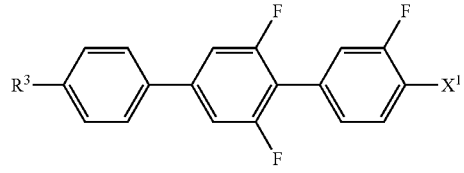
(3-71)
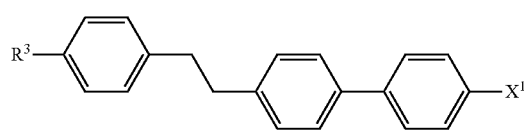
(3-72)
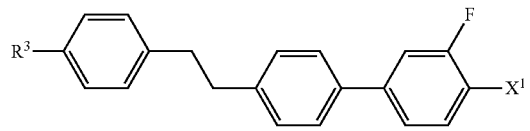
(3-73)
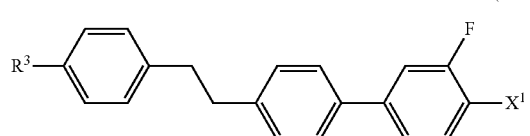
(3-74)
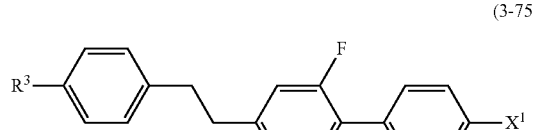
(3-75)
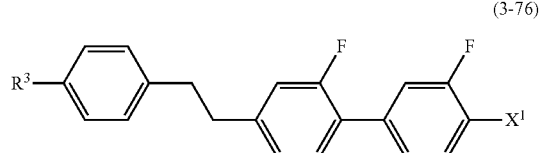
(3-76)
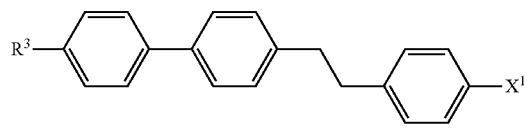
(3-77)
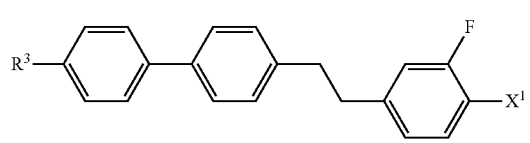
(3-78)
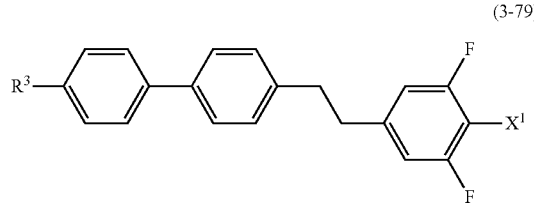
(3-79)

(3-80)
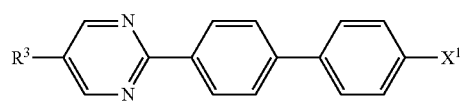
(3-81)
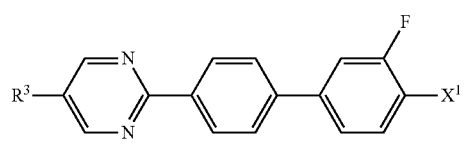
(3-82)
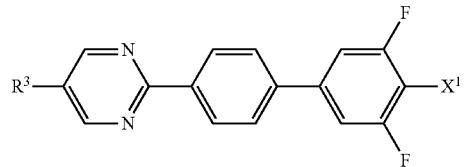
(3-83)
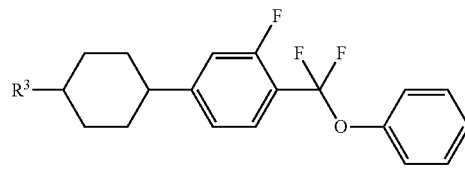
(3-84)
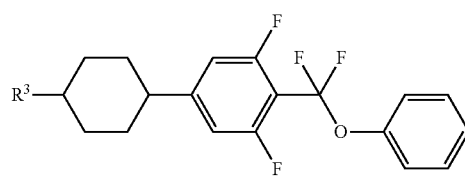
(3-85)
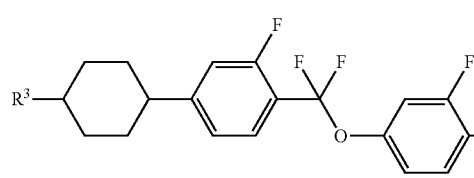
(3-86)
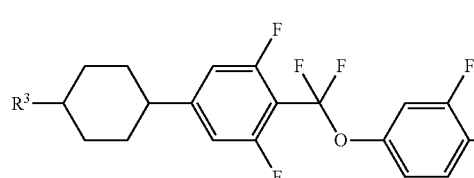
(3-87)
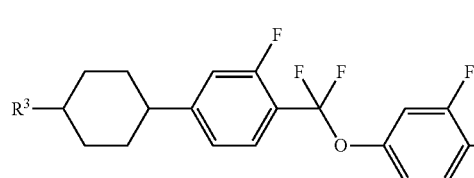
(3-88)
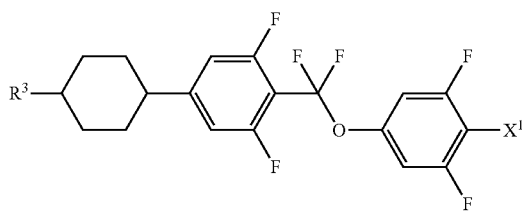
(3-89)
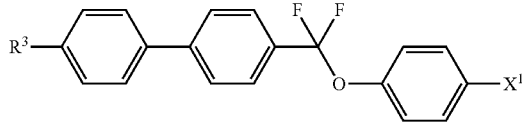
(3-90)
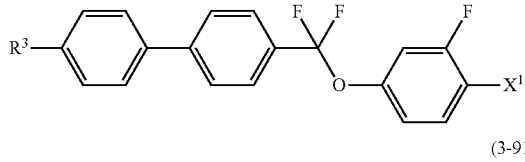
(3-91)
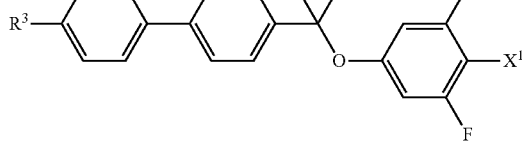
(3-92)
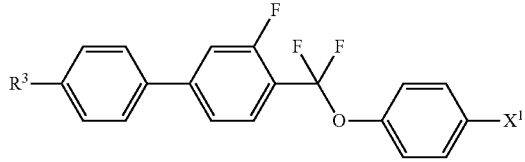
(3-93)
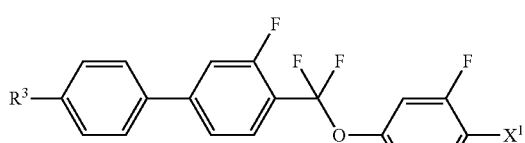
(3-94)
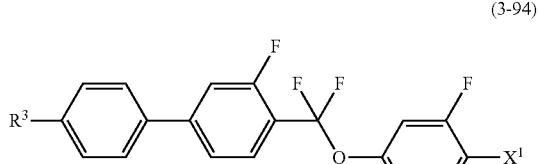
(3-95)
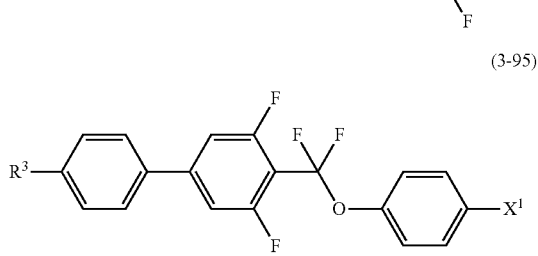

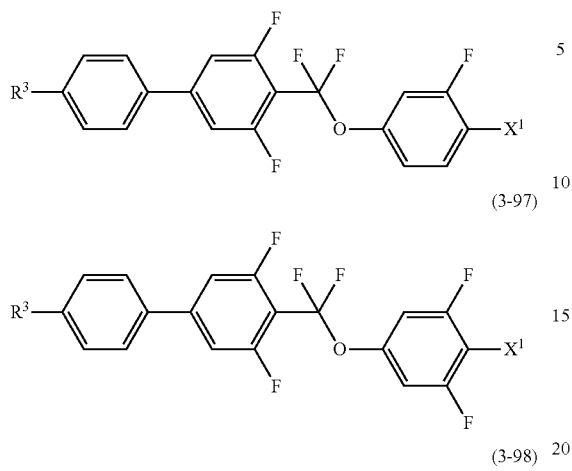
(3-96)
(3-97)
(3-98)
(3-99)
(3-100)
(3-101)
(3-102)
(3-103)
(3-104)
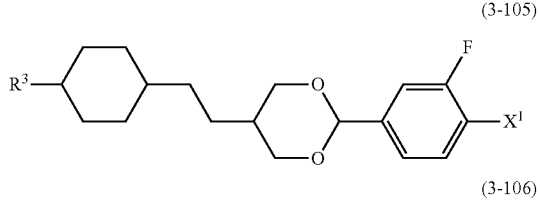
(3-105)
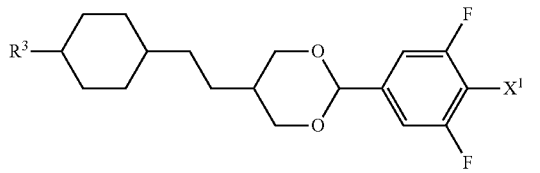
(3-106)
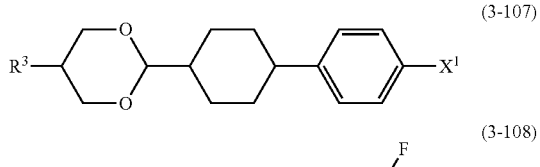
(3-107)
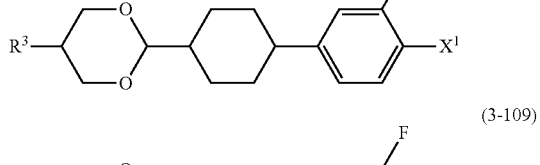
(3-108)
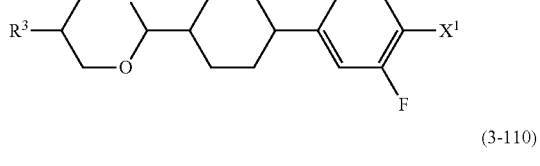
(3-109)
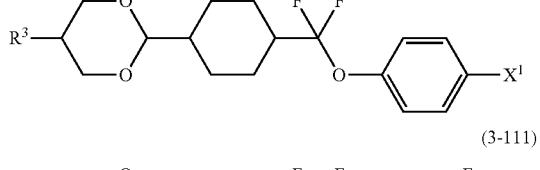
(3-110)
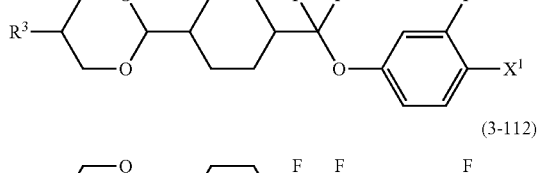
(3-111)
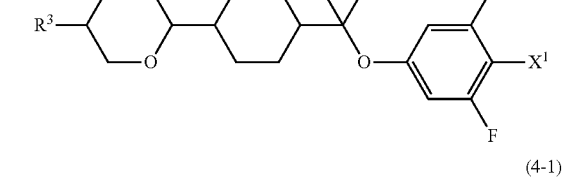
(3-112)
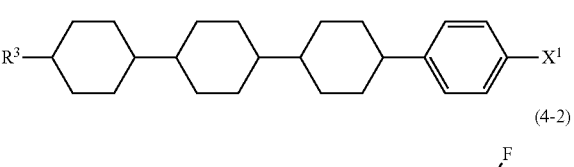
(4-1)
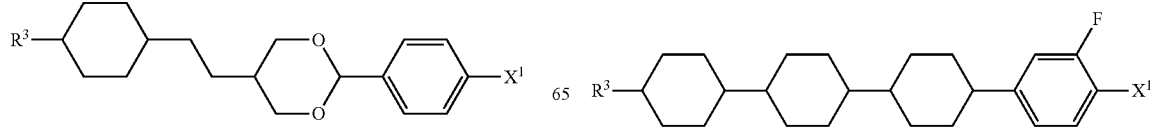
(4-2)

(4-3)
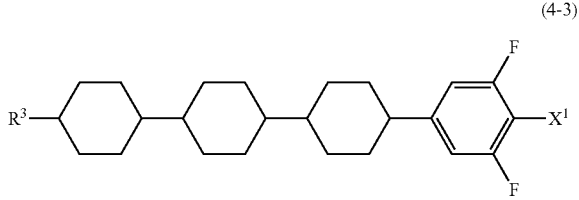
(4-4)
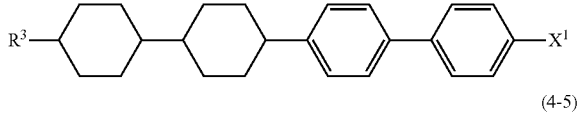
(4-5)
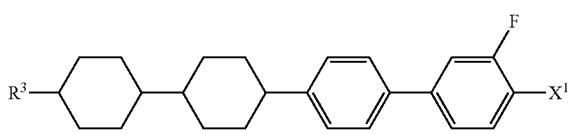
(4-6)
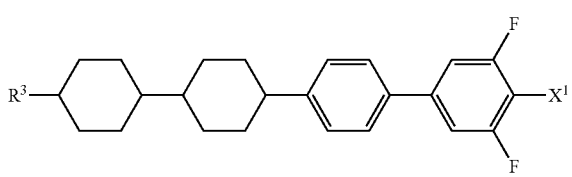
(4-7)
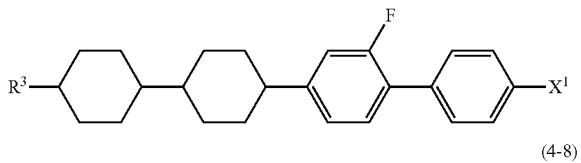
(4-8)
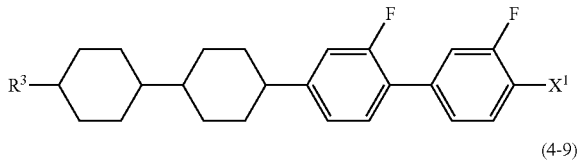
(4-9)
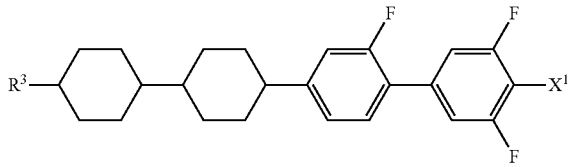
(4-10)
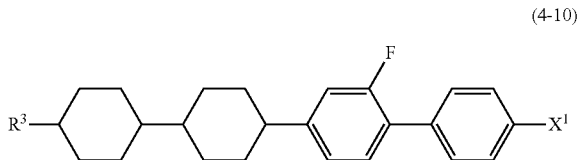
(4-11)
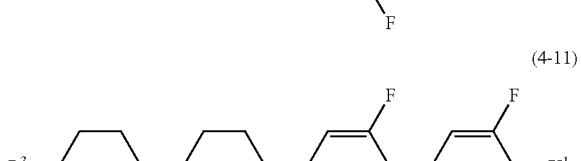
(4-12)
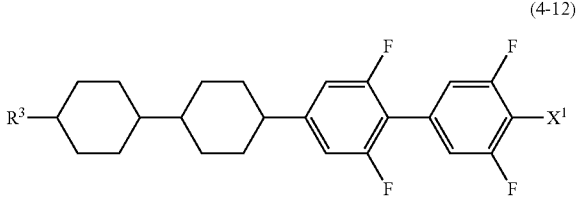
(4-13)
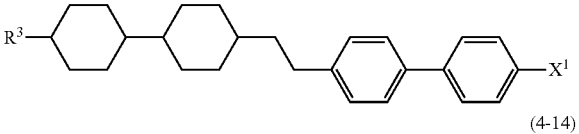
(4-14)
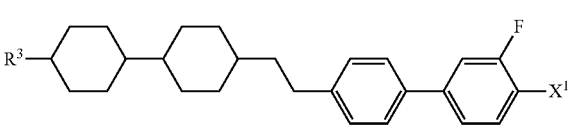
(4-15)
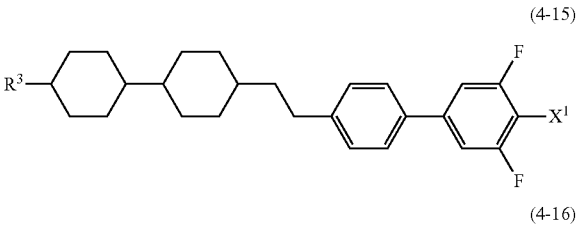
(4-16)
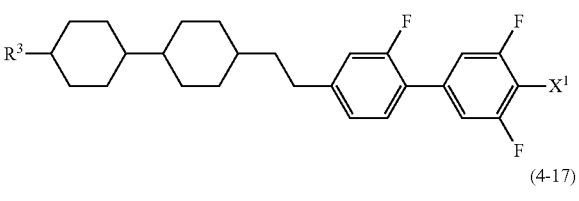
(4-17)
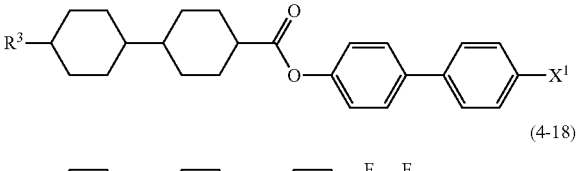
(4-18)
(4-19)
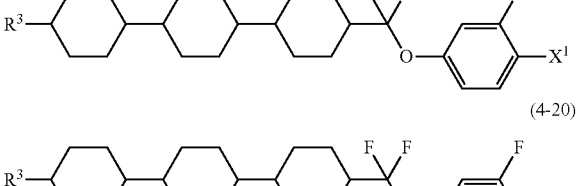
(4-20)
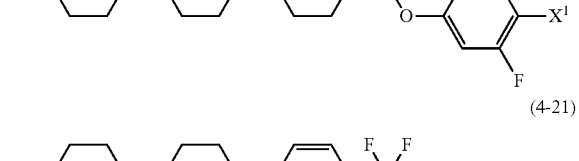
(4-21)
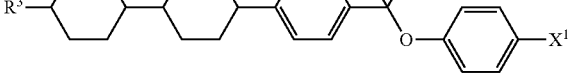

(4-22) (4-23) (4-24) (4-25) (4-26) (4-27) (4-28) (4-29) (4-30) (4-31) (4-32) (4-33) (4-34) (4-35) (4-36) (4-37) (4-38)

(4-39) 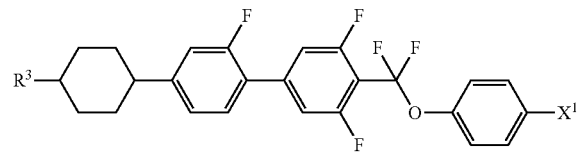
(4-40) 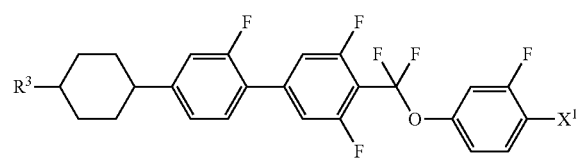
(4-41) 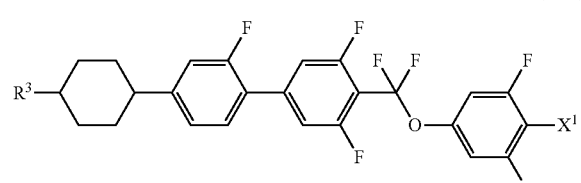
(4-42) 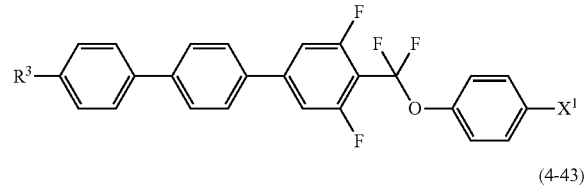
(4-43) 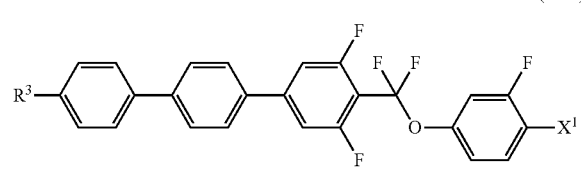
(4-44) 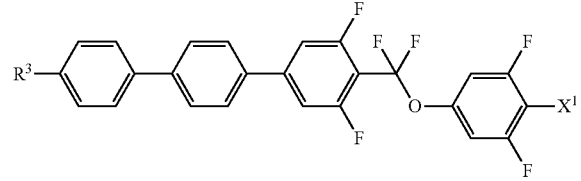
(4-45) 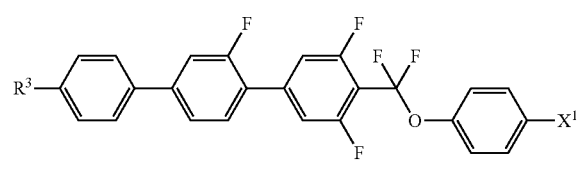
(4-46) 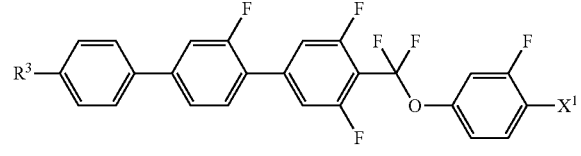
(4-47) 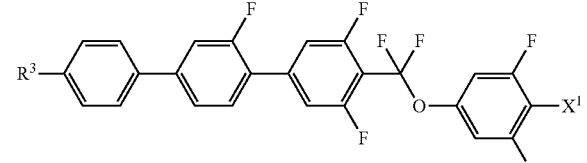
(4-48) 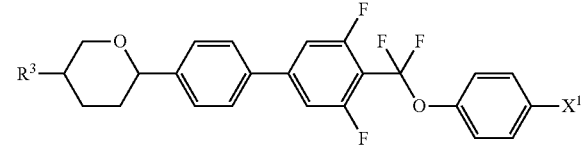
(4-49) 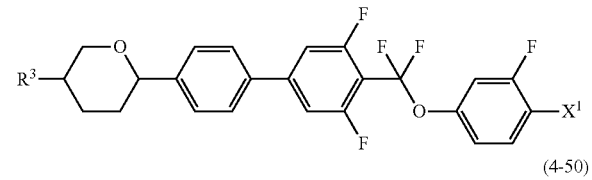
(4-50) 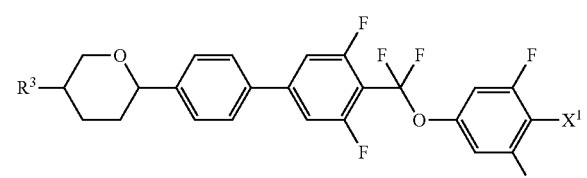
(4-51) 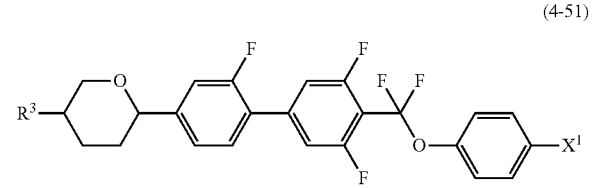
(4-52) 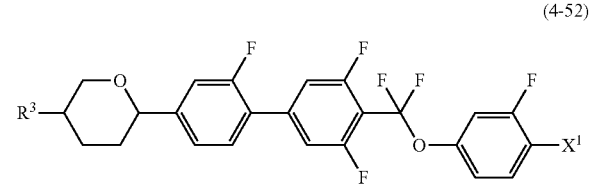
(4-53) 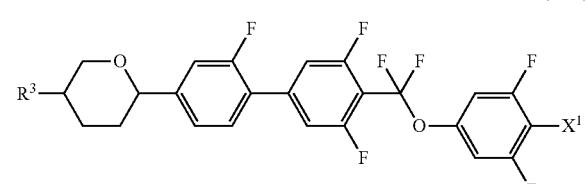
(4-54) 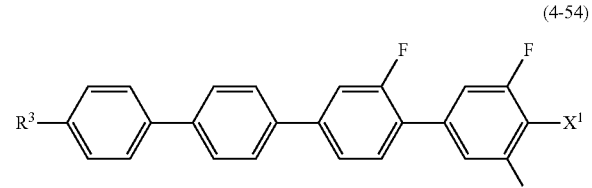
In the formula, $R^3$ and $X^1$ have the same meanings as described previously.

These compounds shown by formulas (2) to (4), namely the component B are used in the preparation of the liquid crystal composition for use in TFT and PSA, since they have positive dielectric anisotropy and a quite excellent thermal or chemical stability. The content of the component B in the liquid crystal composition of the invention is suitably in the range of 1% to 99% by weight, preferably in the range of 10% to 97% by weight, and more preferably 40% to 95% by weight based on the total weight of the liquid crystal composition. The viscosity can be adjusted by the further addition of the compounds represented by formulas (12) to (14) (the component E).

Suitable examples of the compounds shown by formula (5) described above, namely the component C includes (5-1) to (5-64).

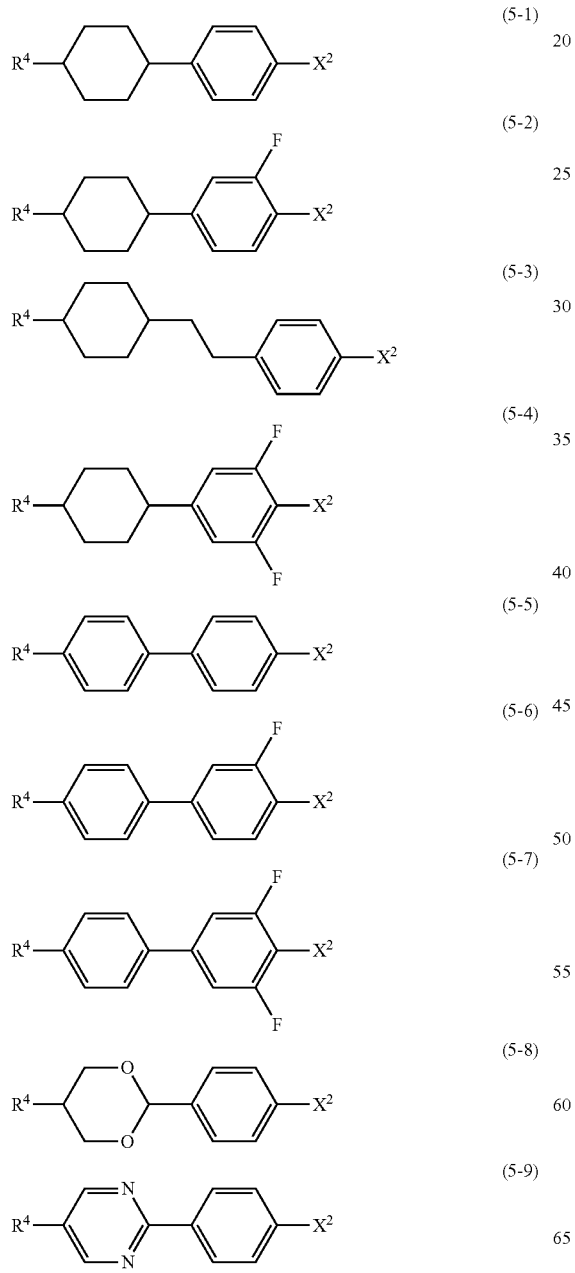

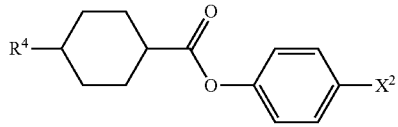

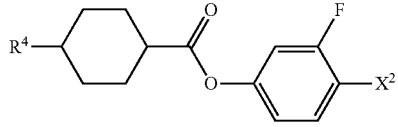

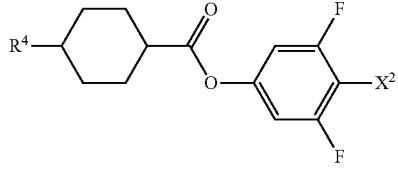

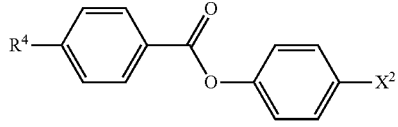

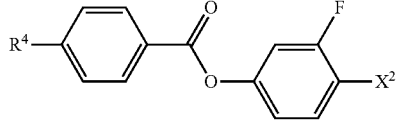

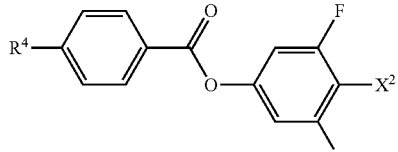

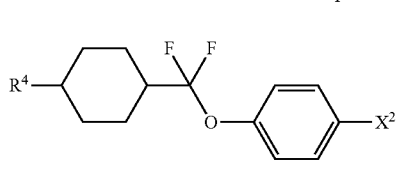

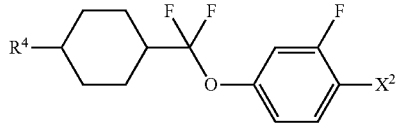

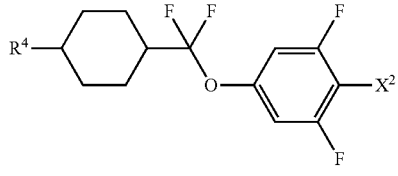

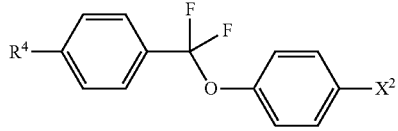

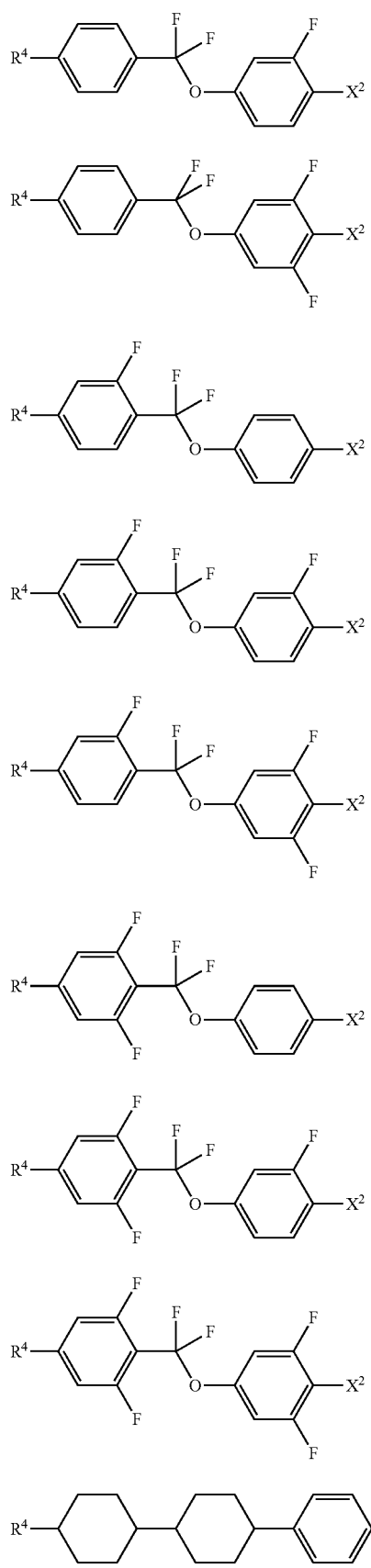
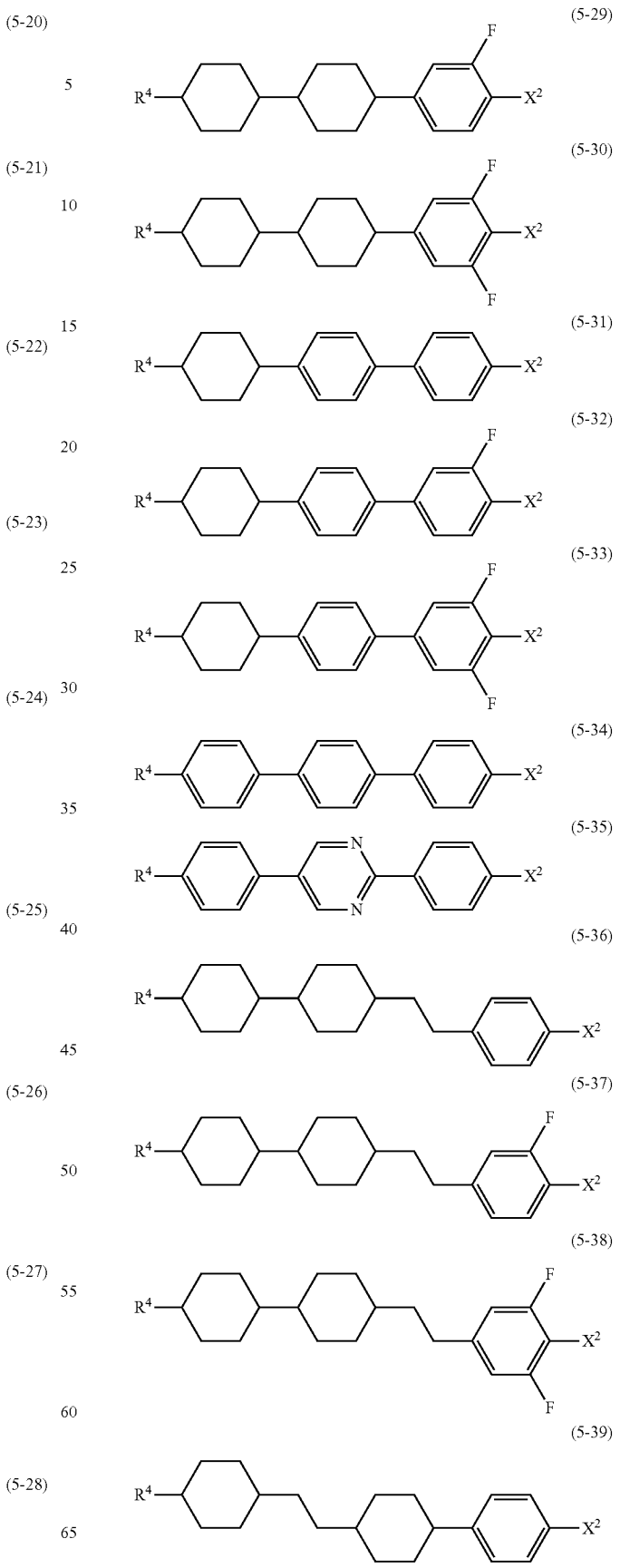

(5-40) 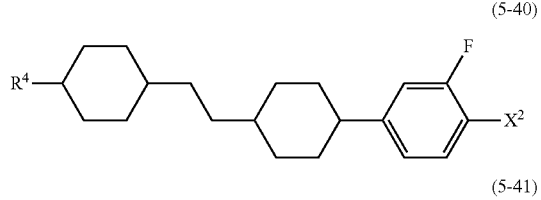
(5-41) 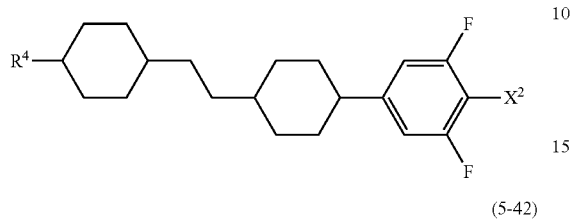
(5-42) 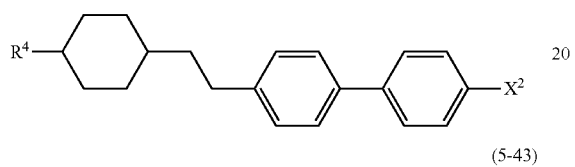
(5-43) 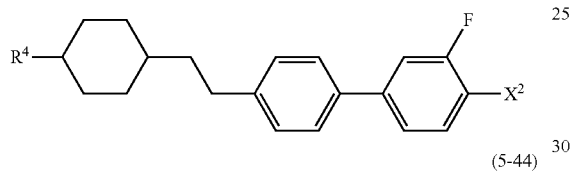
(5-44) 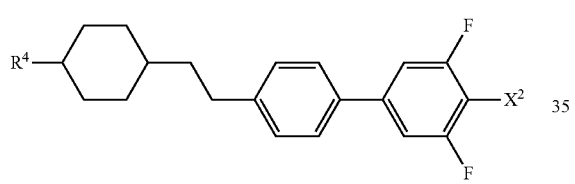
(5-45) 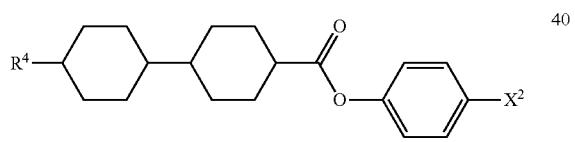
(5-46) 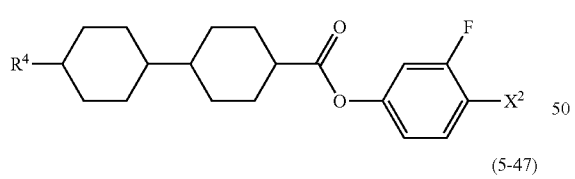
(5-47) 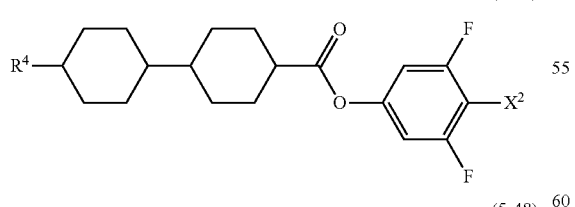
(5-48) 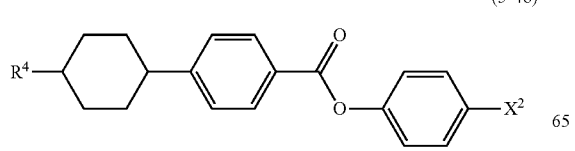
(5-49) 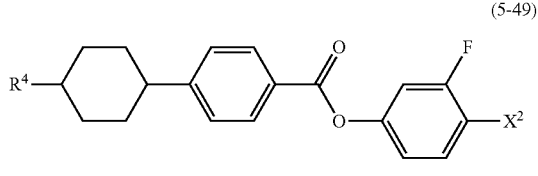
(5-50) 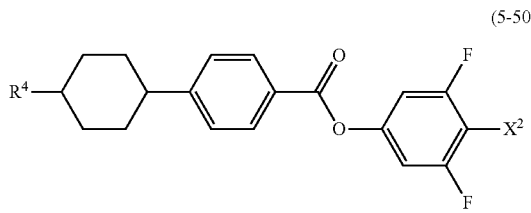
(5-51) 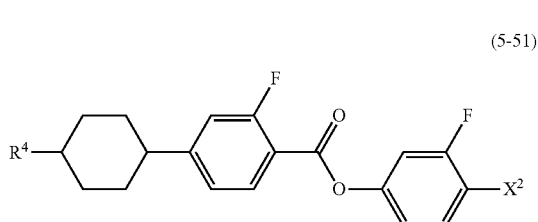
(5-52) 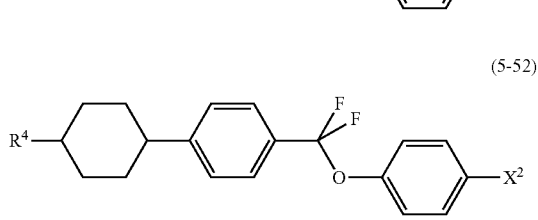
(5-53) 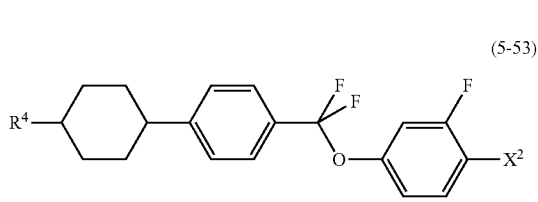
(5-54) 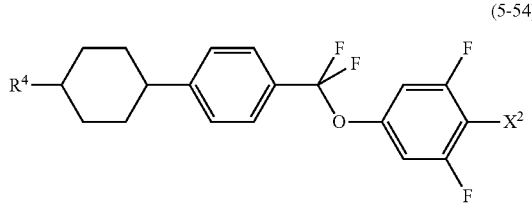
(5-55) 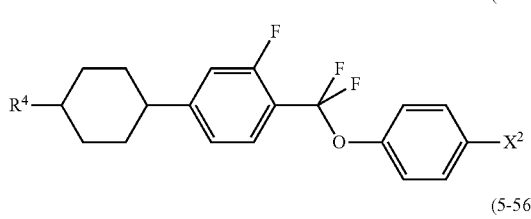
(5-56) 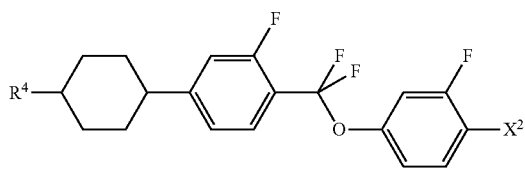

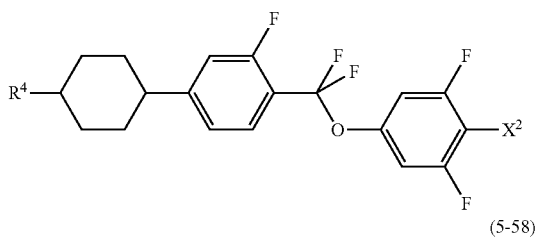

(5-57)

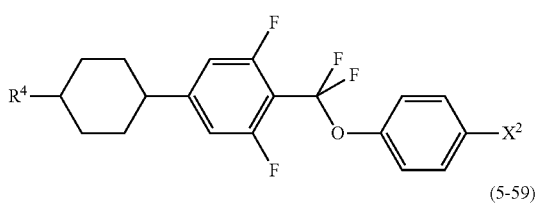

(5-58)

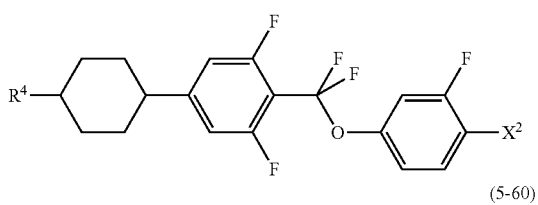

(5-59)

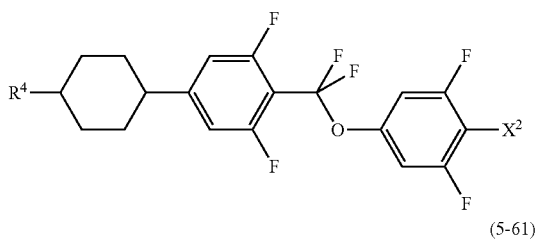

(5-60)

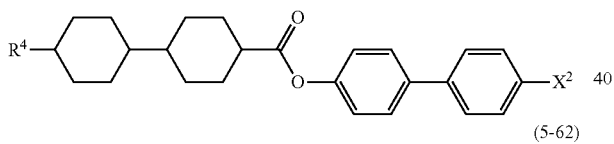

(5-61)

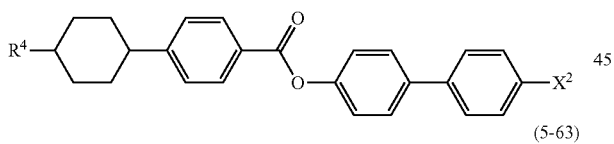

(5-62)

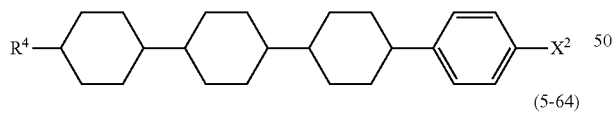

(5-63)

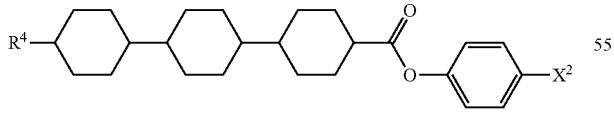

(5-64)

In the formula, $R^4$ and $X^2$ have the same meanings as described previously.

The compound shown by formula (5), namely the component C is mainly used in the preparation of the liquid crystal composition for use in STN, TN and PSA, since the dielectric anisotropy is positive and the value is quite large. The threshold voltage of the composition can be decreased by the addition of the component C. The viscosity can be adjusted, the refractive index anisotropy can be adjusted, and the temperature range of a liquid crystal phase can be increased. Furthermore, the component C can be utilized for an improvement of the steepness.

The content of the component C is suitably in the range of 0.1% to 99.9% by weight, preferably in the range of 10% to 97% by weight, and more preferably in the range of 40% to 95% by weight in the preparation of the liquid crystal composition for use in STN or TN. The threshold voltage, the temperature range of a liquid crystal phase, the refractive index anisotropy, the dielectric anisotropy, the viscosity and so forth can be adjusted by the addition of a component which will be described below.

The component D that is at least one kind of compound selected from the group of formulas (6) to (11) is desirable in the preparation of the liquid crystal composition having negative dielectric anisotropy in the invention for use in a VA mode (a vertical alignment mode), a PSA mode (a polymer sustained alignment mode) and so forth.

Suitable examples of the compounds shown by these formulas (6) to (11) (the component D) include formulas (6-1) to (6-6), (7-1) to (7-15), (8-1), (9-1) to (9-3), (10-1) to (10-11) and (11-1) to (11-10), respectively.

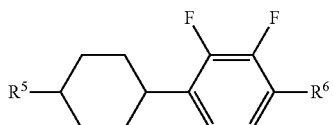

(6-1)

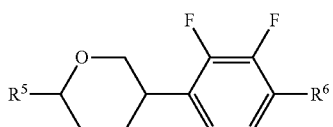

(6-2)

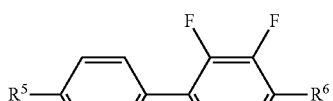

(6-3)

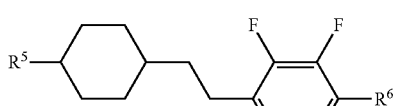

(6-4)

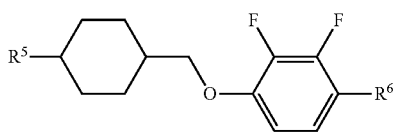

(6-5)

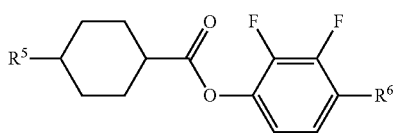

(6-6)

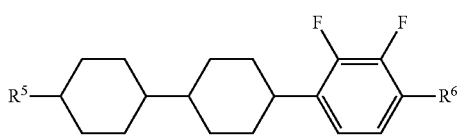

(7-1)

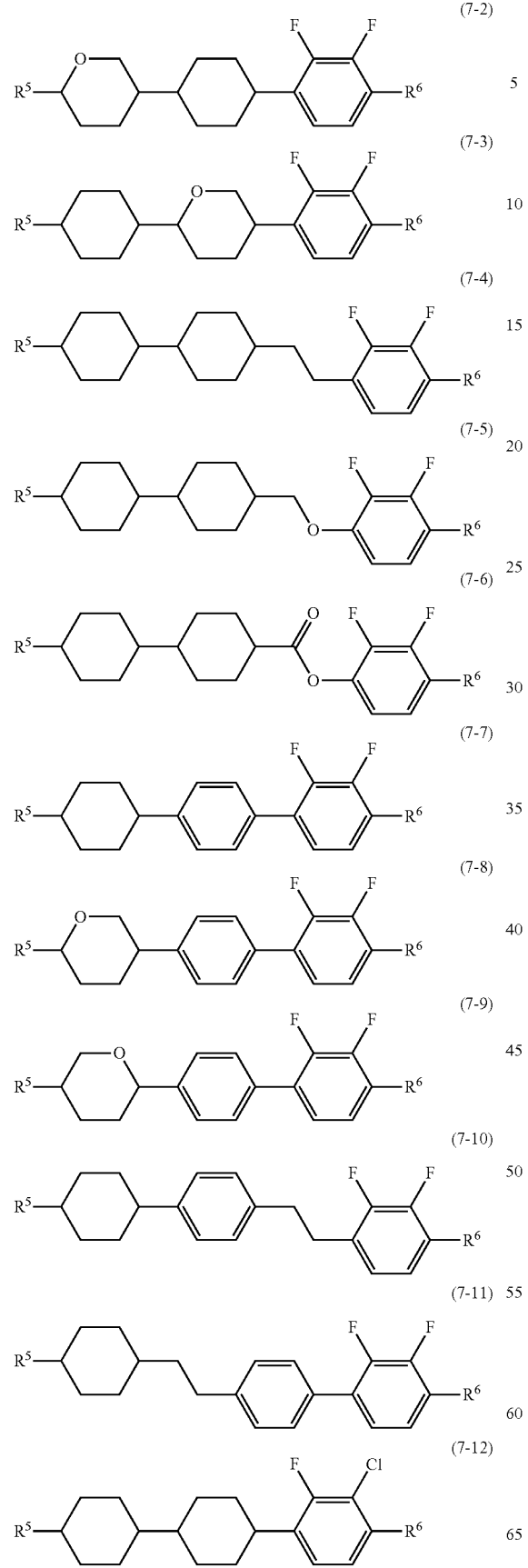
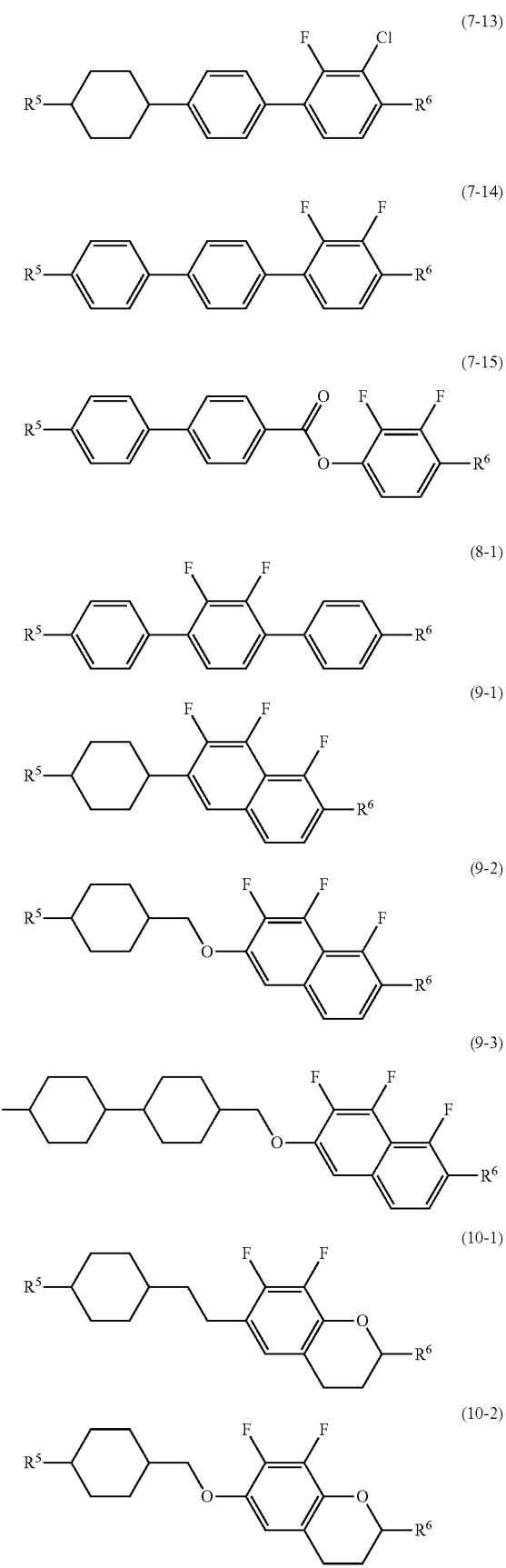

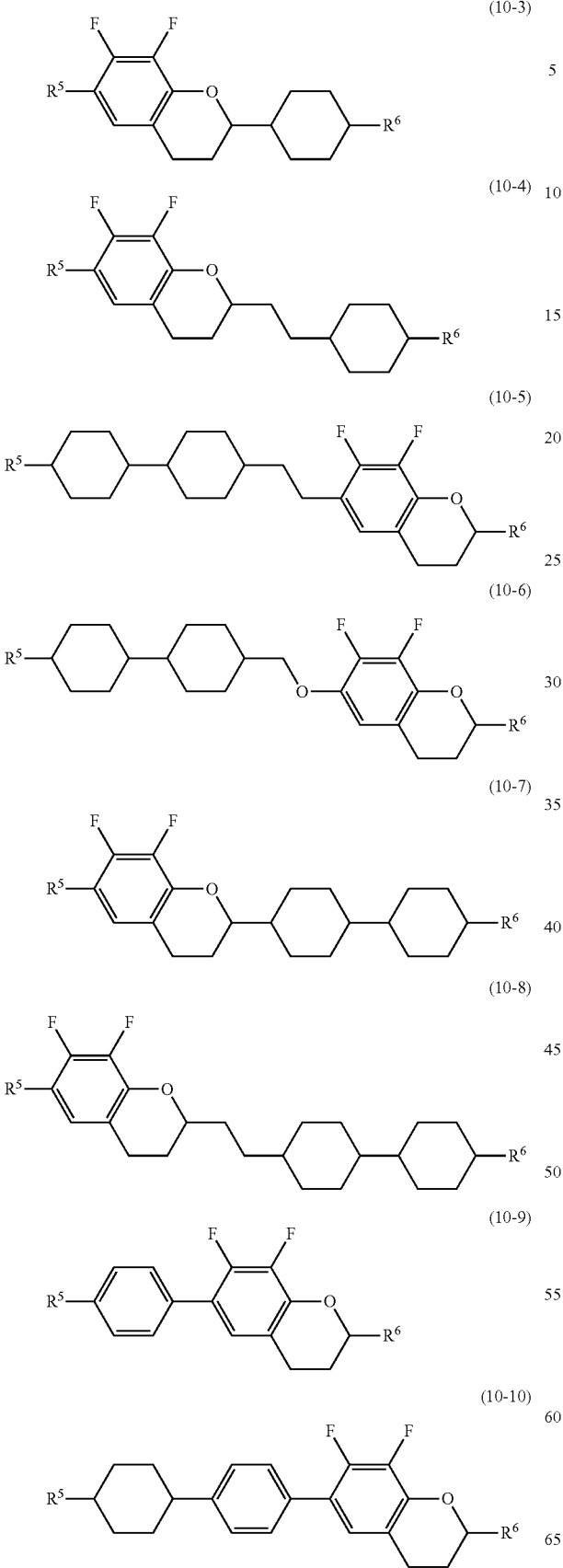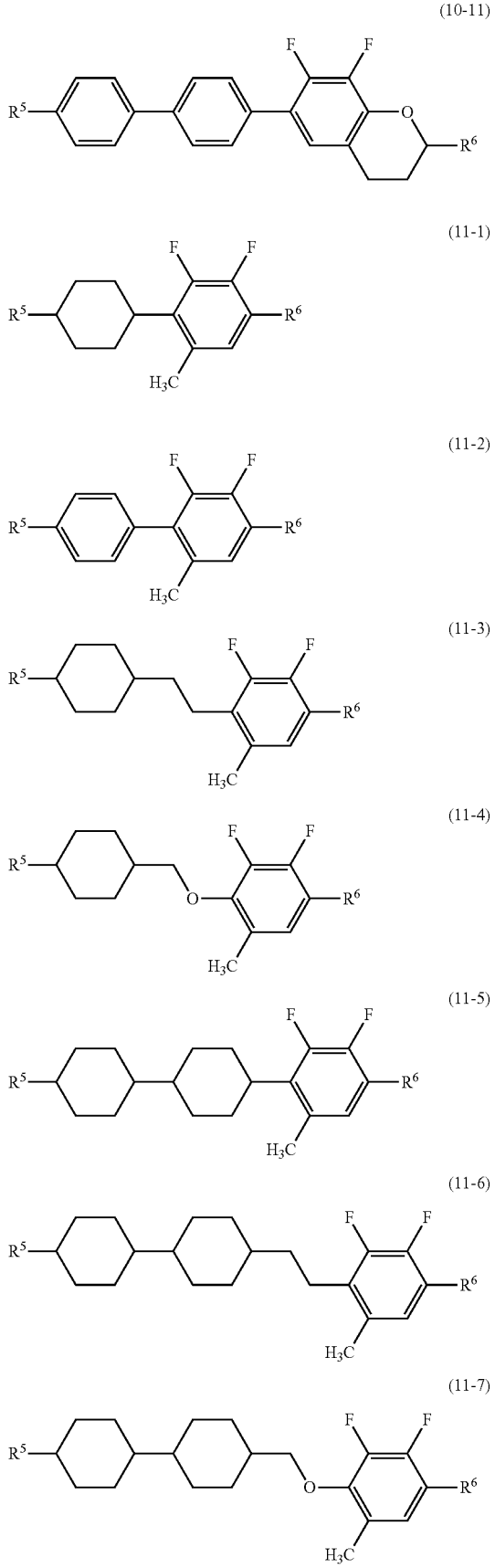

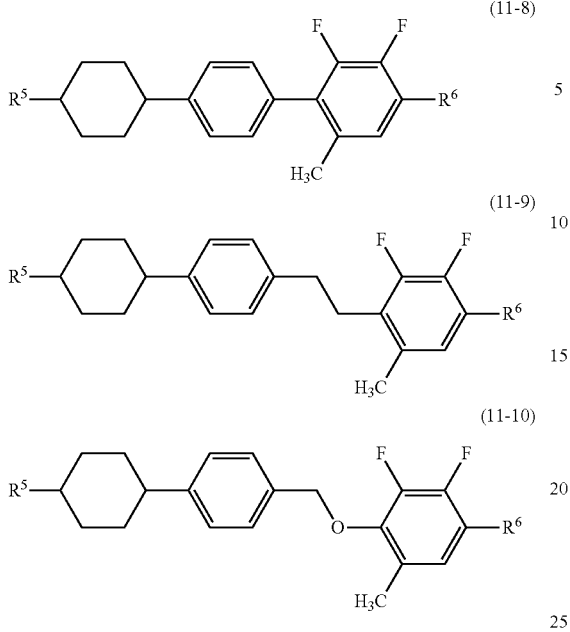

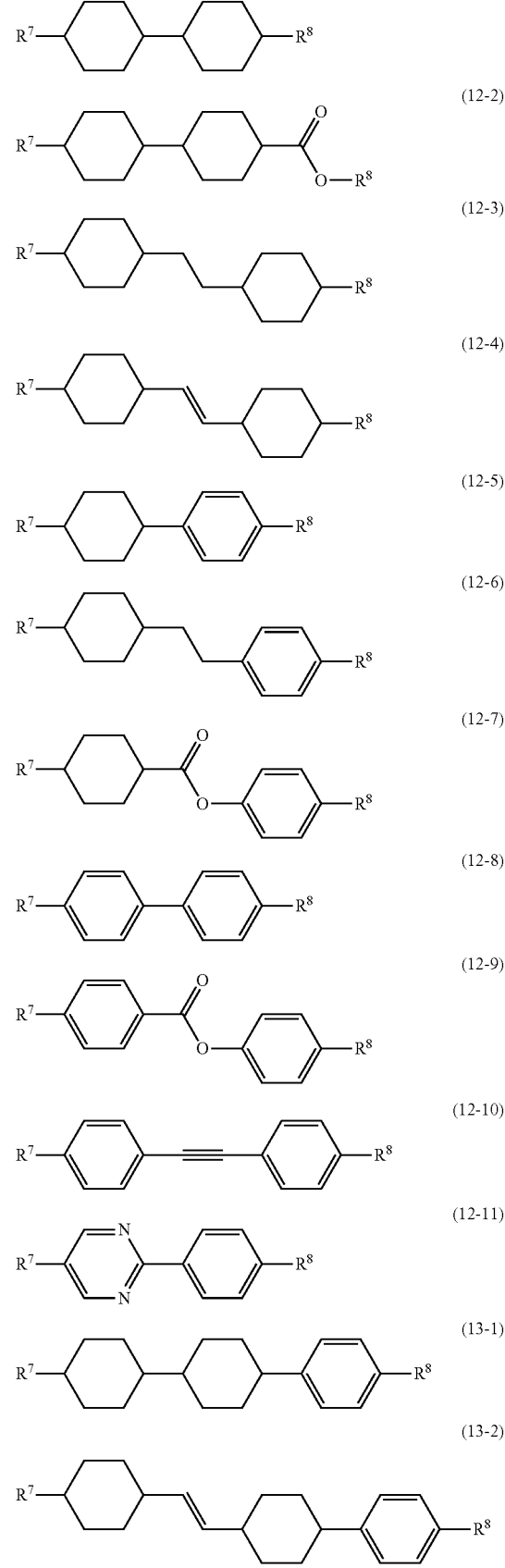

In the formula, $R^5$ and $R^6$ have the same meanings as described previously.

The compounds of the component D are mainly used in the liquid crystal composition having negative dielectric anisotropy for use in a VA mode and a PSA mode. As the content of the component D is increased, the threshold voltage of the composition decreases, however, the viscosity increases. Accordingly, it is desirable that the content of the component D decreases as long as the required value of the threshold is satisfied. However, the voltage-driving may not occasionally be performed when the content becomes less than 40% by weight, since the absolute value of the dielectric anisotropy is around The compound represented by formula (6) among the component D is effective mainly in adjusting the threshold voltage, adjsuting the viscosity, and adjusting the refractive index anisotropy, since it is a two-ring compound. The compounds represented by formula (7) and formula (8) are effective in increasing the clearing point, increasing the nematic range, decreasing the threshold voltage or increasing the refractive index anisotropy for instance, since it is a three-ring compound. Formulas (9), (10) and (11) are effective in decreasing the threshold voltage for instance.

The content of the component D is preferably 40% by weight or more, and more preferably in the range of 50% to 95% by weight based on the total weight of the composition, in the preparation of the composition for use in a VA mode and a PSA mode. The elastic constant can be adjusted and the voltage-transmission curve of the composition can be adjusted by the addition of the component D. It is desirable that the content of the component D is 30% by weight or less based on the total weight of the composition, when the component D is added to a composition having positive dielectric anisotropy.

Suitable examples of the compounds represented by formulas (12), (13) and (14) (the component E) include formulas (12-1) to (12-11), (13-1) to (13-19) and (14-1) to (14-6), respectively.

(13-3) 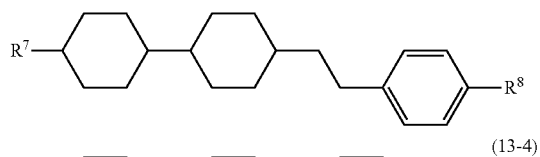
(13-4) 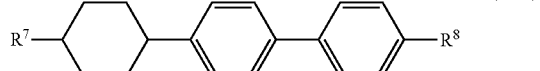
(13-5) 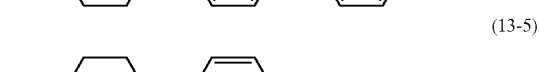
(13-6) 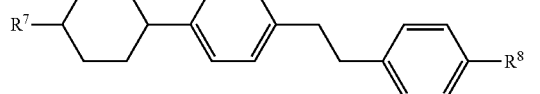
(13-7) 
(13-8) 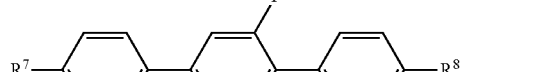
(13-9) 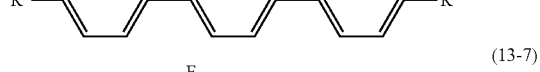
(13-10) 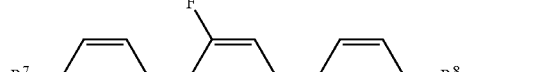
(13-11) 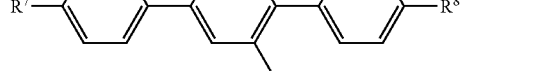
(13-12) 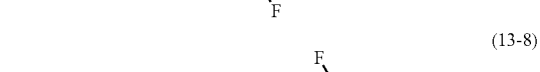
(13-13) 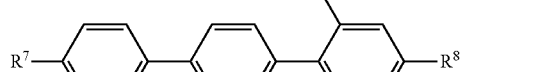
(13-14) 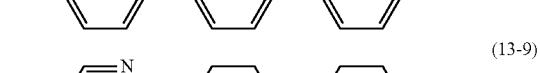
(13-15) 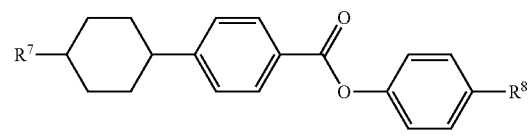
(13-16) 
(13-17) 
(13-18) 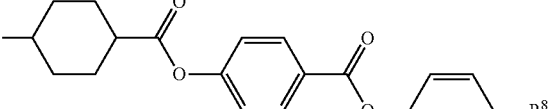
(13-19) 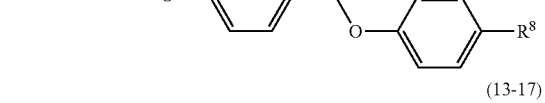
(14-1) 
(14-2) 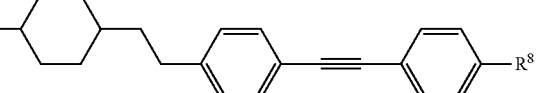
(14-3) 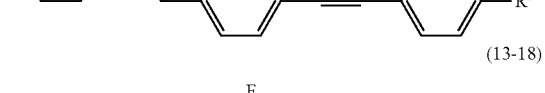
(14-4) 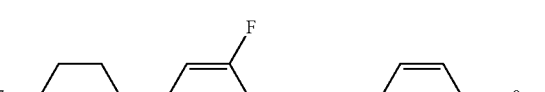
(14-5) 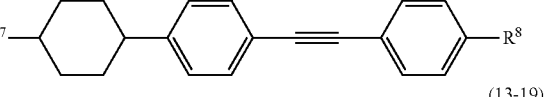
(14-6) 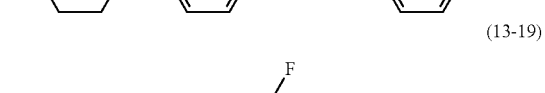

In the formula, $R^7$ and $R^8$ have the same meanings as described previously.

The compounds represented by formulas (12) to (14) (the component E) are close to neutral, since the absolute value of the dielectric anisotropy is small. The threshold voltage, the temperature range of a liquid crystal phase, the refractive index anisotropy, the dielectric anisotropy, the viscosity and so forth can be adjusted by the addition of the component E.

The compound represented by formula (12) is effective mainly in adjusting the viscosity or adjusting the refractive index anisotropy, and the compounds represented by formula (13) and (14) are effective in increasing the nematic range that is caused by an increase in the clearing point for instance, or adjusting the refractive index anisotropy.

As the content of the compound represented by the component E is increased, the threshold voltage of the liquid crystal composition increases, however, the viscosity decreases. Accordingly, it is desirable that the content increases as long as the required value of the threshold voltage is satisfied. The content of the component E is preferably 30% by weight or more, and more preferably 50% by weight or more based on the total weight of the composition, in the preparation of the liquid crystal composition for use in TFT or PSA. The content of the component E is preferably 30% by weight or more, and more preferably 40% by weight or more based on the total weight of the composition, in the preparation of the liquid crystal composition for use in TN, STN or PSA.

It is desirable that the liquid crystal composition of the invention includes at least one kind of compound shown by formula (1) of the invention in the range of 0.1% to 99% by weight for exhibiting excellent characteristics.

The liquid crystal composition of the invention is generally prepared according to known methods such as the mutual dissolution of necessary components at a high temperature. An additive that is well-known to a person skilled in the art may be added to the composition depending on its intended use. For example, a liquid crystal composition of the invention including an optically active compound, which will be described below, or a polymerizable compound and a polymerization initiator, or a liquid crystal composition for use in GH, to which a dye is added, can be prepared. The additive is generally well known to a person skilled in the art, and is described in the literature and so forth in detail.

The liquid crystal composition of the invention may further include one or more kinds of an optically active compound. A known chiral dopant is added as an optically active compound. The chiral dopant is effective in inducing a helical structure in liquid crystals, adjusting a necessary twist angle and thus preventing a reverse twist. Examples of the chiral dopant include the following optically active compounds.

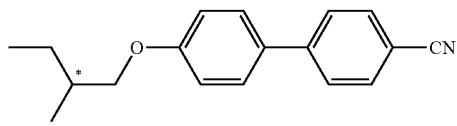

(Op-1)

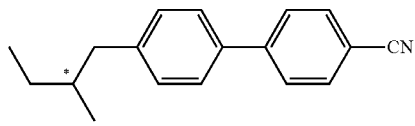

(Op-2)

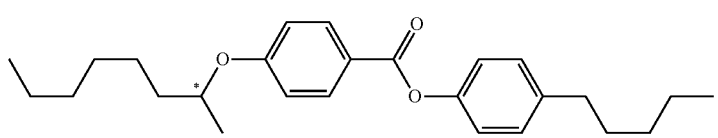

(Op-3)

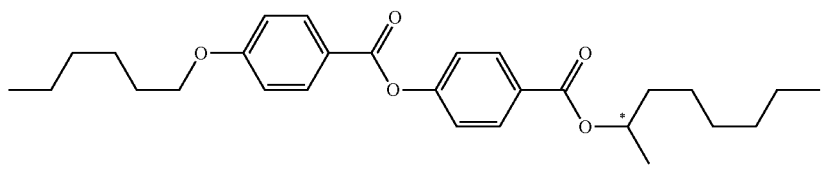

(Op-4)

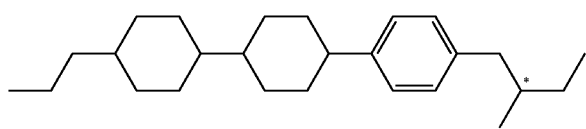

(Op-5)

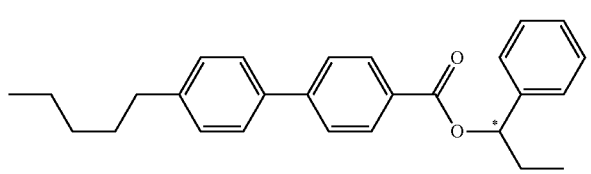

(Op-6)

-continued

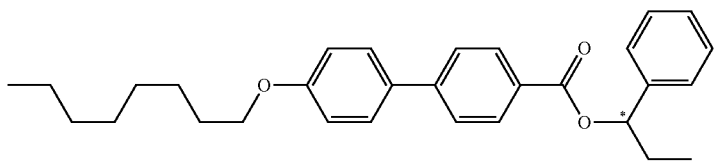
(Op-7)

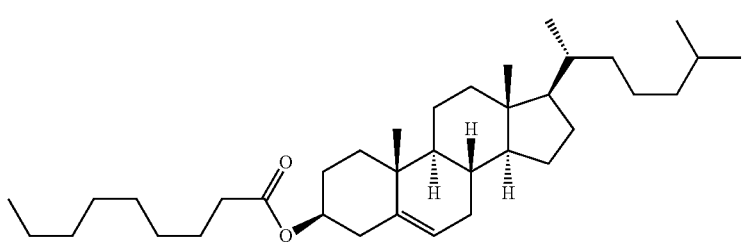
(Op-8)

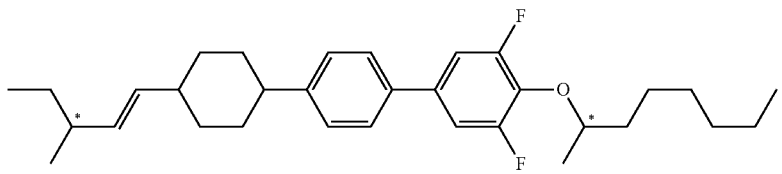
(Op-9)

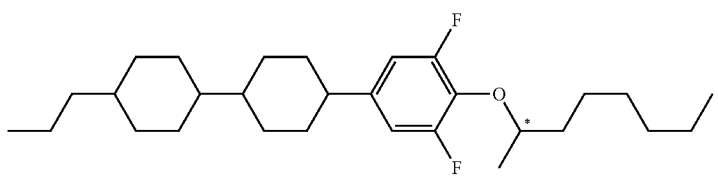
(Op-10)

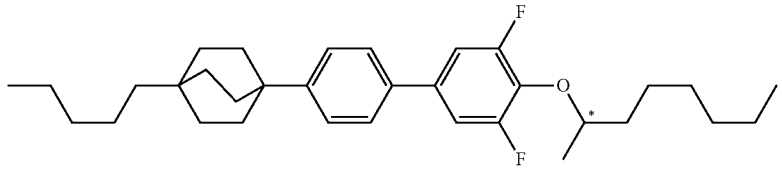
(Op-11)

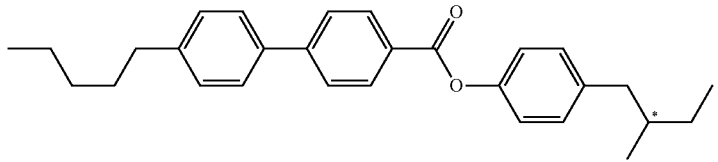
(Op-12)

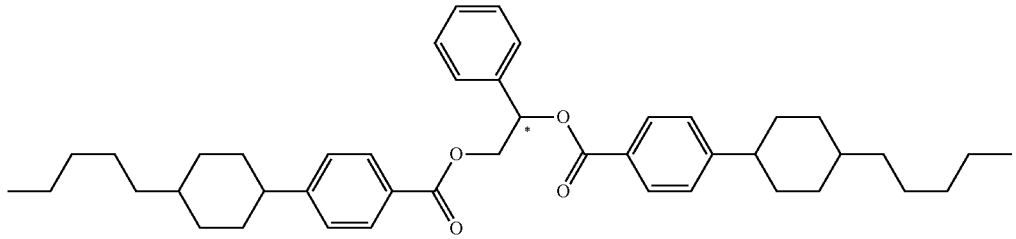
(Op-13)

A helical pitch is usually adjusted by the addition of this optically active compound to the liquid crystal composition of the invention. It is desirable to adjust the helical pitch to the range of 40 to 200 micrometers in a liquid crystal composition for use in TFT and TN. It is desirable to adjust the helical pitch to the range of 6 to 20 micrometers in a liquid crystal composition for use in STN. It is desirable to adjust the helical pitch to the range of 1.5 to 4 micrometers in a liquid crystal composition for use in a BTN (bistable twisted nematic) mode. Two or more optically active compounds may be added for the purpose of adjusting the temperature dependence of the helical pitch.

The liquid crystal composition of the invention can be used for a GH mode by the addition of a dichroic dye such as a merocyanine, stylyl, azo, azomethine, azoxy, quinophthalone, anthraquinone or tetrazine compound.

The liquid crystal composition of the invention can be used for NCAP prepared by micro-encapsulating nematic liquid crystals, and for PDLCD (a polymer-distributed liquid crystal display device) prepared by forming a three-dimensional network polymer in liquid crystals, such as PNLCD (a polymer network liquid crystal display device), and also for an ECB (electrically controlled birefringence) mode or a DS mode.

It is possible to prevent the deterioration of a liquid crystal composition or a liquid crystal display device including the liquid crystal composition for instance, when an ultraviolet light absorber or an antioxidant is added to the liquid crystal composition of the invention. For example, the antioxidant can suppress a decrease in the specific resistance when the liquid crystal composition is heated.

The ultraviolet light absorber described above includes a benzophenone-ultraviolet light absorber, a benzoate-ultraviolet light absorber and a triazole-ultraviolet light absorber.

A specific example of the benzophenone-ultraviolet light absorber is 2-hydroxy-4-n-octoxybenzophenone. A specific example of the benzoate-ultraviolet light absorber is 2,4-di-t-butylphenyl-3,5-di-t-butyl-4-hydroxybenzoate. Specific examples of the triazole-ultraviolet light absorber are 2-(2-hydroxy-5-methylphenyl)benzotriazole, 2-[2-hydroxy-3-(3,4,5,6-tetrahydroxyphthalimide-methyl)-5-methylphenyl]benzotriazole and 2-(3-t-butyl-2-hydroxy-5-methylphenyl)-5-chlorobenzotriazole.

The antioxidant described above includes a phenol-antioxidant and an organosulfur antioxidant. In particular, an antioxidant represented by the following formula is desirable in view of a high antioxidant effect without changing the characteristics of the liquid crystal composition.

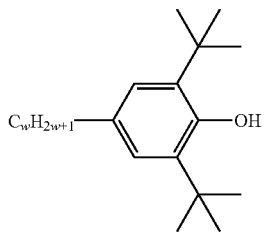

(15)

In formula (15), w is an integer from 1 to 15.

In the compound (15), desirable w is 1, 3, 5, 7 or 9. More desirable w is 1 or 7. The compound (15) where w is 1 is effective in preventing a decrease in specific resistance that is caused by heating under air, because it has a large volatility. The compound (15) where w is 7 is effective in maintaining a large voltage holding ratio at room temperature and also at a temperature close to the maximum temperature of a nematic phase even after the device has been used for a long time, because it has a small volatility.

Specific examples of the phenol antioxidant are 2,6-di-t-butyl-4-methylphenol, 2,6-di-t-butyl-4-ethylphenol, 2,6-di-t-butyl-4-propylphenol, 2,6-di-t-butyl-4-butylphenol, 2,6-di-t-butyl-4-pentylphenol, 2,6-di-t-butyl-4-hexylphenol, 2,6-di-t-butyl-4-heptylphenol, 2,6-di-t-butyl-4-octylphenol, 2,6-di-t-butyl-4-nonylphenol, 2,6-di-t-butyl-4-decylphenol, 2,6-di-t-butyl-4-undecylphenol, 2,6-di-t-butyl-4-dodecylphenol, 2,6-di-t-butyl-4-tridecylphenol, 2,6-di-t-butyl-4-tetradecylphenol, 2,6-di-t-butyl-4-pentadecylphenol, 2,2'-methylenebis(6-t-butyl-4-methylphenol), 4,4'-butylidenebis(6-t-butyl-3-methylphenol), 2,6-di-t-butyl-4-(2-octadecyloxycarbonyl)ethylphenol and pentaerythritoltetrakis[3-(3,5-di-t-butyl-4-hydroxyphenyl)propionate].

Specific examples of the organosulfur antioxidant are dilauryl-3,3'-thiopropionate, dimyristyl-3,3'-thiopropionate, distearyl-3,3'-thiopropionate, pentaerythritoltetrakis(3-laurylthiopropionate) and 2-mercaptobenzimidazole.

The amount of the additive described above which is represented by the ultraviolet light absorber, the antioxidant and so forth is in the range that the effect of the invention is not lessened and the aim to add the additive is attained.

When the ultraviolet light absorber described above or the antioxidant is added, for example, the ratio is usually in the range of 10 ppm to 500 ppm, preferably in the range of 30 to 300 ppm, and more preferably in the range of 40 to 200 ppm based on the total weight of the liquid crystal composition of the invention.

Incidentally, the liquid crystal composition of the invention may include an impurity such as starting materials, side products, solvents used for the reactions or catalysts for the syntheses, which are contaminations in the step for synthesizing each compound that will be included in the liquid crystal composition, and in the step for preparing the liquid crystal composition, for instance.

A polymerizable compound is mixed with the composition for adjusting to a device having a PSA (polymer sustained alignment) mode. Desirable examples of the polymerizable compound include compounds having a polymerizable group, such as an acrylate, methacrylate, vinyl, vinyloxy, propenyl ether, epoxy (oxirane, oxetane) or vinyl ketone compound. Especially desirable examples of the polymerizable compound are acrylate derivatives or methacrylate derivatives. A desirable ratio of the polymerizable compound is 0.05% by weight or more for achieving its effect and is 10% by weight or less for avoiding a poor display. A more desirable ratio is in the range of 0.1% by weight to 2% by weight. The polymerizable compound is polymerized on irradiation with ultraviolet light or the like, preferably in the presence of a suitable initiator such as a photopolymerization initiator. Suitable conditions for polymerization, suitable types of the initiator and suitable amounts thereof are known to a person skilled in the art and are described in the literature. For example, Irgacure 651 (registered trademark), Irgacure 184 (registered trademark) or Darocure 1173 (registered trademark) (Ciba Japan K. K.), each of which is a photopolymerization initiator, is suitable for radical polymerization. The polymerizable compound includes the photopolymerization initiator preferably in the range of 0.1% by weight to 5% by weight and most preferably in the range of 1% by weight to 3% by weight.

When each of component compounds in the liquid crystal composition of the invention is a liquid, for example, the composition is prepared by mixing and shaking the compounds. When solids are included, the composition is prepared by mixing each compound, and then shaking after the compounds have been heated and liquefied. Moreover, the liquid crystal composition of the invention can also be prepared according to other known methods.

The temperature range of the nematic phase is wide in the liquid crystal composition of the invention, since the maximum temperature of a nematic phase can be adjusted to 70° C. or higher and the minimum temperature of the nematic phase can be adjusted to −20° C. or lower. Accordingly, the liquid crystal display device containing this liquid crystal composition can be used in a wide temperature range.

In the liquid crystal composition of the invention, the liquid crystal composition having the optical anisotropy in the range of 0.05 to 0.18, and preferably in the range of 0.09 to 0.13 can be obtained by suitably selecting the formulation, for instance. A liquid crystal composition that falls in the numerical range described above can be suitably used for a liquid crystal display device operated in a TN mode, a STN mode or a TFT mode.

In the liquid crystal composition of the invention, the liquid crystal composition having the dielectric anisotropy usually in the range of −5.0 to −2.0, and preferably in the range of −4.5 to −2.5 can be obtained. A liquid crystal composition that falls in the numerical range described above can be suitably used for a liquid crystal display device operated in an IPS mode, a VA mode or a PSA mode.

The Liquid Crystal Display Device

The liquid crystal composition of the invention can be used not only for a liquid crystal display devices having an operating mode such as a PC mode, a TN mode, a STN mode or an OCB mode which is driven by means of the AM mode, but also for a liquid crystal display device having an operating mode such as a PC mode, a TN mode, a STN mode, an OCB mode, a VA mode, an IPS mode or a PSA mode, which is driven by means of a PM (passive matrix) mode.

The liquid crystal display devices having the AM mode and the PM mode can be applied to any of liquid crystal displays and so forth that have a reflection type, a transmission type, and a semi-transmission type.

Moreover, the liquid crystal composition of the invention can also be used for a DS (dynamic scattering) mode-device containing the liquid crystal composition to which a conducting agent is added, and a nematic curvilinear aligned phase (NCAP) device containing the liquid crystal composition microencapsulated, and a PD (polymer dispersed) device having a three-dimensional network polymer formed in the liquid crystal composition, for example, a PN (polymer network) device.

Since the liquid crystal composition of the invention has the characteristics described above, it can be suitably used for the liquid crystal display device having an AM mode which is driven by means of an operating mode such as the VA mode, the IPS mode or the PSA mode, wherein the liquid crystal composition having negative dielectric anisotropy is used, and especially for the liquid crystal display device having the AM mode which is driven by means of the VA mode.

Incidentally, the direction of an electric field is perpendicular to the surface of the glass substrate in a liquid crystal display device which is driven by means of the TN mode, the VA mode, the PSA mode or the like. On the other hand, the direction of an electric field is parallel to the surface of the substrate in a liquid crystal display device which is driven by means of the IPS mode or the like. The structure of the liquid crystal display device which is driven by means of the VA mode is reported by K. Ohmuro, S. Kataoka, T. Sasaki and Y. Koike, SID '97 Digest of Technical Papers, 28, 845 (1997), and the structure of the liquid crystal display device which is driven by means of the IPS mode is reported in WO 1991-010936 A (patent family: U.S. Pat. No. 5,576,867).

EXAMPLES

Examples on the Liquid Crystal Compound (1)

The invention will be explained below in more detail based on examples. However, the invention is not limited to these examples. The term "%" means "% by weight," unless otherwise noted. The resulting compounds were identified on the basis of nuclear magnetic resonance spectra obtained by means of $^1$H-NMR analysis, gas chromatographs obtained by means of gas chromatography (GC) analysis and so forth. Their measurements were based on the methods that will be described below. In Examples, the symbols C, SA, SB, SX, N and I stand for crystals, a smectic A phase, a smectic B phase, a smectic phase where the phase structure is not yet analyzed, a nematic phase and an isotropic phase, respectively. The degree Celsius (° C.) was used for the unit of the phase transition temperature.

$^1$H-NMR Analysis:

A model DRX-500 apparatus (made by Bruker BioSpin Corporation) was used for measurement. Samples were dissolved in deuterated solvents such as $CDCl_3$ in which the samples were soluble, and measured at room temperature by use of the nuclear magnetic resonance spectrometer. Tetramethylsilane (TMS) was used as the standard reference material for the zero point of the δ value. Incidentally, the symbols s, d, t, q and m stand for a singlet, a doublet, a triplet, a quartet and a multiplet, respectively.

Gas Chromatographic Analysis:

A gas chromatograph Model GC-2014 made by Shimadzu Corporation was used for measurement. Helium (2 ml per minute) was used as a carrier gas. The temperature of the sample injector was set at 280° C. and the temperature of the detector (FID) was set at 300° C. A capillary column DB-1 (length 30 m, bore 0.32 mm, film thickness 0.25 micrometer; dimethylpolysiloxane as a stationary liquid phase; non-polar) made by Agilent Technologies Inc. was used for the separation of component compounds. The column was kept at 180° C. for 2 minutes, and then heated to 280° C. at the rate of 5° C. per minute. A sample was dissolved in acetone (0.1% by weight), and 1 microliter of the solution was injected into the sample injector. A recorder used was a Model C-R5A Chromatopac Integrator made by Shimadzu Corporation or its equivalent. The resulting gas chromatogram showed the retention time of peaks and the peak areas corresponding to the component compounds.

A sample was dissolved in toluene to give a 1% by weight solution, and then 1 microliter of the resulting solution was injected into the sample injector.

Chromatopac Model C-R7A made by Shimadzu Corporation or its equivalent was used as a recorder. The resulting gas chromatogram showed the retention time of the peaks and the values of the peak areas corresponding to the component compounds.

Chloroform or hexane, for example, may also be used as a solvent for diluting the sample. The following capillary columns may also be used: DB-1 (length 30 m, bore 0.32 mm, film thickness 0.25 micrometer) made by Agilent Technologies Inc., HP-1 (length 30 m, bore 0.32 mm, film thickness 0.25 micrometer) made by Agilent Technologies Inc., Rtx-1 (length 30 m, bore 0.32 mm, film thickness 0.25 micrometer) made by Restek Corporation, BP-1 (length 30 m, bore 0.32 mm, film thickness 0.25 micrometer) made by SGE International Pty. Ltd. and so forth.

The ratio of the peak areas in the gas chromatogram corresponds to the ratio of component compounds. In general, the percentage by weight of each component compound in an analytical sample is not completely the same as the percentage of each peak area in the analytical sample. In the invention, however, the percentage by weight of the component compound in the analytical sample corresponds substantially to the percentage of the peak area in the analytical sample, because the correction coefficient is essentially 1 (one) when the columns described above are used. This is because there is no significant difference among the correction coefficients of the liquid crystal compounds as components. An internal standard method using gas chromatograms is used in order to determine the composition ratio of the liquid crystal compounds in the liquid crystal composition more accurately by means of the gas chromatograms. Each liquid crystal compound (test-component) weighed accurately in a fixed amount and a liquid crystal compound serving as a reference (standard reference material) are analyzed simultaneously by means of gas chromatography, and the relative intensity is calculated in advance from the ratio of the peak area of the test-component to that of the standard reference material. Then, the composition ratio of the liquid crystal compounds in the liquid crystal composition can be determined more accurately by means of the gas-chromatographic analysis using the correction method based on the relative intensity of the peak area of each component to that of the standard reference material.

Example 1

4-Ethoxy-2,3,3'-trifluoro-4'-((propylcyclohexyl)methoxy)biphenyl (1-1-8) was prepared according to the synthetic scheme described below.

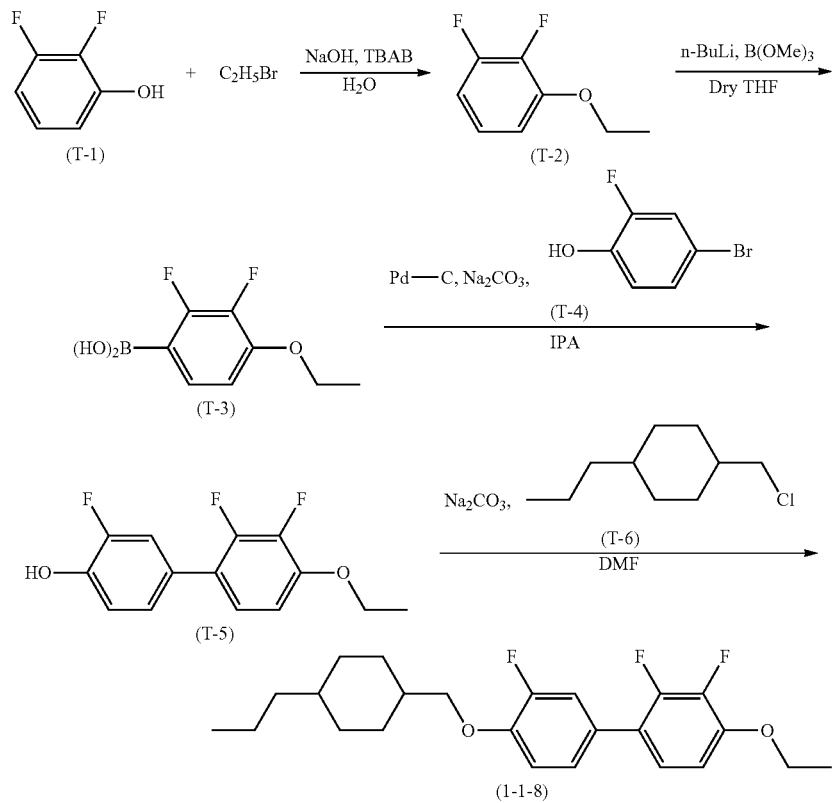

Preparation of 1-ethoxy-2,3-difluorobenzene (T-2)

Sodium hydroxide (75.9 g) was added to a water (400 ml) solution of 2,3-difluorophenol (T-1) (195.0 g), bromoethane (196.2 g) and tetrabutylammonium bromide (TBAB) (24.2 g), and the mixture was heated with stirring at 80° C. for 6 hours under an atmosphere of nitrogen. After the completion of the reaction, the reaction mixture was extracted with heptane, and the organic layer was washed with water and brine, and then dried over anhydrous magnesium sulfate. The solution was concentrated under reduced pressure to leave a black oil. The oil was purified by distillation to give 1-ethoxy-2,3-difluorobenzene (T-1) as a colorless oil (230.0 g) in 97% yield.

Preparation of 1-ethoxy-2,3-difluorophenylboronic acid (T-3)

The compound (T-2) (129.5 g) obtained in the above procedure was dissolved in dried tetrahydrofuran (hereinafter, abbreviated to dried THF) (500 ml) , and the solution was cooled to −70° C. n-BuLi (500 ml) was added dropwise under an atmosphere of nitrogen, and the stirring was continued at −70° C. for 2 another hours. Then, trimethyl borate (129.5 g) in a dried THF solution was added dropwise slowly at −70° C., and warmed up to room temperature. The stirring was continued for another 16 hours. After the completion of the reaction, 2N—HCl (200 ml) was added to the mixture. The mixture was extracted with toluene, and washed with water and brine, and then dried over anhydrous magnesium sulfate. The solution was concentrated under reduced pressure to leave pale brown solids. Recrystallization (heptane:toluene=4:1 by volume) gave the compound (T-3) as colorless powders (117.2 g) in 71% yield.

Preparation of 4'-ethoxy-2',3,3'-trifluorobiphenyl-4-ol (T-5)

The compound (T-3) (88.8 g) obtained in the above procedure, 4-bromo-2-fluorophenol (T-4) (76.4 g), sodium carbonate (50.8 g) and Pd—C (NX type) (0.21 g) were dissolved in Solmix (400 ml) and the mixture was heated to reflux for 6 hours under an atmosphere of nitrogen. After the completion of the reaction, the reaction mixture was filtered through Celite, and the filtrate was extracted with toluene. The organic layer was washed with an aqueous 2N-sodium hydroxide solution, a saturated aqueous solution of sodium hydrogencarbonate, water and brine, and then dried over anhydrous magnesium sulfate. The solution was concentrated under reduced pressure to leave pale brown solids. Recrystallization (heptane:toluene=4:1 by volume) gave 4'-ethoxy-2',3,3'-trifluorobiphenyl-4-ol (T-5) as colorless powders (72.0 g) in 67% yield.

Preparation of 4-ethoxy-2,3,3'-trifluoro-4'-((propyl-cyclohexyl)methoxy)biphenyl (1-1-8)

The compound (T-5) (4.02 g) obtained in the above procedure and 1-chloromethyl-4-propylcyclohexane (T-6) (3.15 g) were dissolved in DMF (100 ml), and sodium carbonate (2.39 g) was added to the solution, and then the mixture was heated with stirring at 80° C. for 3 hours under an atmosphere of nitrogen. After the completion of the reaction, the reaction mixture was extracted with toluene, and the organic layer was washed with a saturated aqueous solution of sodium hydrogencarbonate, water and brine, and then dried over anhydrous magnesium sulfate. The solution was concentrated under reduced pressure to leave pale brown solids. Silica gel chromatography (heptane:ethyl acetate=20:1 by volume) and recrystallization (heptane:ethanol=1:1 by volume) gave the titled compound (1-1-8) as colorless powders (4.7 g) in 77% yield.

A sample was prepared by mixing 15% by weight of the compound and 85% by weight of the mother liquid crystals (A), which will be described in Composition Examples below, and the values of physical properties were calculated from the values obtained by measurement according to the extrapolation method. (Extrapolated value)=[(Measured value of a sample)−0.85×(Measured value of mother liquid crystals (A))]/0.15. Physical property values of this compound were that NI=123.9° C.; $\Delta\varepsilon$=−7.24; $\Delta n$=0.170; $\eta$=97.2 mPa·s; $K_{33}/K_{11}$=1.267; and C 91.2 N 129.7 Iso.

$^1$H-NMR (CDCl$_3$): δ (ppm); 7.25(d, 1H), 7.19(d, 1H), 7.05(t, 1H), 6.99(t, 1H), 6.78(t, 1H), 4.15(q, 2H), 3.86(d, 2H), 1.93(d, 2H), 1.81(d, 3H), 1.48(t, 3H), 1.37-1.16(m, 5H), 1.07 (q, 2H), 0.96(t, 2H) and 0.89(t, 3H).

Example 2

4-Ethoxy-2,3,3'-trifluoro-4'-((pentylcyclohexyl)methoxy)biphenyl (1-1-29) was obtained as colorless powders (3.66 g) in 62% yield in the same manner as in Example 1, from 4'-ethoxy-2',3,3'-trifluorobiphenyl-4-ol (3.00 g) and 1-chloromethyl-4-pentylcyclohexane (2.95 g).

Physical property values of this compound were that NI=126.6° C.; $\Delta\varepsilon$=−7.10; $\Delta n$=0.167; $\eta$=81.9 mPa~s; $K_{33}/K_{11}$=1.430; and C 59.4 C 82.5 N 132.0 Iso. The physical property values were measured in the same manner as in Example 1.

$^1$H-NMR (CDCl$_3$): δ (ppm); 7.23(d, 1H), 7.18(d, 1H), 7.05(t, 1H), 6.97(t, 1H), 6.78(t, 1H), 4.09(q, 2H), 3.90(d, 2H), 1.99-1.93(md, 1H), 1.58-1.39(m, 10H), 1.37-1.26(m, 8H), 1.32(t, 3H) and 0.88(t, 3H).

Example 3

4-Butoxy-2,3,3'-trifluoro-4'-((pentylcyclohexyl)methoxy)biphenyl (1-1-34) was obtained as colorless powders (2.0 g) in 31% yield in the same manner as in Example 1, from 4'-butoxy-2',3,3'-trifluorobiphenyl-4-ol (4.44 g) and 1-chloromethyl-4-pentylcyclohexane (3.65 g).

Physical property values were that NI=118.6° C.; $\Delta\varepsilon$= −6.79; $\Delta n$=0.175; $\eta$=101.1 mPa·s; $K_{33}/K_{11}$=1.373; and C 95.9 ($S_A$ 92.1) N 123.1 Iso. The physical property values were measured in the same manner as in Example 1.

$^1$H-NMR (CDCl$_3$): δ (ppm); 7.24(d, 1H), 7.19(d, 1H), 7.04(t, 1H), 6.99(t, 1H), 6.78(t, 1H), 4.08(t, 2H), 3.86(d, 2H), 1.93(d, 2H), 1.86-1.77(m, 5H), 1.58-1.48(m, 2H), 1.35-1.16 (m, 9H), 1.07 (q, 2H), 0.99 (t, 3H), 0.97 (q, 2H) and 0.89 (t, 3H).

Example 4

4-((4'-Ethoxy-2',3,3'-trifluorobiphenyl-4-yloxy)methyl)-4'-propylbicyclohexane (1-3-8) was obtained as a colorless powders (2.2 g) in 45% yield in the same manner as in Example 1, from 4'-ethoxy-2',3,3'-trifluorobiphenyl-4-ol (2.68 g) and 4-chloromethyl-4'-propylbicyclohexane (3.61 g).

Physical property values of this compound were that NI=228.6° C.; $\Delta\varepsilon$=−6.04; $\Delta n$=0.191; $\eta$=79.5 mPa·s; $K_{33}/K_{11}$=1.223; and C 137.7 N 252.3 Iso. The physical property values were measured in the same manner as in Example 1.

$^1$H-NMR (CDCl$_3$): δ (ppm); 7.24(d, 1H), 7.19(d, 1H), 7.05(t, 1H), 6.99(t, 1H), 6.78(t, 1H), 4.15(q, 2H), 3.85(d, 2H), 1.96(s, 2H), 1.83-1.68(m, 7H), 1.48(t, 3H), 1.34-1.26(m, 2H), 1.18-0.80 (m, 13H) and 0.88 (t, 3H).

Example 5

4-((4'-Ethoxy-2',3,3'-trifluorobiphenyl-4-yloxy)methyl)-4'-pentylbicyclohexane (1-3-29) was obtained as colorless powders (4.2 g) in 87% yield in the same manner as in Example 1, from 4'-ethoxy-2',3,3'-trifluorobiphenyl-4-ol (2.50 g) and 4-chloromethyl-4'-pentylbicyclohexane (3.99 g).

Physical property values of this compound were that NI=226.6° C.; $\Delta\varepsilon$=−7.23; $\Delta n$=0.187; $\eta$=69.9 mPa·s; $K_{33}/K_{11}$=1.261; and C 49.5 C 121.2 $S_A$ 131.7 N 242.0 Iso. The physical property values were measured in the same manner as in Example 1.

$^1$H-NMR (CDCl$_3$): δ (ppm); 7.24(d, 1H), 7.19(d, 1H), 7.05(t, 1H), 6.99(t, 1H), 6.78(t, 1H), 4.16(q, 2H), 3.86(d, 2H), 1.96(s, 2H), 1.53-1.38(m, 12H), 1.48(t, 3H), 1.35-1.26(m, 12H) and 0.88(t, 3H).

Example 6

4-((4'-Butoxy-2',3,3'-trifluorobiphenyl-4-yloxy)methyl)-4'-pentylbicyclohexane (1-3-34) was obtained as colorless powders (2.3 g) in 28% yield in the same manner as in Example 1, from 4'-butoxy-2',3,3'-trifluorobiphenyl-4-ol (4.44 g) and 4-chloromethyl-4'-pentylbicyclohexane (8.73 g).

Physical property values of this compound were that NI=211.3° C.; $\Delta\varepsilon$=−5.72; $\Delta n$=0.181; $\eta$=89.9 mPa·s; $K_{33}/K_{11}$=1.202; and C 84.8 $S_A$ 172.5 N 228.9 Iso. The physical property values were measured in the same manner as in Example 1.

$^1$H-NMR (CDCl$_3$): δ (ppm); 7.24(d, 1H), 7.19(d, 1H), 7.04(t, 1H), 6.99(t, 1H), 6.78(t, 1H), 4.08(t, 2H), 3.85(d, 2H), 1.97(s, 2H), 1.86-1.68(m, 8H), 1.57-1.48(m, 2H), 1.34-0.80 (m, 20H), 0.99(t, 3H) and 0.89(t, 3H).

Example 7

4-((4'-Ethoxy-2',3,3'-trifluorobiphenyl-4-yloxy)methyl)-4'-vinylbicyclohexane (1-3-51) was obtained as colorless powders (4.5 g) in 64% yield in the same manner as in Example 1, from 4'-ethoxy-2',3,3'-trifluorobiphenyl-4-ol (4.02 g) and 4-chloromethyl-4'-vinylbicyclohexane (6.79 g).

Physical property values of this compound were that NI=207.3° C.; Δ∈=−6.32; Δn=0.192; η=88.6 mPa·s; $K_{33}/K_{11}$=1.264; and C 113.8 N 240.3 Iso. The physical property values were measured in the same manner as in Example 1.

$^1$H-NMR (CDCl$_3$): δ (ppm); 7.24(d, 1H), 7.19(d, 1H), 7.04(t, 1H), 6.99(t, 1H), 6.78(t, 1H), 5.82-5.73(m, 1H), 4.96 (d, 1H), 4.88(d, 1H), 4.15(q, 2H), 3.85(d, 2H), 2.00-1.73(m, 10H), 1.48(t, 3H) and 1.13-0.99(m, 10H).

Example 8

4'-Butoxy-2,3,3'-trifluoro-4-((propylcyclohexyl)methoxy)biphenyl (1-2-13) was prepared according to the following scheme.

Preparation of 4-butoxy-3-fluorophenylboronic acid (T-9)

The compound (T-8) (97.5 g) obtained in the above procedure was dissolved in dried THF (500 ml) and the solution was cooled to −70° C. n-BuLi (241 ml) was added dropwise under an atmosphere of nitrogen, and the stirring was continued at −70° C. for another 2 hours. Then, trimethyl borate (62.4 g) in a dried THF solution was added dropwise slowly at −70° C., and the mixture was warmed up to room temperature. The stirring was continued for another 16 hours. After the completion of the reaction, 2N—HCl (200 ml) was added to the reaction mixture. The mixture was extracted with toluene, and the organic layer was washed with water and brine, and then dried over anhydrous magnesium sulfate. The solution was concentrated under reduced pressure to leave pale

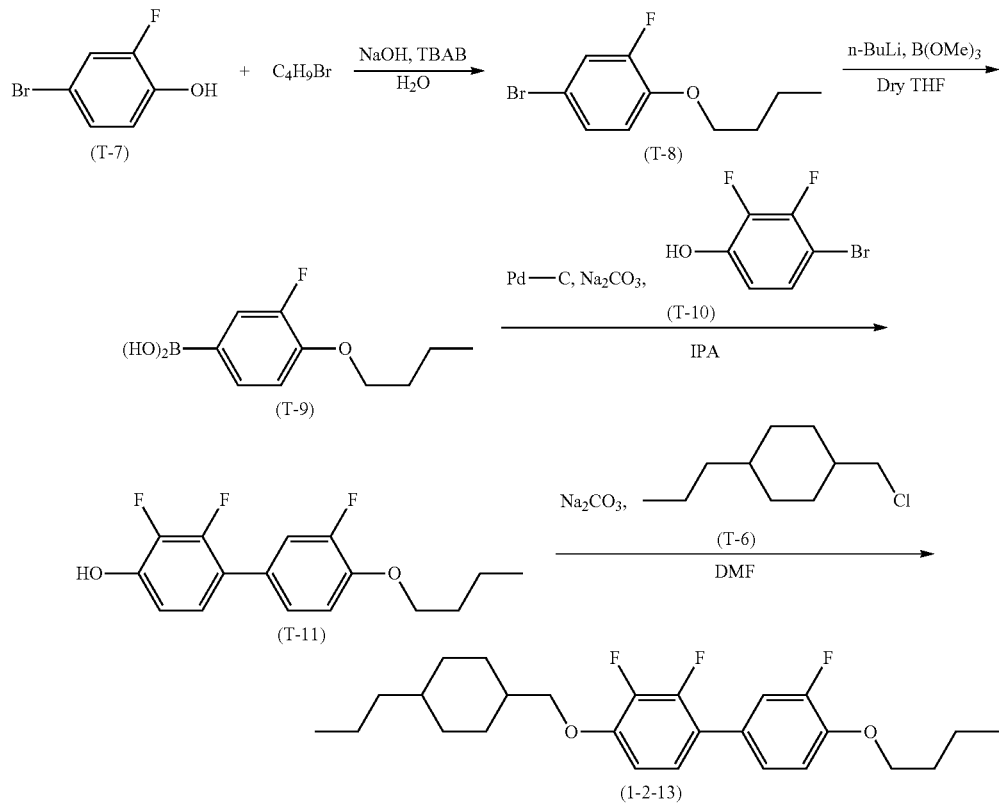

Preparation of 4-bromo-1-butoxy-2-fluorobenzene (T-8)

Sodium hydroxide (20.2 g) was added to a water (400 ml) solution of 4-bromo-2-fluorophenol (T-7) (76.4 g), bromobutane (65.8 g) and tetrabutylammonium bromide (TBAB) (6.44 g), and the mixture was heated with stirring at 80° C. for 6 hours under an atmosphere of nitrogen. After the completion of the reaction, the reaction mixture was extracted with heptane, and the organic layer was washed with water and brine, and then dried over anhydrous magnesium sulfate. The solution was concentrated under reduced pressure to leave a black oil. The oil was purified by distillation to give 4-bromo-1-butoxy-2-fluorobenzene (T-8) as a colorless oil (97.5 g) in 98% yield.

brown solids. Recrystallization (heptane:toluene=4:1 by volume) gave the compound (T-9) as colorless powders (54.8 g) in 66% yield.

Preparation of 4'-butoxy-2,3,3'-trifluorobiphenyl-4-ol (T-11)

The compound (T-9) (30.0 g) obtained in the above procedure, 4-bromo-2,3-difluorophenol (T-10) (26.9 g), sodium carbonate (37.5 g) and Pd—C (NX type) (0.11 g) were dissolved in Solmix (300 ml) and the mixture was heated to reflux for 6 hours under an atmosphere of nitrogen. After the completion of the reaction, the reaction mixture was filtered through Celite. The filtrate was extracted with toluene, and the organic layer was washed with a 2N-aqueous sodium hydroxide solution, a saturated aqueous solution of sodium hydrogencarbonate, water and brine, and then dried over anhydrous magnesium sulfate. The solution was concentrated under reduced pressure to leave pale brown solids. Recrystallization (heptane: toluene=4:1 by volume) gave 4'-butoxy-2,3,3'-trifluorobiphenyl-4-ol (T-11) as colorless powders (24.1 g) in 56% yield.

Preparation of 4'-butoxy-2,3,3'-trifluoro-4-((propylcyclohexyl)methoxy)biphenyl (1-2-13)

The compound (T-11) (2.50 g) obtained in the above procedure and 1-chloromethyl-4-propylcyclohexane (T-6) (2.22 g) were dissolved in DMF (100 ml), and sodium carbonate (1.75 g) was added, and then the mixture was heated with stirring at 80° C. for 3 hours under an atmosphere of nitrogen. After the completion of the reaction, the reaction mixture was extracted with toluene, and the organic layer was washed with a saturated aqueous solution of sodium hydrogencarbonate, water and brine, and then dried over anhydrous magnesium sulfate. The solution was concentrated under reduced pressure to leave pale brown solids. Silica gel chromatography (heptane:ethyl acetate=20:1 by volume) and recrystallization (heptane:ethanol=1:1 by volume) gave the titled compound (1-2-13) as colorless powders (3.0 g) in 82% yield.

Physical property values of this compound were that NI=118.6° C.; Δ∈=−6.79; Δn=0.170; η=101.1 mPa·s; $K_{33}/K_{11}$=1.373; and C 95.9 ($S_A$ 92.1) N 123.1 Iso. The physical property values were measured in the same manner as in Example 1.

$^1$H-NMR (CDCl$_3$): δ (ppm); 7.43(d, 1H), 7.41(d, 1H), 7.31(t, 1H), 7.08(t, 1H), 6.78(t, 1H), 4.06(q, 2H), 3.90(d, 2H), 2.00-1.78(m, 1H), 1.65-1.58(m, 2H), 1.56-1.39(m, 7H), 1.35-1.28(m, 8H), 0.99(t, 3H) and 0.89(t, 3H).

Example 9 for Reference 4-((4'-Butoxy-2,3,3'-trifluorobiphenyl-4-yloxy)methyl)-4'-propylbicyclohexane (1-4-13) was obtained as colorless powders (2.9 g) in 83% yield in the same manner as in Example 8, from 4'-butoxy-2,3,3'-trifluorobiphenyl-4-ol (2.00 g) and 4-chloromethyl-4'-propylbicyclohexane (2.64 g).

Physical property values of this compound were that NI=214.6° C.; Δ∈=−6.06; Δn=0.174; η=8.5 mPa·s; $K_{33}/K_{11}$=1.424; and C 86.8 $S_A$ 179.8 N 235.5 Iso. The physical property values were measured in the same manner as in Example 1.

$^1$H-NMR (CDCl$_3$): δ (ppm); 7.43(d, 1H), 7.41(d, 1H), 7.30(t, 1H), 7.08(t, 1H), 6.78(t, 1H), 4.05(t, 2H), 3.90(d, 2H), 2.00-1.77(m, 1H), 1.66-1.58(m, 2H), 1.56-1.31(m, 15H), 1.30-1.15(m, 10H), 0.99(t, 3H) and 0.89(t, 3H).

Example 10 for Reference 4-((4'-Butoxy-2,3,3'-trifluorobiphenyl-4-yloxy)methyl)-4'-vinylbicyclohexane (1-4-55) was obtained as colorless powders (3.2 g) in 71% yield in the same manner as in Example 8, from 4'-butoxy-2,3,3'-trifluorobiphenyl-4-ol (2.67 g) and 4-chloromethyl-4'-vinylbicyclohexane (3.39 g).

Physical property values of this compound were that NI=206.6° C.; Δ∈=−6.63; Δn=0.176; η=98.6 mPa·s; $K_{33}/K_{11}$=1.112; and C 91.7 $S_A$ 151.0 N 230.4 Iso. The physical property values were measured in the same manner as in Example 1.

$^1$H-NMR (CDCl$_3$): δ (ppm); 7.43(d, 1H), 7.41(d, 1H), 7.04(t, 1H), 6.99(t, 1H), 6.78(t, 1H), 5.82-5.73(m, 1H), 4.99 (d, 2H), 4.93(d, 1H), 4.06(t, 2H), 3.90(d, 2H), 2.25-2.08(m, 1H), 1.99-1.88(m, 2H), 1.78-1.65(m, 2H), 1.63-1.41(m, 10H), 1.40-1.21(m, 9H) and 0.90(t, 3H).

Example for Reference

4'-Butoxy-2,3,3'-trifluorobiphenyl-4-yl 4'-propylbicyclohexane-4-carboxylate (1-4-14) was prepared according to the synthetic scheme described below.

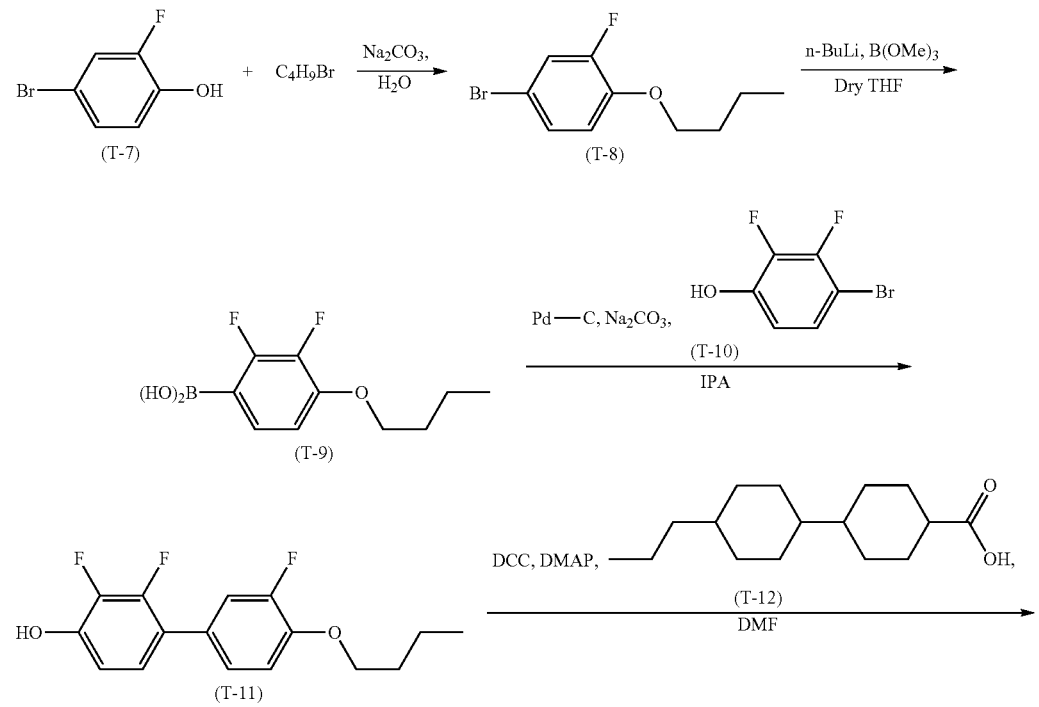

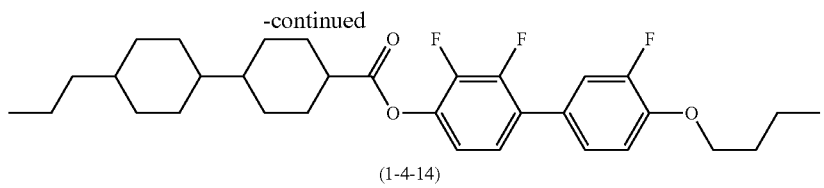

(1-4-14)

Preparation of 4'-butoxy-2,3,3'-trifluorobiphenyl-4-yl 4'-propylbicyclohexane-4-carboxylate (1-4-14)

4'-Butoxy-2,3,3'-trifluorobiphenyl-4-ol (T-11) (2.00 g) prepared in Example 8, dicyclohexylcarbodiimide (DCC) (1.46 g) and dimethylaminopyridine (DMAP) (0.08 g) were dissolved in toluene (100 ml), and 4'-propylbicyclohexane-4-carboxylic acid (1.70 g) was added, and then the stirring was continued at room temperature for another 16 hours. After the completion of the reaction, the reaction mixture was filtered and the filtrate was extracted with toluene. The organic layer was washed with a 1N—HCl aqueous solution, a 1N-aqueous sodium hydroxide solution, a saturated aqueous solution of sodium hydrogencarbonate, water and brine, and then dried over anhydrous magnesium sulfate. The solution was concentrated under reduced pressure to leave pale brown solids. Silica gel chromatography (heptane:ethyl acetate=20:1 by volume) and recrystallization (heptane:toluene=4:1 by volume) gave 4'-butoxy-2,3,3'-trifluorobiphenyl-4-yl 4'-propylbicyclohexane-4-carboxylate (1-8-14) as colorless powders (2.39 g) in 67% yield.

Physical property values of this compound were that NI=244.6° C.; $\Delta\varepsilon$=−4.76; $\Delta n$=0.167; $\eta$=75.7 mPa·s; $K_{33}/K_{11}$=1.274; and C 72.0 N 303.2 Iso. The physical property values were measured in the same manner as in Example 1.

$^1$H-NMR (CDCl$_3$): δ (ppm); 7.43(d, 1H), 7.40(d, 1H), 7.28(t, 1H), 7.10(t, 1H), 6.78(t, 1H), 4.06(t, 2H), 2.38-2.25 (m, 1H), 1.78-1.66(m, 2H), 1.58-1.38(m, 15H), 1.36-1.25(m, 10H), 0.99(t, 3H) and 0.89(t, 3H).

Example 12

3-Chloro-4-ethoxy-2,3'-difluoro-4'-((4-propylcyclohexyl)methoxy)biphenyl (1-1-10) was obtained as colorless powders (2.30 g) in 54% yield in the same manner as in Example 1, from 3'-chloro-4'-ethoxy-2',3-difluorobiphenyl-4-ol (2.85 g) and 4-chloromethyl-4'-propylcyclohexane (1.93 g).

Physical property values of this compound were that NI=112.6° C.; $\Delta\varepsilon$=−6.58; $\Delta n$=0.161; $\eta$=125.6 mPa·s; K33/K11=1.299; and C 76.8 N 117.3 Iso. The physical property values were measured in the same manner as in Example 1.

1H-NMR (CDCl$_3$): δ (ppm); 7.27-7.16(m, 3H), 6.99(t, 1H), 6.77(d, 1H), 4.15(q, 2H), 3.86(d, 2H), 1.93(d, 2H), 1.81 (d, 3H), 1.50(t, 3H), 1.37-0.90(m, 9H) and 0.88(t, 3H).

Example 13

4-((3'-Chloro-4'-ethoxy-2',3-difluorobiphenyl-4-yloxy)methyl)-4'-propylbi(cyclohexane) (1-3-10) was obtained as colorless powders (3.50 g) in 69% yield in the same manner as in Example 1, from 3'-chloro-4'-ethoxy-2',3-difluorobiphenyl-4-ol (2.85 g) and 4-chloromethyl-4'-propylbicyclohexane (2.57 g).

Physical property values of this compound were that NI=212.6° C.; $\Delta\varepsilon$=−5.71; $\Delta n$=0.171; $\eta$=121.2 mPa·s; K33/K11=1.328; and C 102.4 N 237.3 Iso. The physical property values were measured in the same manner as in Example 1.

$^1$H-NMR (CDCl$_3$): δ (ppm); 7.26-7.16(m, 3H), 6.98(t, 1H), 6.77(d, 1H), 4.15(q, 2H), 3.85(d, 2H), 1.95(brs, 2H), 1.83-1.38(m, 7H), 1.49(t, 3H), 1.35-0.80(m, 15H) and 0.87(t, 3H).

Example 14

4'-Ethoxy-2',3,3'-trifluorobiphenyl-4-yl 4-propylcyclohexanecarboxylate (1-1-9) was prepared as colorless powders (2.70 g) in 32% yield in the same manner as in Example 11, from 4'-ethoxy-2',3,3'-trifluorobiphenyl-4-ol (T-5) (5.36 g), dicyclohexylcarbodiimide (DCC) (4.53 g), dimethylaminopyridine (DMAP) (0.244 g) and 4'-propylcyclohexane-4-carboxylic acid (5.10 g).

Physical property values of this compound were that NI=145.9° C.; $\Delta\varepsilon$=−6.08; $\Delta n$=0.164; $\eta$=65.8 mPa·s; $K_{33}/K_{11}$=1.438; and C 101.9 N 194.9 Iso. The physical property values were measured in the same manner as in Example 1.

$^1$H-NMR (CDCl$_3$): δ (ppm); 7.31(d, 1H), 7.26(d, 1H), 7.16(t, 1H), 7.07(t, 1H), 6.79(t, 1H), 4.16(q, 2H), 2.52-2.59 (m, 1H), 2.17(d, 2H), 1.89(d, 2H), 1.64-1.53(m, 2H), 1.48(t, 3H), 1.38-1.18(m, 5H), 1.04-0.95(m, 2H) and 0.90(t, 3H).

Compounds listed in Table 1 to Table 8 below are prepared based on the synthetic methods described in Example 1 to Example 14. The compounds (1-1-8), (1-1-9), (1-1-10), (1-1-29), (1-1-34), (1-2-13), (1-3-8), (1-3-10), (1-3-29), (1-3-34), (1-3-51), (1-4-13), (1-4-14) and (1-4-55) are listed again in the tables.

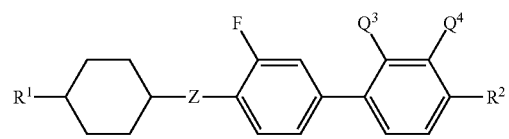

(1-1)

TABLE 1

| No. | $R^1$ | Z | $Q^3$ | $Q^4$ | $R^2$ |
|---|---|---|---|---|---|
| 1-1-1 | CH$_3$ | CH$_2$O | F | F | OC$_2$H$_5$ |
| 1-1-2 | CH$_3$ | CH$_2$O | F | F | OC$_4$H$_9$ |
| 1-1-3 | C$_2$H$_5$ | CH$_2$O | F | F | OC$_2$H$_5$ |
| 1-1-4 | C$_2$H$_5$ | CH$_2$O | F | F | OC$_4$H$_9$ |
| 1-1-5 | C$_3$H$_7$ | CH$_2$O | F | F | C$_3$H$_7$ |
| 1-1-6 | C$_3$H$_7$ | CH$_2$O | F | F | C$_5$H$_{11}$ |
| 1-1-7 | C$_3$H$_7$ | CH$_2$O | F | F | OCH$_3$ |
| 1-1-8 | C$_3$H$_7$ | CH$_2$O | F | F | OC$_2$H$_5$ |
| 1-1-9 | C$_3$H$_7$ | COO | F | F | OC$_2$H$_5$ |
| 1-1-10 | C$_3$H$_7$ | CH$_2$O | F | Cl | OC$_2$H$_5$ |
| 1-1-11 | C$_3$H$_7$ | CH$_2$O | Cl | F | OC$_2$H$_5$ |
| 1-1-12 | C$_3$H$_7$ | CH$_2$O | F | F | OC$_3$H$_7$ |
| 1-1-13 | C$_3$H$_7$ | CH$_2$O | F | F | OC$_4$H$_9$ |
| 1-1-14 | C$_3$H$_7$ | COO | F | F | OC$_4$H$_9$ |
| 1-1-15 | C$_3$H$_7$ | CH$_2$O | F | Cl | OC$_4$H$_9$ |
| 1-1-16 | C$_3$H$_7$ | CH$_2$O | Cl | F | OC$_4$H$_9$ |
| 1-1-17 | C$_3$H$_7$ | CH$_2$O | F | F | OC$_5$H$_{11}$ |
| 1-1-18 | C$_3$H$_7$ | CH$_2$O | F | F | OC$_6$H$_{13}$ |

TABLE 1-continued

| No. | R¹ | Z | Q³ | Q⁴ | R² |
|---|---|---|---|---|---|
| 1-1-19 | $C_3H_7$ | $CH_2O$ | F | F | $OC_7H_{15}$ |
| 1-1-20 | $C_3H_7$ | $CH_2O$ | F | F | $OC_8H_{17}$ |
| 1-1-21 | $C_3H_7$ | $CH_2O$ | F | F | $OCH=CH_2$ |
| 1-1-22 | $C_3H_7$ | $CH_2O$ | F | F | $OCH_2CH=CH_2$ |
| 1-1-23 | $C_3H_7$ | $CH_2O$ | F | F | $OCH_2CH=CH(CH_2)_2CH=CH_2$ |
| 1-1-24 | $C_4H_9$ | $CH_2O$ | F | F | $OC_2H_5$ |
| 1-1-25 | $C_4H_9$ | $CH_2O$ | F | F | $OC_4H_9$ |
| 1-1-26 | $C_5H_{11}$ | $CH_2O$ | F | F | $C_3H_7$ |
| 1-1-27 | $C_5H_{11}$ | $CH_2O$ | F | F | $C_5H_{11}$ |
| 1-1-28 | $C_5H_{11}$ | $CH_2O$ | F | F | $OCH_3$ |
| 1-1-29 | $C_5H_{11}$ | $CH_2O$ | F | F | $OC_2H_5$ |
| 1-1-30 | $C_5H_{11}$ | COO | F | F | $OC_2H_5$ |
| 1-1-31 | $C_5H_{11}$ | $CH_2O$ | F | Cl | $OC_2H_5$ |
| 1-1-32 | $C_5H_{11}$ | $CH_2O$ | Cl | F | $OC_2H_5$ |
| 1-1-33 | $C_5H_{11}$ | $CH_2O$ | F | F | $OC_3H_7$ |
| 1-1-34 | $C_5H_{11}$ | $CH_2O$ | F | F | $OC_4H_9$ |
| 1-1-35 | $C_5H_{11}$ | COO | F | F | $OC_4H_9$ |

TABLE 2

| No. | R¹ | Z | Q³ | Q⁴ | R² |
|---|---|---|---|---|---|
| 1-1-36 | $C_5H_{11}$ | $CH_2O$ | F | Cl | $OC_4H_9$ |
| 1-1-37 | $C_5H_{11}$ | $CH_2O$ | Cl | F | $OC_4H_9$ |
| 1-1-38 | $C_5H_{11}$ | $CH_2O$ | F | F | $OC_5H_{11}$ |
| 1-1-39 | $C_5H_{11}$ | $CH_2O$ | F | F | $OC_6H_{13}$ |
| 1-1-40 | $C_5H_{11}$ | $CH_2O$ | F | F | $OC_7H_{15}$ |
| 1-1-41 | $C_5H_{11}$ | $CH_2O$ | F | F | $OC_8H_{17}$ |
| 1-1-42 | $C_5H_{11}$ | $CH_2O$ | F | F | $OCH=CH_2$ |
| 1-1-43 | $C_5H_{11}$ | $CH_2O$ | F | F | $OCH_2CH=CH_2$ |
| 1-1-44 | $C_6H_{13}$ | $CH_2O$ | F | F | $OC_2H_5$ |
| 1-1-45 | $C_6H_{13}$ | $CH_2O$ | F | F | $OC_4H_9$ |
| 1-1-46 | $C_7H_{15}$ | $CH_2O$ | F | F | $OC_2H_5$ |
| 1-1-47 | $C_7H_{15}$ | $CH_2O$ | F | F | $OC_4H_9$ |
| 1-1-48 | $C_8H_{17}$ | $CH_2O$ | F | F | $OC_2H_5$ |
| 1-1-49 | $C_9H_{19}$ | $CH_2O$ | F | F | $OC_2H_5$ |
| 1-1-50 | $C_9H_{19}$ | $CH_2O$ | F | F | $OC_4H_9$ |
| 1-1-51 | $CH_2=CH$ | $CH_2O$ | F | F | $OC_2H_5$ |
| 1-1-52 | $CH_2=CH$ | COO | F | F | $OC_2H_5$ |
| 1-1-53 | $CH_2=CH$ | $CH_2O$ | F | Cl | $OC_2H_5$ |
| 1-1-54 | $CH_2=CH$ | $CH_2O$ | Cl | F | $OC_2H_5$ |
| 1-1-55 | $CH_2=CH$ | $CH_2O$ | F | F | $OC_4H_9$ |
| 1-1-56 | $CH_2=CH$ | COO | F | F | $OC_4H_9$ |
| 1-1-57 | $CH_2=CH$ | $CH_2O$ | F | F | $OCH=CH_2$ |
| 1-1-58 | $CH_2=CH$ | $CH_2O$ | F | F | $OCH_2CH=CH_2$ |
| 1-1-59 | $CH_3CH=CH$ | $CH_2O$ | F | F | $OC_2H_5$ |
| 1-1-60 | $CH_3CH=CH$ | COO | F | F | $OC_2H_5$ |
| 1-1-61 | $CH_3CH=CH$ | $CH_2O$ | F | Cl | $OC_2H_5$ |
| 1-1-62 | $CH_3CH=CH$ | $CH_2O$ | Cl | F | $OC_2H_5$ |
| 1-1-63 | $CH_3CH=CH$ | $CH_2O$ | F | F | $OC_4H_9$ |
| 1-1-64 | $CH_3CH=CH$ | COO | F | F | $OC_4H_9$ |
| 1-1-65 | $CH_2=CH(CH_2)_2$ | $CH_2O$ | F | F | $OC_2H_5$ |
| 1-1-66 | $CH_2=CH(CH_2)_2$ | $CH_2O$ | F | F | $OC_4H_9$ |
| 1-1-67 | $CH_3CH=CH(CH_2)_2$ | $CH_2O$ | F | F | $OC_2H_5$ |
| 1-1-68 | $CH_3CH=CH(CH_2)_2$ | $CH_2O$ | F | F | $OC_4H_9$ |
| 1-1-69 | $CH_2=CH(CH_2)_2CH=CH$ | $CH_2O$ | F | F | $OC_2H_5$ |
| 1-1-70 | $CH_2=CH(CH_2)_2CH=CH(CH_2)_2$ | $CH_2O$ | F | F | $OC_2H_5$ |

(1-2)

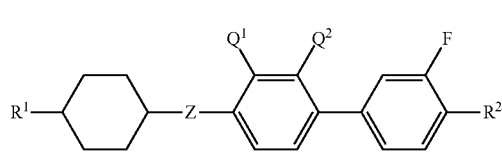

TABLE 3

| No. | R¹ | Z | Q¹ | Q² | R² |
|---|---|---|---|---|---|
| 1-2-1 | $CH_3$ | $CH_2O$ | F | F | $OC_2H_5$ |
| 1-2-2 | $CH_3$ | $CH_2O$ | F | F | $OC_4H_9$ |
| 1-2-3 | $C_2H_5$ | $CH_2O$ | F | F | $OC_2H_5$ |
| 1-2-4 | $C_2H_5$ | $CH_2O$ | F | F | $OC_4H_9$ |
| 1-2-5 | $C_3H_7$ | $CH_2O$ | F | F | $C_3H_7$ |
| 1-2-6 | $C_3H_7$ | $CH_2O$ | F | F | $C_5H_{11}$ |
| 1-2-7 | $C_3H_7$ | $CH_2O$ | F | F | $OCH_3$ |
| 1-2-8 | $C_3H_7$ | $CH_2O$ | F | F | $OC_2H_5$ |
| 1-2-9 | $C_3H_7$ | COO | F | F | $OC_2H_5$ |
| 1-2-10 | $C_3H_7$ | $CH_2O$ | F | Cl | $OC_2H_5$ |
| 1-2-11 | $C_3H_7$ | $CH_2O$ | Cl | F | $OC_2H_5$ |
| 1-2-12 | $C_3H_7$ | $CH_2O$ | F | F | $OC_3H_7$ |
| 1-2-13 | $C_3H_7$ | $CH_2O$ | F | F | $OC_4H_9$ |
| 1-2-14 | $C_3H_7$ | COO | F | F | $OC_4H_9$ |
| 1-2-15 | $C_3H_7$ | $CH_2O$ | F | Cl | $OC_4H_9$ |
| 1-2-16 | $C_3H_7$ | $CH_2O$ | Cl | F | $OC_4H_9$ |
| 1-2-17 | $C_3H_7$ | $CH_2O$ | F | F | $OC_5H_{11}$ |
| 1-2-18 | $C_3H_7$ | $CH_2O$ | F | F | $OC_6H_{13}$ |

TABLE 3-continued

| No. | R¹ | Z | Q¹ | Q² | R² |
|---|---|---|---|---|---|
| 1-2-19 | $C_3H_7$ | $CH_2O$ | F | F | $OC_7H_{15}$ |
| 1-2-20 | $C_3H_7$ | $CH_2O$ | F | F | $OC_8H_{17}$ |
| 1-2-21 | $C_3H_7$ | $CH_2O$ | F | F | $OCH=CH_2$ |
| 1-2-22 | $C_3H_7$ | $CH_2O$ | F | F | $OCH_2CH=CH_2$ |
| 1-2-23 | $C_3H_7$ | $CH_2O$ | F | F | $OCH_2CH=CH(CH_2)_2CH=CH_2$ |
| 1-2-24 | $C_4H_9$ | $CH_2O$ | F | F | $OC_2H_5$ |
| 1-2-25 | $C_4H_9$ | $CH_2O$ | F | F | $OC_4H_9$ |

TABLE 3-continued

| No. | R¹ | Z | Q¹ | Q² | R² |
|---|---|---|---|---|---|
| 1-2-26 | $C_5H_{11}$ | $CH_2O$ | F | F | $C_3H_7$ |
| 1-2-27 | $C_5H_{11}$ | $CH_2O$ | F | F | $C_5H_{11}$ |
| 1-2-28 | $C_5H_{11}$ | $CH_2O$ | F | F | $OCH_3$ |
| 1-2-29 | $C_5H_{11}$ | $CH_2O$ | F | F | $OC_2H_5$ |
| 1-2-30 | $C_5H_{11}$ | COO | F | F | $OC_2H_5$ |
| 1-2-31 | $C_5H_{11}$ | $CH_2O$ | F | Cl | $OC_2H_5$ |
| 1-2-32 | $C_5H_{11}$ | $CH_2O$ | Cl | F | $OC_2H_5$ |
| 1-2-33 | $C_5H_{11}$ | $CH_2O$ | F | F | $OC_3H_7$ |
| 1-2-34 | $C_5H_{11}$ | $CH_2O$ | F | F | $OC_4H_9$ |
| 1-2-35 | $C_5H_{11}$ | COO | F | F | $OC_4H_9$ |

TABLE 4

| No. | R¹ | Z | Q¹ | Q² | R² |
|---|---|---|---|---|---|
| 1-2-36 | $C_5H_{11}$ | $CH_2O$ | F | Cl | $OC_4H_9$ |
| 1-2-37 | $C_5H_{11}$ | $CH_2O$ | Cl | F | $OC_4H_9$ |
| 1-2-38 | $C_5H_{11}$ | $CH_2O$ | F | F | $OC_5H_{11}$ |
| 1-2-39 | $C_5H_{11}$ | $CH_2O$ | F | F | $OC_6H_{13}$ |
| 1-2-40 | $C_5H_{11}$ | $CH_2O$ | F | F | $OC_7H_{15}$ |
| 1-2-41 | $C_5H_{11}$ | $CH_2O$ | F | F | $OC_8H_{17}$ |
| 1-2-42 | $C_5H_{11}$ | $CH_2O$ | F | F | $OCH=CH_2$ |
| 1-2-43 | $C_5H_{11}$ | $CH_2O$ | F | F | $OCH_2CH=CH_2$ |
| 1-2-44 | $C_6H_{13}$ | $CH_2O$ | F | F | $OC_2H_5$ |
| 1-2-45 | $C_6H_{13}$ | $CH_2O$ | F | F | $OC_4H_9$ |
| 1-2-46 | $C_7H_{15}$ | $CH_2O$ | F | F | $OC_2H_5$ |
| 1-2-47 | $C_7H_{15}$ | $CH_2O$ | F | F | $OC_4H_9$ |
| 1-2-48 | $C_8H_{17}$ | $CH_2O$ | F | F | $OC_2H_5$ |
| 1-2-49 | $C_9H_{19}$ | $CH_2O$ | F | F | $OC_2H_5$ |
| 1-2-50 | $C_9H_{19}$ | $CH_2O$ | F | F | $OC_4H_9$ |
| 1-2-51 | $CH_2=CH$ | $CH_2O$ | F | F | $OC_2H_5$ |
| 1-2-52 | $CH_2=CH$ | COO | F | F | $OC_2H_5$ |
| 1-2-53 | $CH_2=CH$ | $CH_2O$ | F | Cl | $OC_2H_5$ |
| 1-2-54 | $CH_2=CH$ | $CH_2O$ | Cl | F | $OC_2H_5$ |
| 1-2-55 | $CH_2=CH$ | $CH_2O$ | F | F | $OC_4H_9$ |
| 1-2-56 | $CH_2=CH$ | COO | F | F | $OC_4H_9$ |
| 1-2-57 | $CH_2=CH$ | $CH_2O$ | F | F | $OCH=CH_2$ |
| 1-2-58 | $CH_2=CH$ | $CH_2O$ | F | F | $OCH_2CH=CH_2$ |
| 1-2-59 | $CH_3CH=CH$ | $CH_2O$ | F | F | $OC_2H_5$ |
| 1-2-60 | $CH_3CH=CH$ | COO | F | F | $OC_2H_5$ |
| 1-2-61 | $CH_3CH=CH$ | $CH_2O$ | F | Cl | $OC_2H_5$ |
| 1-2-62 | $CH_3CH=CH$ | $CH_2O$ | Cl | F | $OC_2H_5$ |
| 1-2-63 | $CH_3CH=CH$ | $CH_2O$ | F | F | $OC_4H_9$ |
| 1-2-64 | $CH_3CH=CH$ | COO | F | F | $OC_4H_9$ |
| 1-2-65 | $CH_2=CH(CH_2)_2$ | $CH_2O$ | F | F | $OC_2H_5$ |
| 1-2-66 | $CH_2=CH(CH_2)_2$ | $CH_2O$ | F | F | $OC_4H_9$ |
| 1-2-67 | $CH_3CH=CH(CH_2)_2$ | $CH_2O$ | F | F | $OC_2H_5$ |
| 1-2-68 | $CH_3CH=CH(CH_2)_2$ | $CH_2O$ | F | F | $OC_4H_9$ |
| 1-2-69 | $CH_2=CH(CH_2)_2CH=CH$ | $CH_2O$ | F | F | $OC_2H_5$ |
| 1-2-70 | $CH_2=CH(CH_2)_2CH=CH(CH_2)_2$ | $CH_2O$ | F | F | $OC_2H_5$ |

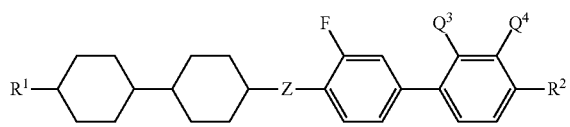

(1-3)

TABLE 5

| NO. | R¹ | Z | Q³ | Q⁴ | R² |
|---|---|---|---|---|---|
| 1-3-1 | $CH_3$ | $CH_2O$ | F | F | $OC_2H_5$ |
| 1-3-2 | $CH_3$ | $CH_2O$ | F | F | $OC_4H_9$ |
| 1-3-3 | $C_2H_5$ | $CH_2O$ | F | F | $OC_2H_5$ |
| 1-3-4 | $C_2H_5$ | $CH_2O$ | F | F | $OC_4H_9$ |
| 1-3-5 | $C_3H_7$ | $CH_2O$ | F | F | $C_3H_7$ |
| 1-3-6 | $C_3H_7$ | $CH_2O$ | F | F | $C_5H_{11}$ |
| 1-3-7 | $C_3H_7$ | $CH_2O$ | F | F | $OCH_3$ |
| 1-3-8 | $C_3H_7$ | $CH_2O$ | F | F | $OC_2H_5$ |
| 1-3-9 | $C_3H_7$ | COO | F | F | $OC_2H_5$ |
| 1-3-10 | $C_3H_7$ | $CH_2O$ | F | Cl | $OC_2H_5$ |
| 1-3-11 | $C_3H_7$ | $CH_2O$ | Cl | F | $OC_2H_5$ |
| 1-3-12 | $C_3H_7$ | $CH_2O$ | F | F | $OC_3H_7$ |
| 1-3-13 | $C_3H_7$ | $CH_2O$ | F | F | $OC_4H_9$ |
| 1-3-14 | $C_3H_7$ | COO | F | F | $OC_4H_9$ |
| 1-3-15 | $C_3H_7$ | $CH_2O$ | F | Cl | $OC_4H_9$ |
| 1-3-16 | $C_3H_7$ | $CH_2O$ | Cl | F | $OC_4H_9$ |
| 1-3-17 | $C_3H_7$ | $CH_2O$ | F | F | $OC_5H_{11}$ |
| 1-3-18 | $C_3H_7$ | $CH_2O$ | F | F | $OC_6H_{13}$ |
| 1-3-19 | $C_3H_7$ | $CH_2O$ | F | F | $OC_7H_{15}$ |
| 1-3-20 | $C_3H_7$ | $CH_2O$ | F | F | $OC_8H_{17}$ |
| 1-3-21 | $C_3H_7$ | $CH_2O$ | F | F | $OCH=CH_2$ |
| 1-3-22 | $C_3H_7$ | $CH_2O$ | F | F | $OCH_2CH=CH_2$ |
| 1-3-23 | $C_3H_7$ | $CH_2O$ | F | F | $OCH_2CH=CH(CH_2)_2CH=CH_2$ |
| 1-3-24 | $C_4H_9$ | $CH_2O$ | F | F | $OC_2H_5$ |
| 1-3-25 | $C_4H_9$ | $CH_2O$ | F | F | $OC_4H_9$ |
| 1-3-26 | $C_5H_{11}$ | $CH_2O$ | F | F | $C_3H_7$ |
| 1-3-27 | $C_5H_{11}$ | $CH_2O$ | F | F | $C_5H_{11}$ |
| 1-3-28 | $C_5H_{11}$ | $CH_2O$ | F | F | $OCH_3$ |
| 1-3-29 | $C_5H_{11}$ | $CH_2O$ | F | F | $OC_2H_5$ |
| 1-3-30 | $C_5H_{11}$ | COO | F | F | $OC_2H_5$ |
| 1-3-31 | $C_5H_{11}$ | $CH_2O$ | F | Cl | $OC_2H_5$ |
| 1-3-32 | $C_5H_{11}$ | $CH_2O$ | Cl | F | $OC_2H_5$ |
| 1-3-33 | $C_5H_{11}$ | $CH_2O$ | F | F | $OC_3H_7$ |
| 1-3-34 | $C_5H_{11}$ | $CH_2O$ | F | F | $OC_4H_9$ |
| 1-3-35 | $C_5H_{11}$ | COO | F | F | $OC_4H_9$ |

TABLE 6

| No. | R$^1$ | Z | Q$^3$ | Q$^4$ | R$^2$ |
|---|---|---|---|---|---|
| 1-3-36 | C$_5$H$_{11}$ | CH$_2$O | F | Cl | OC$_4$H$_9$ |
| 1-3-37 | C$_5$H$_{11}$ | CH$_2$O | Cl | F | OC$_4$H$_9$ |
| 1-3-38 | C$_5$H$_{11}$ | CH$_2$O | F | F | OC$_5$H$_{11}$ |
| 1-3-39 | C$_5$H$_{11}$ | CH$_2$O | F | F | OC$_6$H$_{13}$ |
| 1-3-40 | C$_5$H$_{11}$ | CH$_2$O | F | F | OC$_7$H$_{15}$ |
| 1-3-41 | C$_5$H$_{11}$ | CH$_2$O | F | F | OC$_8$H$_{17}$ |
| 1-3-42 | C$_5$H$_{11}$ | CH$_2$O | F | F | OCH=CH$_2$ |
| 1-3-43 | C$_5$H$_{11}$ | CH$_2$O | F | F | OCH$_2$CH=CH$_2$ |
| 1-3-44 | C$_6$H$_{13}$ | CH$_2$O | F | F | OC$_2$H$_5$ |
| 1-3-45 | C$_6$H$_{13}$ | CH$_2$O | F | F | OC$_4$H$_9$ |
| 1-3-46 | C$_7$H$_{15}$ | CH$_2$O | F | F | OC$_2$H$_5$ |
| 1-3-47 | C$_7$H$_{15}$ | CH$_2$O | F | F | OC$_4$H$_9$ |
| 1-3-48 | C$_8$H$_{17}$ | CH$_2$O | F | F | OC$_2$H$_5$ |
| 1-3-49 | C$_9$H$_{19}$ | CH$_2$O | F | F | OC$_2$H$_5$ |
| 1-3-50 | C$_9$H$_{19}$ | CH$_2$O | F | F | OC$_4$H$_9$ |
| 1-3-51 | CH$_2$=CH | CH$_2$O | F | F | OC$_2$H$_5$ |
| 1-3-52 | CH$_2$=CH | COO | F | F | OC$_2$H$_5$ |
| 1-3-53 | CH$_2$=CH | CH$_2$O | F | Cl | OC$_2$H$_5$ |
| 1-3-54 | CH$_2$=CH | CH$_2$O | Cl | F | OC$_2$H$_5$ |
| 1-3-55 | CH$_2$=CH | CH$_2$O | F | F | OC$_4$H$_9$ |
| 1-3-56 | CH$_2$=CH | COO | F | F | OC$_4$H$_9$ |
| 1-3-57 | CH$_2$=CH | CH$_2$O | F | F | OCH=CH$_2$ |
| 1-3-58 | CH$_2$=CH | CH$_2$O | F | F | OCH$_2$CH=CH$_2$ |
| 1-3-59 | CH$_3$CH=CH | CH$_2$O | F | F | OC$_2$H$_5$ |
| 1-3-60 | CH$_3$CH=CH | COO | F | F | OC$_2$H$_5$ |
| 1-3-61 | CH$_3$CH=CH | CH$_2$O | F | Cl | OC$_2$H$_5$ |
| 1-3-62 | CH$_3$CH=CH | CH$_2$O | Cl | F | OC$_2$H$_5$ |
| 1-3-63 | CH$_3$CH=CH | CH$_2$O | F | F | OC$_4$H$_9$ |
| 1-3-64 | CH$_3$CH=CH | COO | F | F | OC$_4$H$_9$ |
| 1-3-65 | CH$_2$=CH(CH$_2$)$_2$ | CH$_2$O | F | F | OC$_2$H$_5$ |
| 1-3-66 | CH$_2$=CH(CH$_2$)$_2$ | CH$_2$O | F | F | OC$_4$H$_9$ |
| 1-3-67 | CH$_3$CH=CH(CH$_2$)$_2$ | CH$_2$O | F | F | OC$_2$H$_5$ |
| 1-3-68 | CH$_3$CH=CH(CH$_2$)$_2$ | CH$_2$O | F | F | OC$_4$H$_9$ |
| 1-3-69 | CH$_2$=CH(CH$_2$)$_2$CH=CH | CH$_2$O | F | F | OC$_2$H$_5$ |
| 1-3-70 | CH$_2$=CH(CH$_2$)$_2$CH=CH(CH$_2$)$_2$ | CH$_2$O | F | F | OC$_2$H$_5$ |

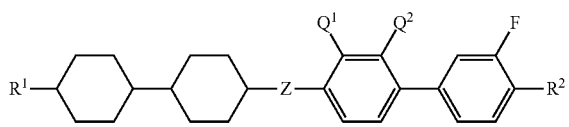

(1-4)

TABLE 7

| NO. | R$^1$ | Z | Q$^1$ | Q$^2$ | R$^2$ |
|---|---|---|---|---|---|
| 1-4-10 | C$_3$H$_7$ | CH$_2$O | F | Cl | OC$_2$H$_5$ |
| 1-4-11 | C$_3$H$_7$ | CH$_2$O | Cl | F | OC$_2$H$_5$ |
| 1-4-15 | C$_3$H$_7$ | CH$_2$O | F | Cl | OC$_4$H$_9$ |
| 1-4-16 | C$_3$H$_7$ | CH$_2$O | Cl | F | OC$_4$H$_9$ |
| 1-4-31 | C$_5$H$_{11}$ | CH$_2$O | F | Cl | OC$_2$H$_5$ |
| 1-4-32 | C$_5$H$_{11}$ | CH$_2$O | Cl | F | OC$_2$H$_5$ |
| 1-4-36 | C$_5$H$_{11}$ | CH$_2$O | F | Cl | OC$_4$H$_9$ |
| 1-4-37 | C$_5$H$_{11}$ | CH$_2$O | Cl | F | OC$_4$H$_9$ |
| 1-4-53 | CH$_2$=CH | CH$_2$O | F | Cl | OC$_2$H$_5$ |
| 1-4-54 | CH$_2$=CH | CH$_2$O | Cl | F | OC$_2$H$_5$ |
| 1-4-61 | CH$_3$CH=CH | CH$_2$O | F | Cl | OC$_2$H$_5$ |
| 1-4-62 | CH$_3$CH=CH | CH$_2$O | Cl | F | OC$_2$H$_5$ |

TABLE 8

Example for reference

| No. | R$^1$ | Z | Q$^1$ | Q$^2$ | R$^2$ |
|---|---|---|---|---|---|
| 1-4-13 | C$_3$H$_7$ | CH$_2$O | F | F | OC$_4$H$_9$ |
| 1-4-14 | C$_3$H$_7$ | COO | F | F | OC$_4$H$_9$ |
| 1-4-55 | CH$_2$=CH | CH$_2$O | F | F | OC$_4$H$_9$ |

An example of typical formulations in the invention will be shown below. Measurement of physical property values was carried out according to the methods described below.

Two kinds of samples are used for measuring physical properties of a liquid crystal compound: one is the compound itself, and the other is a mixture of the compound and mother liquid crystals.

In the latter case using a sample in which the compound is mixed with the mother liquid crystals, the measurement is carried out according to the following method. First, the sample is prepared by mixing 15% by weight of the resulting liquid crystal compound and 85% by weight of the mother liquid crystals. Then, extrapolated values are calculated from the measured values of the resulting sample by means of an extrapolation method based on the following formula. The extrapolated values are regarded as physical properties of this compound.

(Extrapolated value)=[100×(Measured value of a sample)−(% by weight of mother liquid crystals)×(Measured value of mother liquid crystals)]/(% by weight of a liquid crystal compound)

When a smectic phase or crystals deposited even at this ratio of the liquid crystal compound to the mother liquid crystals at 25° C., the ratio of the liquid crystal compound to the mother liquid crystals was changed in the order of (10% by weight: 90% by weight), (5% by weight: 95% by weight) and (1% by weight: 99% by weight). Physical properties of the sample are measured at the ratio in which the smectic phase or the crystals does not deposit at 25° C. Extrapolated values are determined according to the above equation, and regarded as physical properties of the liquid crystal compound.

There are a variety of mother liquid crystals used for measurement and, for example, the formulation of the mother liquid crystals (A) is shown below.

The Mother Liquid Crystals (A):

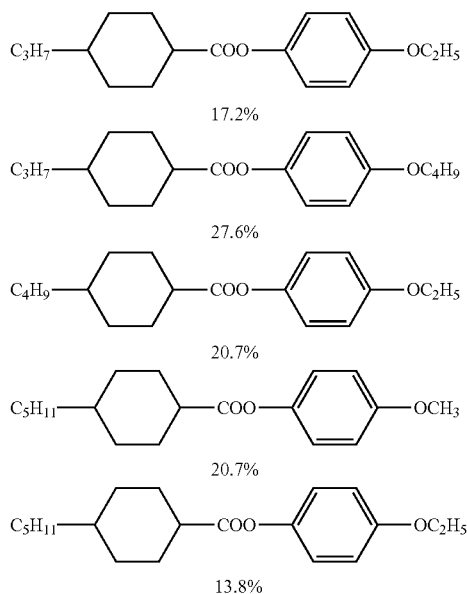

The physical property values of the composition (A) were as follows: the maximum temperature (NI)=74.6° C.; optical anisotropy (Δn)=0.087; and dielectric anisotropy (Δ∈)=−1.3.

4-Ethoxy-2,3,3'-trifluoro-4'-((propylcyclohexyl)methoxy)biphenyl (15% by weight) described in Example 1 was added to the composition (A) and the physical property values were measured. The results were that the maximum temperature (NI)=123.9° C.; optical anisotropy (Δn)=0.170; and dielectric anisotropy (Δ∈)=−7.24.

Comparative Example 1

4-(4-Ethoxy-2,3-difluoro-phenyl)-4'-propyl-bicyclohexyl (s-1) was prepared and a composition of 15% by weight of the compound and 85% by weight of the mother liquid crystals (A) was prepared. The physical property values were measured in the same manner as in Example 1. The results were that Δn was 0.114 and Δ∈ was −5.81 in this compound, which showed that the compound of the invention had a larger Δn and larger Δ∈ negatively.

Comparative Example 2

4-(4-Ethoxy-2,3-difluoro-phenyl)-4'-vinyl-bicyclohexyl (s-2) was prepared and a composition of 15% by weight of the compound and 85% by weight of the mother liquid crystals (A) was prepared. The physical property values were measured in the same manner as in Example 1. The results were that Δn was 0.120 and Δ∈ was −5.79 in this compound, which showed that the compound of the invention had a larger Δn and larger negative Δ∈.

Comparative Example 3

2,2',3,3'-Tetrafluoro-4,4'-bis(octyloxy)biphenyl (s-3) was prepared and a composition of 15% by weight of the compound and 85% by weight of the mother liquid crystals (A) was prepared. The physical property values were measured in the same manner as in Example 1. The results were that Δn was 0.120 and the maximum temperature of a nematic phase (NI) was 9.3° C. in this compound, which showed that the compound of the invention had a larger Δn and a higher NI. The phase transition temperature of the compound was "C 52.2° C. I", and the compound exhibited no liquid crystal phases.

Comparative Example 4

2,3,3'-Trifluoro-4,4'-bis(octyloxy)biphenyl (s-4) was prepared and a composition of 15% by weight of the compound and 85% by weight of the mother liquid crystals (A) was prepared. The physical property values were measured in the same manner as in Example 1. The results were that Δn was 0.132 and the maximum temperature of a nematic phase (NI) was 21.9° C. in this compound, which showed that the compound of the invention had a larger Δn and a higher NI. The phase transition temperature of the compound was "C 40.2° C. I", and the compound exhibited no liquid crystal phases.

Comparative Example 5

2,2',3'-Trifluoro-4,4'-bis(octyloxy)biphenyl (s-5) was prepared and a composition of 15% by weight of the compound and 85% by weight of the mother liquid crystals (A) was prepared. The physical property values were measured in the same manner as in Example 1. The results were that Δn was 0.135, Δ∈ was −4.51, and the maximum temperature of a nematic phase (NI) was 10.6° C. in this compound, which showed that the compound of the invention had a larger Δn a higher NI and a larger Δ∈ negatively. The phase transition temperature of the compound was "C 45.7° C. I", and the compound exhibited no liquid crystal phases.

Comparative Example 6

4-Ethoxy-2,2',3,3'-tetrafluoro-4'-((4-propylcyclohexyl)methoxy)biphenyl (s-6) was prepared and a composition of 15% by weight of the compound and 85% by weight of the mother liquid crystals (A) was prepared. The physical property values were measured in the same manner as in Example 1. The results were that Δn was 0.147, the maximum temperature of a nematic phase (NI) was 111.3° C., and viscosity (η₂₀) was 106.9 mPa·s in this compound, which showed that the compound of the invention had a larger Δn, a higher NI, a larger Δ∈ negatively and a smaller viscosity.

Comparative Example 7

4-Methoxy-2,2',3-trifluoro-4'-((4-propylcyclohexyl)methoxy)biphenyl (s-7) was prepared and a composition of 15% by weight of the compound and 85% by weight of the mother liquid crystals (A) was prepared. The physical property values were measured in the same manner as in Example 1. The results were that Δ∈ was −3.65, the maximum temperature of a nematic phase (NI) was 112.6° C., and viscosity (η₂₀) was 100.3 mPa·s in this compound, which showed that the compound of the invention had a higher NI and a larger Δ∈ negatively.

Comparative Example 8

4-Ethoxy-2,3,-difluoro-4'-(2-(4-propylcyclohexyl)ethyl)biphenyl (s-8) was prepared and a composition of 15% by weight of the compound and 85% by weight of the mother liquid crystals (A) was prepared. The physical property values were measured in the same manner as in Example 1. The results were that Δn was 0.145 and the maximum temperature of a nematic phase (NI) was 110.6° C. in this compound, which showed that the compound of the invention had a larger Δn and a higher NI.

Comparative Example 9

4'-(Difluoro(4-propylcyclohexyl)methoxy)-4-ethoxy-2,3,3'-trifluorobiphenyl (s-9) was prepared and a composition of 15% by weight of the compound and 85% by weight of the mother liquid crystals (A) was prepared. The physical property values were measured in the same manner as in Example 1. The results were that Δn was 0.127, Δ∈ was −4.33, and the maximum temperature of a nematic phase (NI) was 111.6° C. in this compound, which showed that the compound of the invention had a larger Δn, a higher NI and a larger Δ∈ negatively.

Furthermore, representative compositions of the invention were summarized in Composition Example 1 to Composition Example 14. First, compounds that were the component of the composition and their ratio (% by weight) were shown. The compounds were expressed as symbols of a left-terminal group, a bonding group, a ring structure and right-terminal group, and the formula number according to the definition in Table 9. The configuration of 1,4-cyclohexylene was trans. The terminal group means hydrogen when the symbol of the terminal group is not described. Next, the values of physical properties were shown.

TABLE 9

Method of Description of Compounds using Symbols
R—(A$_1$)—Z$_1$—...—Z$_n$—(A$_n$)—R'

| 1) Left-terminal Group R— | Symbol |
|---|---|
| C$_n$H$_{2n+1}$— | n- |
| C$_n$H$_{2n+1}$O— | nO— |
| C$_m$H$_{2m+1}$OC$_n$H$_{2n}$— | mOn- |
| CH$_2$=CH— | V— |
| C$_n$H$_{2n+1}$—CH=CH— | nV— |
| CH$_2$=CH—C$_n$H$_{2n}$— | Vn- |
| C$_m$H$_{2m+1}$—CH=CH—C$_n$H$_{2n}$— | mVn- |
| CF$_2$=CH— | VFF— |
| CF$_2$=CH—C$_n$H$_{2n}$— | VFFn- |

| 2) Right-terminal Group —R' | Symbol |
|---|---|
| —C$_n$H$_{2n+1}$ | -n |
| —OC$_n$H$_{2n+1}$ | —On |
| —CH=CH$_2$ | —V |
| —CH=CH—C$_n$H$_{2n+1}$ | —Vn |
| —C$_n$H$_{2n}$—CH=CH$_2$ | -nV |
| —CH=CF$_2$ | —VFF |
| —COOCH$_3$ | -EMe |
| —CN | —C |
| —F | —F |
| —Cl | —CL |
| —OCF$_3$ | —OCF3 |
| —CF$_3$ | —CF3 |

| 3) Bonding Group —Z$_n$— | Symbol |
|---|---|
| —C$_n$H$_{2n}$— | n |
| —COO— | E |
| —CH=CH— | V |
| —CH$_2$O— | 1O |
| —CF$_2$O— | X |
| —C≡C— | T |

| 4) Ring Structure —A$_n$— | Symbol |
|---|---|
| 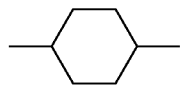 | H |
| 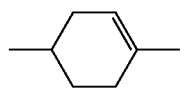 | Ch |
| 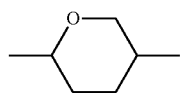 | Dh |
| 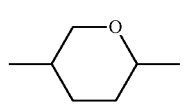 | dh |

TABLE 9-continued
Method of Description of Compounds using Symbols
R—(A₁)—Z₁—...—Zₙ—(Aₙ)—R'
| | |
|---|---|
| 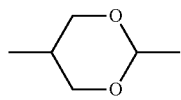 | G |
| 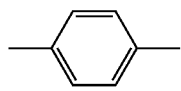 | B |
| 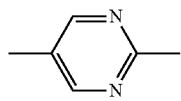 | Py |
| 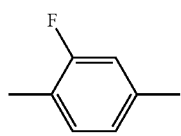 | B(2F) |
| 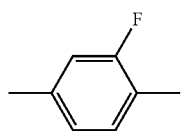 | B(F) |
| 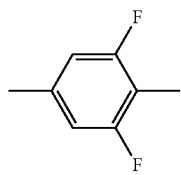 | B(F,F) |
| 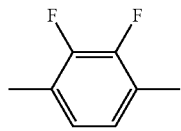 | B(2F,3F) |
| 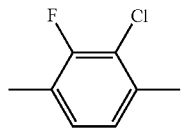 | B(2F,3Cl) |
| 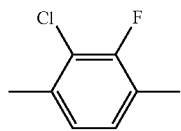 | B(2Cl,3F) |
5) Examples of Description
Example 1. 5-H1OB(2F)B(2F,3F)-O2
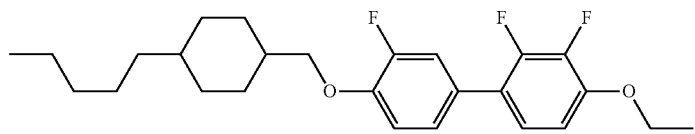

TABLE 9-continued

Method of Description of Compounds using Symbols
R—(A₁)—Z₁—...—Zₙ—(Aₙ)—R'

Example 2. 3-HH1OB(2F)B(2F,3F)-O2

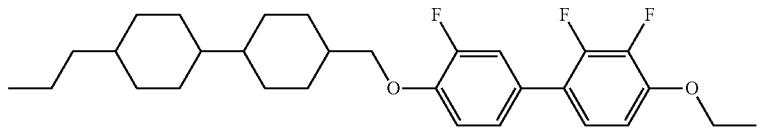

Example 3. 3-HHB-3

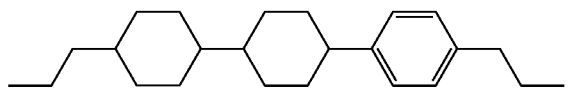

Example 4. 5-HBB(2F,3Cl)-O2

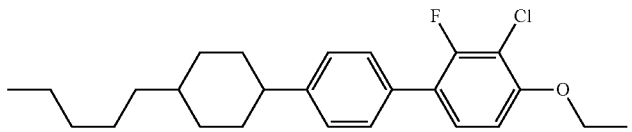

Characteristics can be measured according to the following methods. Most are methods described in the Standards of Electronic Industries Association of Japan, EIAJ•ED-2521 A or the methods with some modifications. No TFT was attached to a TN device used for measurement.

Transition Temperature (° C.):

Measurement was carried out in either way. (1) A sample was placed on a hot plate of a melting point apparatus (Hot Stage Model FP-52 made by Mettler Toledo International Inc.) equipped with a polarizing microscope, and heated at the rate of 1° C. per minute. A temperature was measured when the phase of the sample changed. (2) Measurement was carried out using a Perkin-Elmer differential scanning calorimeter, a DSC-7 System at the rate of 3° C. per minute.

The symbol C stood for crystals, which were expressed by $C_1$ or $C_2$ when the kinds of the crystals were distinguishable. The symbol S stood for a smectic phase. The symbol Iso stood for a liquid (isotropic). The symbol N stood for a nematic phase. When a smectic B phase, a smectic C phase and a smectic A phase were distinguishable in the smectic phases, they were expressed as $S_B$, $S_C$ and $S_A$, respectively. Phase-transition temperatures were expressed, for example, as "C 50.0 N 100.0 Iso", which means that the phase-transition temperature from crystals to a nematic phase (CN) is 50.0° C., and the phase-transition temperature from the nematic phase to a liquid (NI) is 100.0° C. The same applied to the other transition temperatures.

Maximum Temperature of a Nematic Phase (NI; ° C.):

A sample was placed on a hot plate of a melting point apparatus equipped with a polarizing microscope, and was observed with the polarizing microscope while being heated at the rate of 1° C. per minute. The temperature was measured when part of the sample began to change from a nematic phase to an isotropic liquid. The maximum temperature of a nematic phase may be abbreviated to "the maximum temperature."

Minimum Temperature of a Nematic Phase (Tc; ° C.):

A sample having a nematic phase was kept in freezers at temperatures of 0° C., −10° C., −20° C., −30° C. and −40° C. for 10 days, and then the liquid crystal phases were observed. For example, when the sample maintained the nematic phase at −20° C. and changed to crystals (or a smectic phase) at −30° C., Tc was expressed as <−20° C. A lower limit of the temperature range of a nematic phase may be abbreviated to "the minimum temperature."

Compatibility of the Compound:

Some compounds having similar structures were mixed to give mother liquid crystals having a nematic phase. A composition was prepared by mixing a compound for measurement and the mother liquid crystals. One example of the ratio for the mixing was 15% by weight of the compound and 85% by weight of the mother liquid crystals. The composition was kept at low temperature such as at −20° C. and −30° C. for 30 days. Whether or not the part of the composition had changed to crystals (or a smectic phase) was observed. The ratio for the mixing and the temperature for keeping were changed as requested. Conditions that crystals (or a smectic phase) deposited and conditions that crystals (or smectic phase) did not deposit were obtained from these measurements. These conditions are the scale of the compatibility.

Viscosity (Bulk Viscosity; η; Measured at 20° C.; mPa·s):

An E-type viscometer was used for measurement.

Viscosity (Rotational Viscosity; γ1; Measured at 25° C.; mPa·s):

Rotational viscosity was measured according to the method described in M. Imai, et al., Molecular Crystals and Liquid Crystals, Vol. 259, p. 37 (1995). A sample was put in a VA device in which the distance between the two glass substrates (cell gap) was 20 micrometers. A voltage in the range of 30 V to 50 V was applied stepwise with an increment of 1 volt to the device. After a period of 0.2 second with no voltage, a voltage was applied repeatedly under the conditions of only one rectangular wave (rectangular pulse; 0.2 second) and no voltage (2 seconds). The peak current and the peak time of the transient current generated by the applied voltage were measured. The value of rotational viscosity was obtained from the measured values and the calculating equation (8) on page 40 of the paper presented by M. Imai, et al.

The value of the dielectric anisotropy necessary for the present calculation was obtained by the method described below, under the heading "Dielectric Anisotropy."

Optical Anisotropy (Refractive Index Anisotropy; Δn; Measured at 25° C.):

Measurement was carried out using an Abbe refractometer with a polarizing plate attached to the ocular, on irradiation with light at a wavelength of 589 nanometers. The surface of the main prism was rubbed in one direction, and then a sample was dropped onto the main prism. A refractive index (n∥) was measured when the direction of the polarized light was parallel to that of the rubbing. A refractive index (n⊥) was measured when the direction of polarized light was perpendicular to that of the rubbing. The value of the optical anisotropy was calculated from the equation: Δn=n∥−n⊥. When a sample was a composition, the optical anisotropy was measured by this method. When a sample was a compound, the compound was mixed with a suitable composition, and then the optical anisotropy was measured. The optical anisotropy of the compound was expressed as an extrapolated value.

Dielectric Anisotropy (Δ∈; Measured at 25° C.):

When a sample was a compound, the compound was mixed with a suitable composition, and then the dielectric anisotropy was measured. The dielectric anisotropy of the compound was expressed as an extrapolated value.

An ethanol (20 mL) solution of octadecyltriethoxysilane (0.16 mL) was applied to a well-washed glass substrate. The glass substrate was rotated with a spinner, and then heated at 150° C. for 1 hour. A VA device in which the distance (cell gap) was 20 micrometers was assembled from the two glass substrates.

A polyimide alignment film was prepared on glass substrates in a similar manner. After a rubbing-treatment to the alignment film formed on the glass substrates, a TN device in which the distance between the two glass substrates was 9 micrometers and the twist angle was 80 degrees was assembled.

A sample (a liquid crystal composition, or a mixture of a liquid crystal compound and mother liquid crystals) was put in the resulting VA device, and a voltage of 0.5 V (1 kHz, sine waves) was applied to the sample, and then the dielectric constant (∈∥) in the major axis direction of the liquid crystal molecules was measured.

The sample (the liquid crystal composition, or the mixture of the liquid crystal compound and the mother liquid crystals) was put in the resulting TN device, and a voltage of 0.5 V (1 kHz, sine waves) was applied to the sample, and then the dielectric constant (∈⊥) in the minor axis direction of the liquid crystal molecules was measured.

The value of the dielectric anisotropy was calculated from the equation of Δ∈=∈∥−∈⊥.

A composition in which this value is negative means that the composition has negative dielectric anisotropy.

Threshold Voltage (Vth; Measured at 25° C.; V):

When a sample was a compound, the compound was mixed with a suitable composition, and the threshold voltage was measured. The threshold voltage of the compound was expressed as an extrapolated value.

A sample was poured into a liquid crystal display device having a normally black mode, in which the distance between the two glass substrates (cell gap) was about 9 micrometers and the substrate was treated for homeotropic orientation. Rectangular waves at a wavelength of 32 Hz were applied to the device. A voltage of the rectangular waves was increased and the value of the voltage was measured when the transmittance of light passing through the device became 10%.

Voltage Holding Ratio (VHR; Measured at 25° C.; %):

A TN device used for measurement had a polyimide-alignment film and the distance between the two glass substrates (cell gap) was 6 micrometers. A sample was put in the device, and then the device was sealed with an adhesive polymerizable on irradiation with ultraviolet light. The TN device was charged by applying pulse voltage (60 microseconds at 5 V). Decreasing voltage was measured for 16.7 milliseconds with a High Speed Voltmeter, and the area A between a voltage curve and a horizontal axis in a unit period was measured. The area B was an area without the decrease. The voltage holding ratio was the percentage of the area A to the area B.

Composition Example 1

| | | |
|---|---|---|
| 3-H1OB(2F,3F)B(F)-O4 | (1-2-13) | 4% |
| V-HH1OB(2F,3F)B(F)-O4 | (1-4-55) | 4% |
| 3-HHEB(2F,3F)B(F)-O4 | (1-4-14) | 5% |
| 5-HH-O1 | (12-1) | 4% |
| 3-HH-4 | (12-1) | 5% |
| 3-HB(2F,3F)-O2 | (6-1) | 16% |
| 5-HB(2F,3F)-O2 | (6-1) | 21% |
| 3-HHB(2F,3F)-1 | (7-1) | 7% |
| 3-HHB(2F,3F)-O2 | (7-1) | 14% |
| 5-HHB(2F,3F)-O2 | (7-1) | 20% |

NI = 82.3° C.; Δn = 0.093; η = 32.6 mPa·s; Δε = −4.8.

Composition Example 2

| | | |
|---|---|---|
| 5-H1OB(2F)B(2F,3F)-O2 | (1-1-29) | 5% |
| 5-H1OB(2F)B(2F,3F)-O4 | (1-1-34) | 3% |
| 3-HH1OB(2F)B(2F,3F)-O2 | (1-3-8) | 3% |
| 3-HB-O1 | (12-5) | 15% |
| 3-HH-4 | (12-1) | 5% |
| 3-HB(2F,3F)-O2 | (6-1) | 12% |
| 5-HB(2F,3F)-O2 | (6-1) | 12% |
| 2-HHB(2F,3F)-1 | (7-1) | 12% |
| 3-HHB(2F,3F)-1 | (7-1) | 7% |
| 3-HHB(2F,3F)-O2 | (7-1) | 13% |
| 5-HHB(2F,3F)-O2 | (7-1) | 13% |

NI = 87.7° C.; Δn = 0.097; Δε = −4.0.

Composition Example 3

| | | |
|---|---|---|
| 5-HH1OB(2F)B(2F,3F)-O2 | (1-3-29) | 3% |
| 5-HH1OB(2F)B(2F,3F)-O4 | (1-3-34) | 3% |
| V-HH1OB(2F)B(2F,3F)-O2 | (1-3-51) | 3% |
| 3-HB-O1 | (12-5) | 15% |
| 3-HH-4 | (12-1) | 5% |
| 3-HB(2F,3F)-O2 | (6-1) | 12% |
| 5-HB(2F,3F)-O2 | (6-1) | 12% |
| 2-HHB(2F,3F)-1 | (7-1) | 12% |
| 3-HHB(2F,3F)-1 | (7-1) | 3% |
| 3-HHB(2F,3F)-O2 | (7-1) | 13% |
| 5-HHB(2F,3F)-O2 | (7-1) | 13% |
| 6-HEB(2F,3F)-O2 | (6-6) | 6% |

NI = 89.8° C.; Δn = 0.095; η = 39.3 mPa·s; Δε = −4.0.

Composition Example 4

| | | |
|---|---|---|
| 5-H1OB(2F)B(2F,3F)-O2 | (1-1-29) | 3% |
| 5-H1OB(2F)B(2F,3F)-O4 | (1-1-34) | 3% |
| 3-H1OB(2F)B(2F,3F)-O2 | (1-1-8) | 3% |
| 3-HH-4 | (12-1) | 8% |
| 3-H2B(2F,3F)-O2 | (6-4) | 22% |
| 5-H2B(2F,3F)-O2 | (6-4) | 22% |
| 3-HHB(2F,3Cl)-O2 | (7-12) | 3% |
| 5-HHB(2F,3Cl)-O2 | (7-12) | 2% |
| 3-HBB(2F,3F)-O2 | (7-7) | 9% |
| 5-HBB(2F,3F)-O2 | (7-7) | 4% |
| V-HHB-1 | (13-1) | 6% |
| 3-HHB-3 | (13-1) | 6% |
| 3-HHEBH-3 | (14-6) | 3% |
| 3-HHEBH-4 | (14-6) | 3% |
| 3-HHEBH-5 | (14-6) | 3% |

NI = 89.5° C.; Δn = 0.102; η = 31.8 mPa·s; Δε = −4.1.

Composition Example 5 for Reference

| | | |
|---|---|---|
| 3-HH1OB(2F,3F)B(F)-O4 | (1-4-13) | 3% |
| V-HH1OB(2F,3F)B(F)-O4 | (1-4-55) | 3% |
| 3-HHEB(2F,3F)B(F)-O4 | (1-4-14) | 3% |
| 2-HH-5 | (12-1) | 3% |
| 3-HH-4 | (12-1) | 15% |
| 3-HH-5 | (12-1) | 4% |
| 3-H2B(2F,3F)-O2 | (6-4) | 15% |
| 5-H2B(2F,3F)-O2 | (6-4) | 15% |
| 3-HHB(2F,3Cl)-O2 | (7-12) | 5% |
| 3-HBB(2F,3F)-O2 | (7-7) | 9% |
| 5-HBB(2F,3F)-O2 | (7-7) | 9% |
| 3-HHB-3 | (13-1) | 4% |
| 3-HB-O2 | (12-5) | 12% |

NI = 81.6° C.; Δn = 0.097; η = 24.5 mPa·s; Δε = −4.4.

The helical pitch was 61.3 μm when 0.25 part by weight of (Op-05) was added to 100 parts of the preceding composition.

Composition Example 6

| | | |
|---|---|---|
| 5-H1OB(2F)B(2F,3F)-O2 | (1-1-29) | 5% |
| 5-H1OB(2F)B(2F,3F)-O4 | (1-1-34) | 5% |
| 2-BEB(F)-C | (5-14) | 5% |
| 3-BEB(F)-C | (5-14) | 4% |
| 4-BEB(F)-C | (5-14) | 12% |
| 1V2-BEB(F,F)-C | (5-15) | 9% |
| 3-HB-O2 | (12-5) | 8% |
| 3-HH-4 | (12-1) | 5% |
| 3-HHB-F | (3-1) | 3% |
| 3-HHB-1 | (13-1) | 8% |
| 3-HHB-O1 | (13-1) | 4% |
| 3-HBEB-F | (3-37) | 4% |
| 3-HHEB-F | (3-10) | 6% |
| 5-HHEB-F | (3-10) | 5% |
| 3-H2BTB-2 | (13-17) | 4% |
| 3-H2BTB-3 | (13-17) | 4% |
| 3-H2BTB-4 | (13-17) | 4% |
| 3-HB(F)TB-2 | (13-18) | 5% |

Composition Example 7

| | | |
|---|---|---|
| 3-H1OB(2F)B(2F,3F)-O2 | (1-1-8) | 8% |
| 2-HB-C | (5-1) | 5% |
| 3-HB-C | (5-1) | 12% |
| 3-HB-O2 | (12-5) | 15% |
| 2-BTB-1 | (12-10) | 3% |
| 3-HHB-F | (3-1) | 4% |
| 3-HHB-1 | (13-1) | 8% |
| 3-HHB-O1 | (13-1) | 5% |
| 3-HHB-3 | (13-1) | 14% |
| 3-HHEB-F | (3-10) | 4% |
| 5-HHEB-F | (3-10) | 4% |
| 2-HHB(F)-F | (3-2) | 4% |
| 3-HHB(F)-F | (3-2) | 4% |
| 5-HHB(F)-F | (3-2) | 5% |
| 3-HHB(F,F)-F | (3-3) | 5% |

Composition Example 8

| | | |
|---|---|---|
| 5-H1OB(2F)B(2F,3F)-O2 | (1-1-29) | 7% |
| 5-HB-CL | (2-2) | 16% |
| 3-HH-4 | (12-1) | 12% |
| 3-HH-5 | (12-1) | 4% |
| 3-HHB-F | (3-1) | 4% |
| 3-HHB-CL | (3-1) | 3% |
| 4-HHB-CL | (3-1) | 4% |
| 3-HHB(F)-F | (3-2) | 8% |
| 4-HHB(F)-F | (3-2) | 7% |
| 5-HHB(F)-F | (3-2) | 7% |
| 7-HHB(F)-F | (3-2) | 7% |
| 5-HBB(F)-F | (3-23) | 4% |
| 1O1-HBBH-5 | (14-1) | 3% |
| 3-HHBB(F,F)-F | (4-6) | 2% |
| 4-HHBB(F,F)-F | (4-6) | 3% |
| 5-HHBB(F,F)-F | (4-6) | 3% |
| 3-HH2BB(F,F)-F | (4-15) | 3% |
| 4-HH2BB(F,F)-F | (4-15) | 3% |

Composition Example 9

| | | |
|---|---|---|
| 3-H1OB(2F)B(2F,3F)-O2 | (1-1-8) | 5% |
| 5-H1OB(2F)B(2F,3F)-O4 | (1-1-34) | 6% |
| 3-HHB(F,F)-F | (3-3) | 9% |
| 3-H2HB(F,F)-F | (3-15) | 8% |
| 4-H2HB(F,F)-F | (3-15) | 8% |
| 5-H2HB(F,F)-F | (3-15) | 8% |
| 3-HBB(F,F)-F | (3-24) | 20% |
| 5-HBB(F,F)-F | (3-24) | 15% |
| 3-H2BB(F,F)-F | (3-27) | 5% |
| 5-HHBB(F,F)-F | (4-6) | 3% |
| 5-HHEBB-F | (4-17) | 3% |
| 3-HH2BB(F,F)-F | (4-15) | 2% |
| 1O1-HBBH-4 | (14-1) | 4% |
| 1O1-HBBH-5 | (14-1) | 4% |

Composition Example 10

| | | |
|---|---|---|
| 3-H1OB(2F)B(2F,3F)-O2 | (1-1-8) | 12% |
| 5-HB-CL | (2-2) | 11% |
| 3-HH-4 | (12-1) | 8% |
| 3-HHB-1 | (13-1) | 5% |
| 3-HHB(F,F)-F | (3-3) | 8% |
| 3-HBB(F,F)-F | (3-24) | 13% |

-continued

| | | |
|---|---|---|
| 5-HBB(F,F)-F | (3-24) | 10% |
| 3-HHEB(F,F)-F | (3-12) | 10% |
| 4-HHEB(F,F)-F | (3-12) | 3% |
| 5-HHEB(F,F)-F | (3-12) | 3% |
| 2-HBEB(F,F)-F | (3-39) | 3% |
| 3-HBEB(F,F)-F | (3-39) | 5% |
| 5-HBEB(F,F)-F | (3-39) | 3% |
| 3-HHBB(F,F)-F | (4-6) | 6% |

Composition Example 11

| | | |
|---|---|---|
| 5-H1OB(2F)B(2F,3F)-O2 | (1-1-29) | 4% |
| 5-H1OB(2F)B(2F,3F)-O4 | (1-1-34) | 4% |
| 3-HB-CL | (2-2) | 6% |
| 5-HB-CL | (2-2) | 4% |
| 3-HHB-OCF3 | (3-1) | 5% |
| 3-H2HB-OCF3 | (3-13) | 5% |
| 5-H4HB-OCF3 | (3-19) | 14% |
| V-HHB(F)-F | (3-2) | 5% |
| 3-HHB(F)-F | (3-2) | 5% |
| 5-HHB(F)-F | (3-2) | 5% |
| 3-H4HB(F,F)-CF3 | (3-21) | 8% |
| 5-H4HB(F,F)-CF3 | (3-21) | 10% |
| 5-H2HB(F,F)-F | (3-15) | 5% |
| 5-H4HB(F,F)-F | (3-21) | 7% |
| 2-H2BB(F)-F | (3-26) | 3% |
| 3-H2BB(F)-F | (3-26) | 5% |
| 3-HBEB(F,F)-F | (3-39) | 5% |

Composition Example 12

| | | |
|---|---|---|
| 3-H1OB(2F)B(2F,3F)-O2 | (1-1-8) | 8% |
| 5-HB-CL | (2-2) | 3% |
| 7-HB(F)-F | (2-3) | 7% |
| 3-HH-4 | (12-1) | 9% |
| 3-HH-EMe | (12-2) | 15% |
| 3-HHEB-F | (3-10) | 8% |
| 5-HHEB-F | (3-10) | 8% |
| 3-HHEB(F,F)-F | (3-12) | 10% |
| 4-HHEB(F,F)-F | (3-12) | 5% |
| 4-HGB(F,F)-F | (3-103) | 5% |
| 5-HGB(F,F)-F | (3-103) | 6% |
| 2-H2GB(F,F)-F | (3-106) | 4% |
| 3-H2GB(F,F)-F | (3-106) | 5% |
| 5-GHB(F,F)-F | (3-109) | 7% |

Composition Example 13

| | | |
|---|---|---|
| 5-H1OB(2F)B(2F,3F)-O2 | (1-1-29) | 5% |
| 5-H1OB(2F)B(2F,3F)-O4 | (1-1-34) | 5% |
| 3-HH-4 | (12-1) | 8% |
| 3-HHB-1 | (13-1) | 6% |
| 3-HHB(F,F)-F | (3-3) | 10% |
| 3-H2HB(F,F)-F | (3-15) | 9% |
| 3-HBB(F,F)-F | (3-24) | 15% |
| 3-BB(F,F)XB(F,F)-F | (3-97) | 25% |
| 1O1-HBBH-5 | (14-1) | 7% |
| 2-HHBB(F,F)-F | (4-6) | 3% |
| 3-HHBB(F,F)-F | (4-6) | 3% |
| 3-HH2BB(F,F)-F | (4-15) | 4% |

Composition Example 14

| | | |
|---|---|---|
| 3-H1OB(2F)B(2F,3F)-O2 | (1-1-8) | 3% |
| 5-H1OB(2F)B(2F,3F)-O4 | (1-1-34) | 5% |
| 3-HB-CL | (2-2) | 13% |
| 3-HB-O2 | (12-5) | 10% |
| 3-PyB(F)-F | (2-15) | 10% |
| 5-PyB(F)-F | (2-15) | 10% |
| 3-HBB(F,F)-F | (3-24) | 7% |
| 3-PyBB-F | (3-80) | 8% |
| 3-PyBB-F | (3-80) | 7% |
| 3-PyBB-F | (3-80) | 7% |
| 5-HBB(F)B-2 | (14-5) | 10% |
| 5-HBB(F)B-3 | (14-5) | 10% |

Industrial Applicability

The invention provides a new liquid crystal compound having an excellent compatibility with other liquid crystal materials, a large value of Δn and a large negative Δ∈.

The invention also provides a new liquid crystal composition having the features described above that are desired physical properties, by including this liquid crystal compound as a component where the ring, the substituent and bonding group that are composing the compound are suitably selected, and further provides a liquid crystal display device containing this liquid crystal composition.

What is claimed is:

1. A compound represented by formula (1):

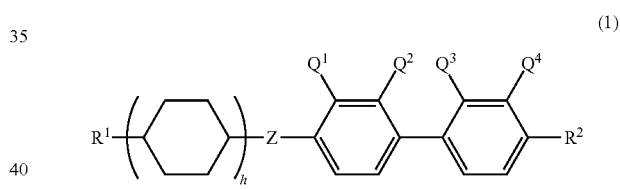

(1)

wherein $R^1$ and $R^2$ are each independently alkyl having 1 to 9 carbons or alkenyl having 2 to 9 carbons, alkoxy having 1 to 8 carbons or alkenyloxy having 2 to 8 carbons;

$Q^1$ and $Q^4$ are each independently fluorine or chlorine;

$Q^2$ and $Q^3$ are each independently hydrogen, fluorine or chlorine, and one of $Q^2$ and $Q^3$ is hydrogen and the other is fluorine or chlorine;

Z is —CH$_2$O— or —COO—; and h is 1 or 2, and h is 1 when both $Q^1$ and $Q^2$ are fluorine.

2. The compound according to claim 1, wherein $Q^1$, $Q^2$ and $Q^4$ are fluorine and $Q^3$ is hydrogen.

3. The compound according to claim 1, wherein $Q^1$, $Q^3$ and $Q^4$ are fluorine and $Q^2$ is hydrogen.

4. The compound according to claim 1, wherein Z is —CH$_2$O—.

5. A liquid crystal composition including at least two compounds, where it is characterized by including at least one of the compounds according to claim 1.

6. The liquid crystal composition according to claim 5, including at least one compound selected from the group of compounds represented by formulas (2), (3) and (4):

(2)

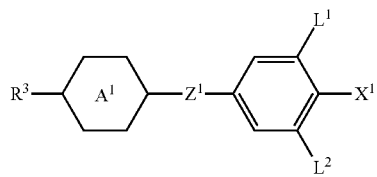

(3)

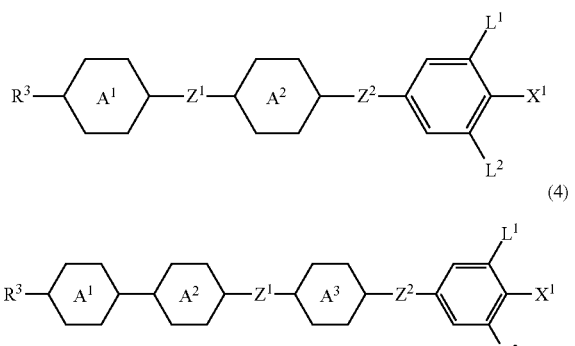

(4)

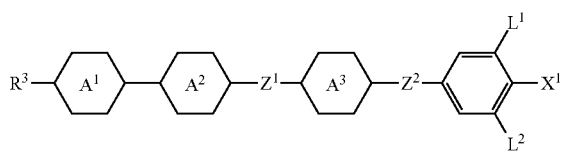

wherein
- $R^3$ is independently alkyl having 1 to 10 carbons or alkenyl having 2 to 10 carbons, and in the alkyl and the alkenyl, arbitrary hydrogen may be replaced by fluorine and arbitrary —$CH_2$— may be replaced by —O—;
- $X^1$ is independently fluorine, chlorine, —$OCF_3$, —$OCHF_2$, —$CF_3$, —$CHF_2$, —$CH_2F$, —$OCF_2CHF_2$ or —$OCF_2CHFCF_3$;
- the ring $A^1$, the ring $A^2$ and the ring $A^3$ are independently 1,4-cyclohexylene, 1,3-dioxane-2,5-diyl, pyrimidine-2,5-diyl, 1-pyran-2,5-diyl, or 1,4-phenylene in which arbitrary hydrogen may be replaced fluorine;
- $Z^1$ and $Z^2$ are independently —$(CH_2)_2$—, —$(CH_2)_4$—, —COO—, —$CF_2O$—, —$OCF_2$—, —CH=CH—, —C≡C—, —$CH_2O$— or a single bond; and
- $L^1$ and $L^2$ are independently hydrogen or fluorine.

7. The liquid crystal composition according to claim 5, including at least one compound selected from the group of compounds represented by formula (5):

(5)

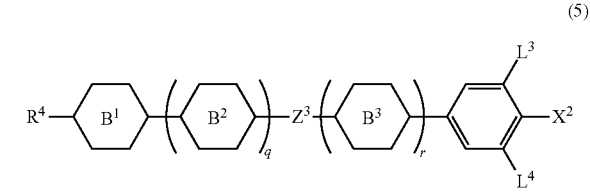

wherein
- $R^4$ is alkyl having 1 to 10 carbons or alkenyl having 2 to 10 carbons, and in the alkyl and the alkenyl, arbitrary hydrogen may be replaced by fluorine and arbitrary —$CH_2$— may be replaced by —O—;
- $X^2$ is —C≡N or —C≡C—C≡N;
- the ring $B^1$, the ring $B^2$ and the ring $B^3$ are independently 1,4-cyclohexylene, 1,3-dioxane-2,5-diyl, 1-pyran-2,5-diyl, pyrimidine-2,5-diyl, or 1,4-phenylene in which arbitrary hydrogen may be replaced fluorine;
- $Z^3$ is —$(CH_2)_2$—, —COO—, —$CF_2O$—, —$OCF_2$—, —C≡C—, $CH_2O$— or a single bond;
- $L^3$ and $L^4$ are independently hydrogen or fluorine; and
- q is 0, 1 or 2, r is 0 or 1, and q+r is 0, 1 or 2.

8. The liquid crystal composition according to claim 5, including at least one compound selected from the group of compounds represented by formulas (6), (7), (8), (9), (10) and (11):

(6)

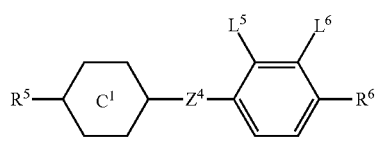

(7)

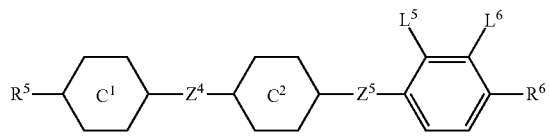

(8)

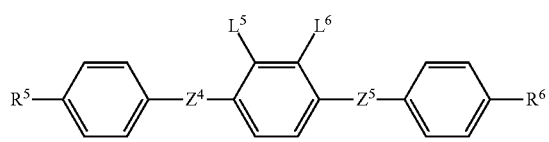

(9)

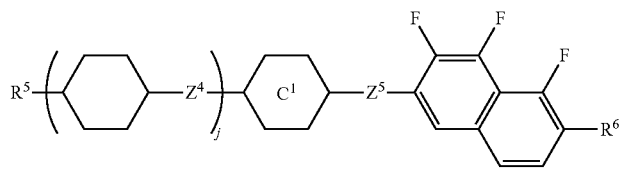

-continued

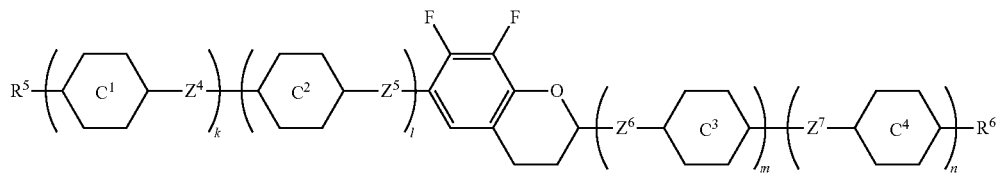
(10)

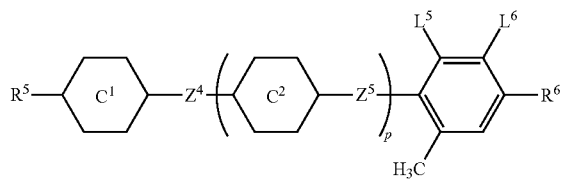
(11)

wherein
$R^5$ and $R^6$ are independently alkyl having 1 to 10 carbons or alkenyl having 2 to 10 carbons, and in the alkyl and the alkenyl, arbitrary hydrogen may be replaced by fluorine and arbitrary —$CH_2$— may be replaced by —O—;
the ring $C^1$, the ring $C^2$, the ring $C^3$ and the ring $C^4$ are independently 1,4-cyclohexylene, 1,4-cyclohexylene, 1,4-phenylene, 6-pyran-2,5-diyl or decahydro-2,6-naphthalene;
$Z^4$, $Z^5$, $Z^6$ and $Z^7$ are independently —$(CH_2)_2$—, —COO—, —$CH_2$O—, —$OCF_2$—, —$OCF_2(CH_2)_2$— or a single bond;
$L^5$ and $L^6$ are independently fluorine or chlorine; and
j, k, l, m, n and p are independently 0 or 1, and k+l+m+n is 1 or 2.

9. The liquid crystal composition according to claim 5, including at least one compound selected from the group of compounds represented by formulas (12), (13) and (14):

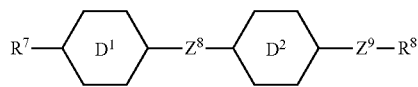
(12)

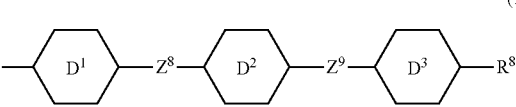
(13)

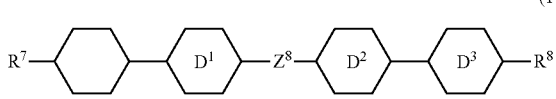
(14)

wherein
$R^7$ and $R^8$ are independently alkyl having 1 to 10 carbons or alkenyl having 2 to 10 carbons, and in the alkyl and the alkenyl, arbitrary —$CH_2$— may be replaced by —O—;
the ring $D^1$, the ring $D^2$ and the ring $D^3$ are independently 1,4-cyclohexylene, pyrimidine-2,5-diyl, 1,4-phenylene, 2-fluoro-1,4-phenylene, 3-fluoro-1,4-phenylene or 2,5-difluoro-1,4-phenylene; and
$Z^8$ and $Z^9$ are independently —C≡C—, —COO—, —$(CH_2)_2$—, —CH=CH— or a single bond.

10. The liquid crystal composition according to claim 6, further including at least one compound selected from the group of compounds represented by formula (5).

11. The liquid crystal composition according to claim 6, further including at least one compound selected from the group of compounds represented by formulas (12), (13) and (14):

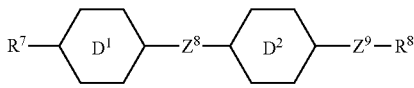
(12)

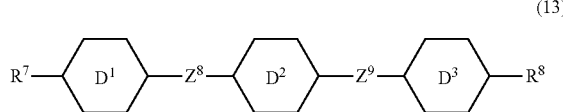
(13)

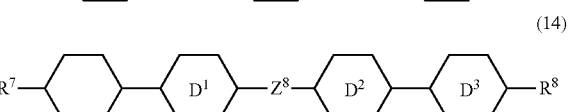
(14)

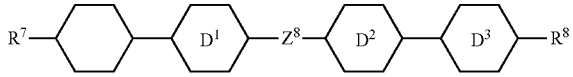

wherein
$R^7$ and $R^8$ are independently alkyl having 1 to 10 carbons or alkenyl having 2 to 10 carbons, and in the alkyl and the alkenyl, arbitrary —$CH_2$— may be replaced by —O—;
the ring $D^1$, the ring $D^2$ and the ring $D^3$ are independently 1,4-cyclohexylene, pyrimidine-2,5-diyl, 1,4-phenylene, 2-fluoro-1,4-phenylene, 3-fluoro-1,4-phenylene or 2,5-difluoro-1,4-phenylene: and
$Z^8$ and $Z^9$ are independently —C≡C—, —COO—, —$(CH_2)_2$—, —CH=CH— or a single bond.

12. The liquid crystal composition according to claim 7, further including at least one compound selected from the group of compounds represented by formulas (12), (13) and (14):

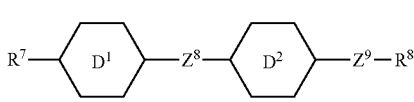
(12)

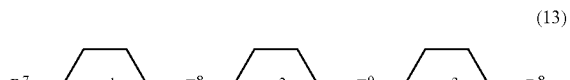
(13)

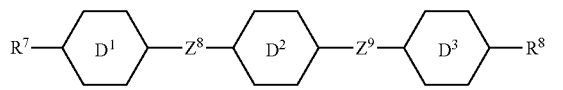

(14)

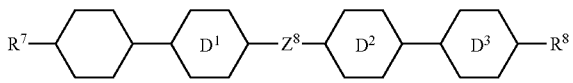

wherein
R[7] and R[8] are independently alkyl having 1 to 10 carbons or alkenyl having 2 to 10 carbons, and in the alkyl and the alkenyl, arbitrary —CH$_2$— may be replaced by —O—;

the ring D[1], the ring D[2] and the ring D[3] are independently 1,4-cyclohexylene, pyrimidine-2,5-diyl, 1,4-phenylene, 2-fluoro-1,4-phenylene, 3-fluoro-1,4-phenylene or 2,5-difluoro-1,4-phenylene; and Z[8] and Z[9] are independently —C≡C—, —COO—, —(CH$_2$)$_2$—, —CH=CH— or a single bond.

13. The liquid crystal composition according to claim 8, further including at least one compound selected from the group of compounds represented by formulas (12), (13) and (14):

(12)

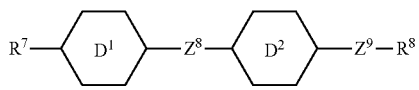

(13)

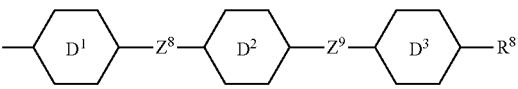

(14)

wherein
R[7] and R[8] are independently alkyl having 1 to 10 carbons or alkenyl having 2 to 10 carbons, and in the alkyl and the alkenyl, arbitrary —CH$_2$— may be replaced by —O—;

the ring D[1], the ring D[2] and the ring D[3] are independently 1,4-cyclohexylene, pyrimidine-2,5-diyl, 1,4-phenylene, 2-fluoro-1,4-phenylene, 3-fluoro-1,4-phenylene or 2,5-difluoro-1,4-phenylene; and Z[8] and Z[9] are independently —C≡C—, —COO—, —(CH$_2$)$_2$—, —CH=CH— or a single bond.

14. The liquid crystal composition according to claim 5, further including at least one optically active compound and/or polymerizable compound.

15. The liquid crystal composition according to claim 5, further including at least one antioxidant and/or ultraviolet light absorber.

16. A liquid crystal display device containing the liquid crystal composition according to claim 5.

\* \* \* \* \*